INVENTORS
HERMAN H. GOLDSTINE
LAWRENCE P. HORWITZ
GLENMORE L. SHELTON, JR.
BY Francis J. Thomas
ATTORNEY

AMPLIFIER

INTEGRATOR

SUMMING AMPLIFIER

INVERTER

FLIP-FLOP

GATE GENERATOR

"AND" GATE

"OR" GATE

DELAY CIRCUIT

LN GENERATOR

| FEATURE | PATTERN | N-TUPLE |
|---|---|---|
| I |  | f(t)·f(t+5)·f(t+10) |
| II |  | f(t)·f(t+1)·f(t+2) |
| III |  | f(t)·f(t+4)·f(t+8) |
| IV |  | f(t)·f(t+4)·f(t+6) |
| V |  | f(t)·f(t+2)·f(t+6) |
| VI |  | f(t)·f(t+4)·f(t+10) |
| VII |  | f(t)·f(t+6)·f(t+10) |

DESCRIPTION OF SELECTED FEATURES

July 20, 1965 H. H. GOLDSTINE ETAL 3,196,397

SPECIMEN IDENTIFICATION TECHNIQUES EMPLOYING NTH-ORDER AUTOCORRELATION FUNCTIONS

Filed June 19, 1961 37 Sheets-Sheet 24

FEATURE FUNCTIONS

CONDENSED FEATURE FUNCTIONS

AUTOCORRELATION FUNCTION OF CONDENSED FEATURE FUNCTIONS

| REFERENCE PATTERNS | | 1 | 2 | 3 | 4 | 5 | 6 | 7 | 8 | 9 | 0 |
|---|---|---|---|---|---|---|---|---|---|---|---|
| SUM OF ELEMENTS | | 3 | 5 | 3 | 8 | 4 | 7 | 3 | 13 | 10 | 3 |
| 1-COLUMN VECTORS | 1 | 0 | 4 | 0 | 6 | 0 | 4 | 0 | 12 | 6 | 0 |
| | 2 | 0 | 4 | 0 | 6 | 0 | 2 | 0 | 6 | 2 | 0 |
| | 3 | 0 | 2 | 0 | 4 | 0 | 0 | 0 | 4 | 2 | 0 |
| | 4 | 0 | 2 | 0 | 2 | 0 | 2 | 0 | 2 | 4 | 0 |
| | 5 | 0 | 0 | 0 | 4 | 2 | 2 | 0 | 0 | 6 | 0 |
| | 6 | 0 | 0 | 0 | 0 | 0 | 2 | 0 | 0 | 2 | 0 |
| 2-COLUMN VECTORS | 6 | 0 | 0 | 0 | 0 | 0 | 0 | 0 | 0 | 2 | 0 |
| | 5 | 0 | 0 | 0 | 2 | 0 | 2 | 0 | 2 | 2 | 0 |
| | 4 | 0 | 0 | 0 | 0 | 0 | 2 | 0 | 4 | 2 | 0 |
| | 3 | 0 | 0 | 0 | 2 | 0 | 4 | 0 | 6 | 2 | 0 |
| | 2 | 0 | 0 | 0 | 2 | 0 | 0 | 0 | 6 | 2 | 0 |
| | 1 | 0 | 0 | 2 | 2 | 0 | 0 | 0 | 8 | 4 | 0 |
| | | 4 | 0 | 0 | 4 | 0 | 0 | 0 | 8 | 4 | 0 |
| | 1 | 0 | 0 | 2 | 0 | 0 | 6 | 0 | 10 | 4 | 0 |
| | 2 | 0 | 0 | 0 | 2 | 0 | 2 | 0 | 10 | 4 | 0 |
| | 3 | 0 | 0 | 0 | 2 | 0 | 2 | 0 | 6 | 2 | 0 |

FIG. 34d1

| | | | | | | | | | | | |
|---|---|---|---|---|---|---|---|---|---|---|---|
| | 1, 4 | 0 | 0 | 0 | 2 | 0 | 0 | 0 | 2 | 2 | 2 |
| | 1, 5 | 0 | 0 | 0 | 2 | 0 | 0 | 0 | 0 | 2 | 0 |
| | 1, 6 | 0 | 0 | 0 | 0 | 0 | 0 | 0 | 0 | 0 | 0 |
| 3-COLUMN VECTORS | 2, 6 | 0 | 0 | 0 | 0 | 0 | 0 | 2 | 0 | 0 | 0 |
| | 2, 5 | 0 | 0 | 0 | 2 | 0 | 0 | 0 | 2 | 2 | 0 |
| | 2, 4 | 0 | 0 | 0 | 0 | 0 | 0 | 0 | 2 | 0 | 0 |
| | 2, 3 | 0 | 0 | 0 | 0 | 0 | 0 | 0 | 0 | 2 | 2 |
| | 2, 2 | 0 | 0 | 0 | 0 | 0 | 4 | 0 | 4 | 0 | 0 |
| | 2, 1 | 0 | 0 | 0 | 0 | 2 | 0 | 0 | 8 | 2 | 0 |
| | 2 | 2 | 0 | 2 | 2 | 0 | 0 | 0 | 8 | 4 | 0 |
| | 2, 1 | 0 | 0 | 0 | 0 | 2 | 0 | 0 | 4 | 0 | 0 |
| | 2, 2 | 0 | 0 | 0 | 0 | 0 | 2 | 0 | 4 | 2 | 0 |
| | 2, 3 | 0 | 0 | 0 | 0 | 0 | 2 | 0 | 4 | 2 | 0 |
| | 2, 4 | 0 | 0 | 0 | 0 | 2 | 2 | 0 | 2 | 2 | 0 |
| | 2, 5 | 0 | 0 | 0 | 0 | 0 | 0 | 2 | 2 | 2 | 0 |
| | 2, 6 | 0 | 0 | 0 | 0 | 2 | 0 | 0 | 0 | 0 | 0 |
| | 3, 6 | 0 | 0 | 0 | 0 | 0 | 0 | 0 | 0 | 2 | 0 |
| | 3, 5 | 0 | 0 | 0 | 2 | 0 | 0 | 0 | 2 | 2 | 0 |

FIG. 34d2

| | | | | | | | | | | | |
|---|---|---|---|---|---|---|---|---|---|---|---|
| 4-COLUMN VECTORS | 3, 4 | 0 | 0 | 0 | 0 | 0 | 0 | 0 | 2 | 2 | 0 |
| | 3, 3 | 0 | 0 | 0 | 2 | 0 | 0 | 0 | 2 | 0 | 0 |
| | 3, 2 | 0 | 2 | 0 | 2 | 0 | 0 | 0 | 0 | 0 | 0 |
| | 3, 1 | 0 | 2 | 0 | 2 | 0 | 2 | 0 | 0 | 4 | 0 |
| | 3 | 0 | 2 | 0 | 2 | 0 | 0 | 0 | 0 | 2 | 0 |
| | 3, 1 | 0 | 0 | 0 | 0 | 0 | 0 | 0 | 4 | 0 | 2 |
| | 3, 2 | 0 | 2 | 0 | 0 | 0 | 0 | 0 | 4 | 0 | 0 |
| | 3, 3 | 0 | 0 | 0 | 0 | 0 | 0 | 0 | 2 | 0 | 0 |
| | 3, 4 | 0 | 0 | 0 | 0 | 0 | 0 | 0 | 2 | 2 | 0 |
| | 3, 5 | 0 | 0 | 0 | 0 | 0 | 0 | 0 | 2 | 0 | 0 |
| | 3, 6 | 0 | 0 | 0 | 0 | 0 | 0 | 0 | 0 | 0 | 0 |
| VECTORS | 4, 6 | 0 | 0 | 0 | 0 | 0 | 0 | 0 | 0 | 0 | 0 |
| | 4, 5 | 0 | 0 | 0 | 0 | 0 | 0 | 0 | 0 | 0 | 0 |
| | 4, 4 | 0 | 0 | 0 | 0 | 0 | 0 | 0 | 0 | 0 | 0 |
| | 4, 3 | 0 | 0 | 0 | 0 | 0 | 0 | 0 | 0 | 2 | 0 |
| | 4, 2 | 0 | 0 | 0 | 0 | 0 | 0 | 0 | 2 | 0 | 0 |
| | 4, 1 | 0 | 0 | 0 | 0 | 0 | 0 | 2 | 0 | 0 | 0 |
| | 4 | 0 | 0 | 0 | 0 | 0 | 0 | 0 | 0 | 0 | 0 |

FIG. 34d3

| | | | | | | | | | | | |
|---|---|---|---|---|---|---|---|---|---|---|---|
| 5-COLUMN | 1 / 4 | 0 | 0 | 0 | 0 | 0 | 0 | 0 | 0 | 0 | 0 |
| | 2 / 4 | 0 | 0 | 0 | 0 | 0 | 0 | 0 | 0 | 0 | 0 |
| | 3 / 4 | 0 | 0 | 0 | 0 | 0 | 0 | 0 | 2 | 0 | 0 |
| | 4 / 4 | 0 | 0 | 0 | 0 | 0 | 0 | 0 | 2 | 0 | 0 |
| | 5 / 4 | 0 | 0 | 0 | 0 | 2 | 0 | 0 | 2 | 0 | 0 |
| | 6 / 4 | 0 | 0 | 0 | 0 | 0 | 0 | 0 | 0 | 0 | 0 |
| 6-COLUMN VECTORS | 6 / 5 | 0 | 0 | 0 | 0 | 0 | 0 | 0 | 0 | 0 | 0 |
| | 5 / 5 | 0 | 0 | 0 | 0 | 0 | 0 | 0 | 0 | 0 | 0 |
| | 4 / 5 | 0 | 0 | 0 | 0 | 0 | 0 | 0 | 0 | 0 | 0 |
| | 3 / 5 | 0 | 0 | 0 | 0 | 0 | 0 | 0 | 0 | 0 | 0 |
| | 2 / 5 | 0 | 0 | 0 | 0 | 0 | 0 | 0 | 0 | 0 | 0 |
| | 1 / 5 | 0 | 0 | 0 | 0 | 0 | 0 | 0 | 0 | 2 | 0 |
| | 5 | 0 | 0 | 0 | 0 | 0 | 0 | 0 | 2 | 0 | 0 |
| | 1 / 5 | 0 | 0 | 0 | 0 | 0 | 0 | 0 | 0 | 0 | 0 |
| | 2 / 5 | 0 | 0 | 0 | 0 | 0 | 0 | 0 | 0 | 0 | 0 |
| | 3 / 5 | 0 | 0 | 0 | 0 | 0 | 0 | 0 | 0 | 0 | 0 |
| | 4 / 5 | 0 | 0 | 0 | 0 | 0 | 0 | 0 | 0 | 0 | 0 |
| | 5 / 5 | 0 | 0 | 0 | 0 | 0 | 0 | 0 | 0 | 0 | 0 |
| | 6 / 5 | 0 | 0 | 0 | 0 | 0 | 0 | 0 | 0 | 0 | 0 |
| NORMALIZATION FACTORS | | 23 | 137 | 258 | 80 | 189 | 93 | 258 | 39 | 64 | 258 |

FIG. 34d4

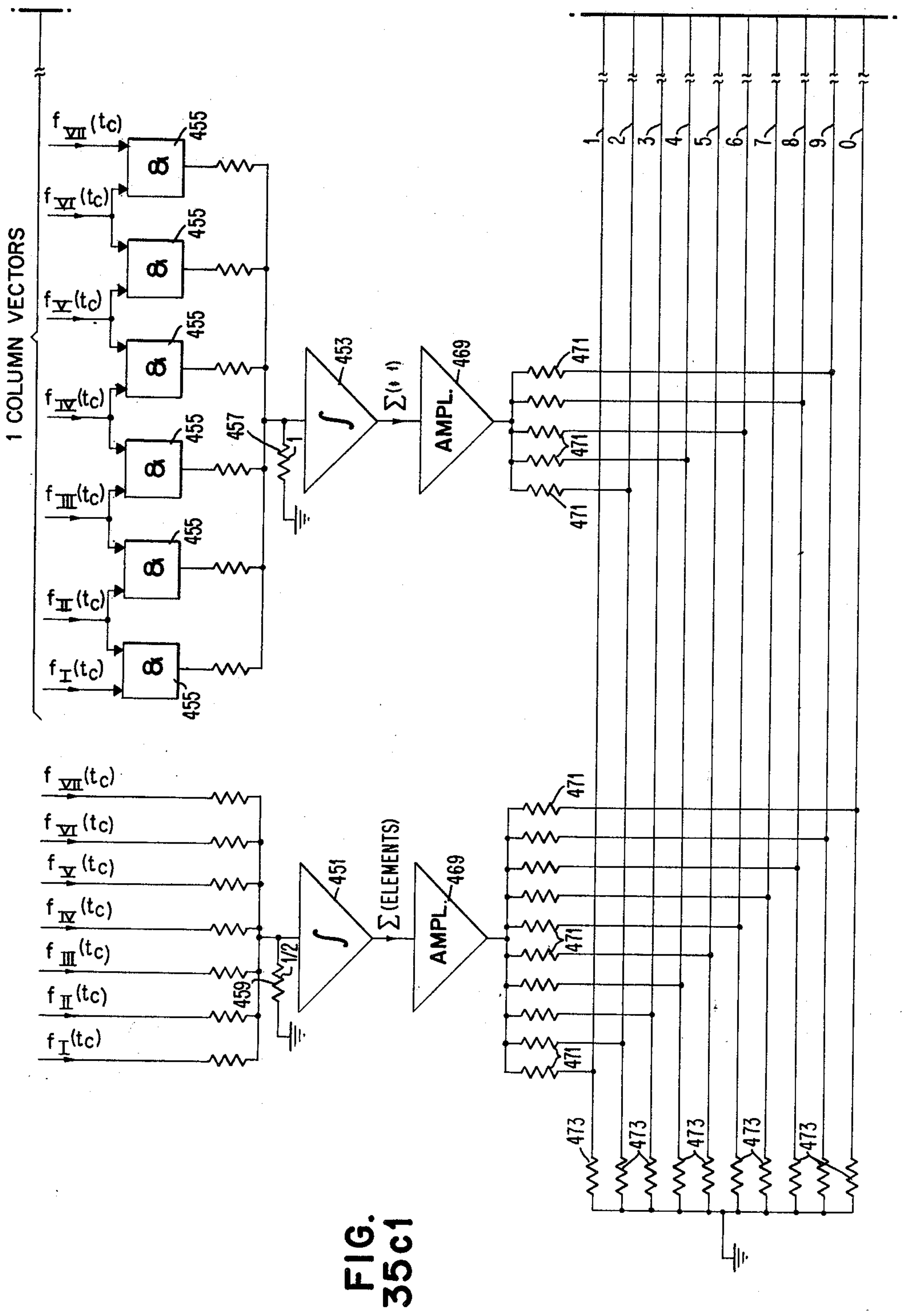
FIG. 35c1

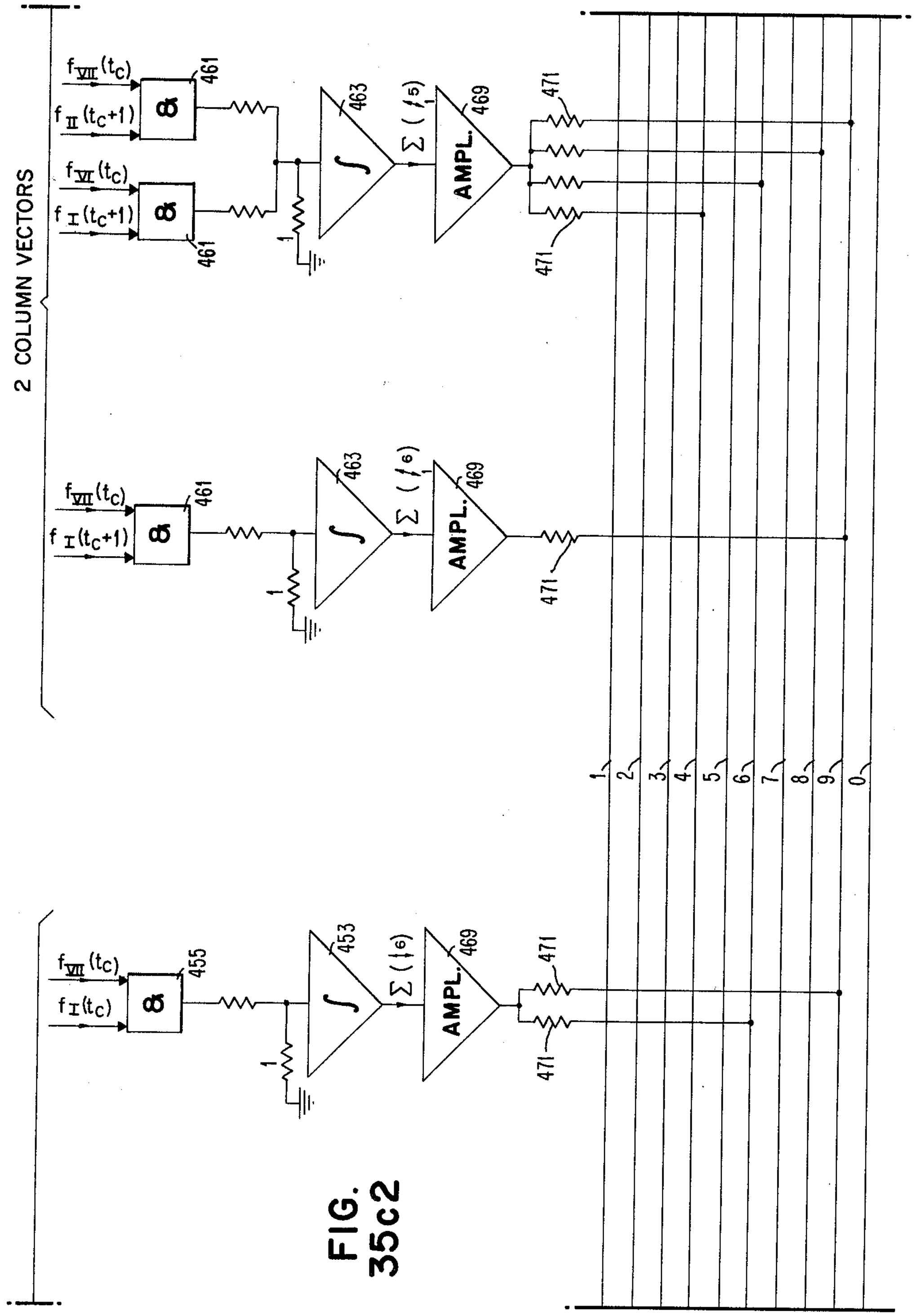
FIG. 35c2

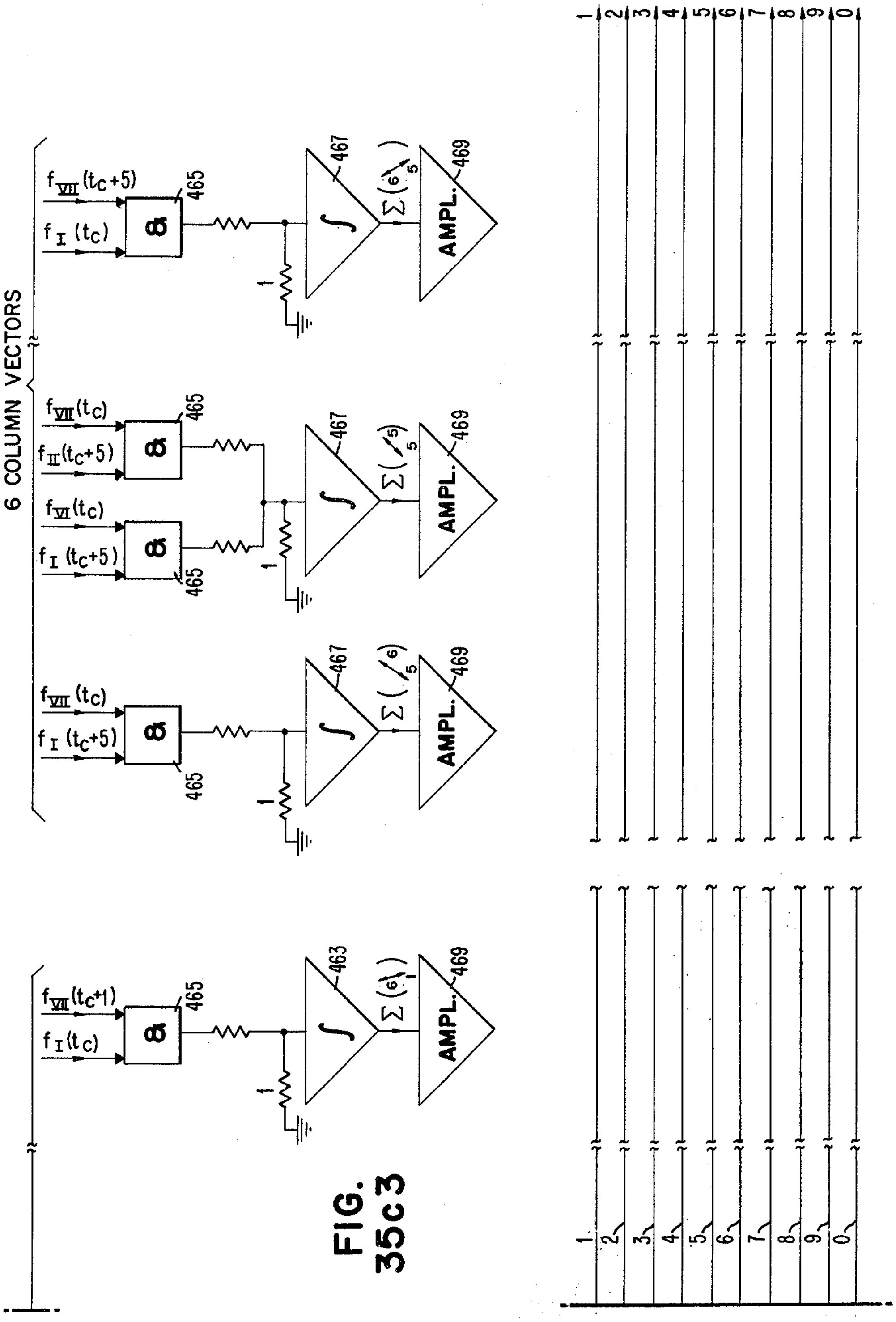
FIG. 35c3

REFERENCE PATTERNS

TEST PATTERNS (GROUP 1)

TEST PATTERNS (GROUP 2)

FIG. 39

CORRELATION TABLE

| SPECIMEN | | | $D^{(1)}(x',y')$ COMPARISON | | | $D^{(2)}(x',y')$ COMPARISON | | |
|---|---|---|---|---|---|---|---|---|
| | | | TO REF. A | TO REF. B | TO REF. R | TO REF. A | TO REF. B | TO REF. R |
| IDEAL | | A | 1.000 | 0.933 | 0.933 | 1.000 | 0.725 | 0.742 |
| IDEAL | | B | 0.933 | 1.000 | 0.983 | 0.725 | 1.000 | 0.887 |
| IDEAL | | R | 0.933 | 0 983 | 1.000 | 0.742 | 0.887 | 1.000 |
| TEST PATTERNS | GROUP 1 | A | 0.973 | 0.953 | 0.957 | 0.911 | 0.808 | 0.836 |
| TEST PATTERNS | GROUP 1 | B | 0.933 | 0.977 | 0.975 | 0.755 | 0.921 | 0.880 |
| TEST PATTERNS | GROUP 1 | R | 0.933 | 0.969 | 0.982 | 0.766 | 0.875 | 0.939 |
| TEST PATTERNS | GROUP 2 | A | 0.944 | 0.945 | 0.956 | 0.834 | 0.799 | 0.839 |
| TEST PATTERNS | GROUP 2 | B | 0.926 | 0.960 | 0.963 | 0.765 | 0.869 | 0.865 |
| TEST PATTERNS | GROUP 2 | R | 0.923 | 0.951 | 0.961 | 0.756 | 0.835 | 0.876 |

United States Patent Office 3,196,397
Patented July 20, 1965

3,196,397
SPECIMEN IDENTIFICATION TECHNIQUES EMPLOYING Nth-ORDER AUTOCORRELATION FUNCTIONS

Herman H. Goldstine and Lawrence P. Horwitz, Chappaqua, and Glenmore L. Shelton, Jr., Carmel, N.Y., assignors to International Business Machines Corporation, New York, N.Y., a corporation of New York
Filed June 19, 1961, Ser. No. 118,124
30 Claims. (Cl. 340—146.3)

This invention concerns methods and apparatus for identifying specimens, and in particular, to identification systems based on functions of *n*th-order autocorrelation functions which are invariant with respect to certain characteristics of the specimen which are not necessary for identification.

Many specimen identification devices utilize direct comparison between the specimen to be identified and reference patterns. The operation of these devices is adversely affected when the specimen is misregistered, either vertically or horizontally, or when the specimen differs in size from the standard for which the particular device has been designed. The operation of these devices is also adversely affected when the specimen is rotated or sheared. A significant amount of "noise" (blurred printing, faded printing, poor paper) also interferes with the operation of direct comparison identification devices. Some of these problems have been solved by the use of Fraunhofer diffraction patterns and autocorrelation function comparison techniques, as shown in an article by L. P. Horwitz and G. L. Shelton, Jr., entitled Pattern Recognition Using Autocorrelation which appears in the Proceedings of the Institute of Radio Engineers for January 1961, volume 49, number 1, on pages 175–185. This article describes techniques of specimen identification which are registration invariant, but these techniques do not provide invariance to specimen rotation, shear or one-directional size distortion.

In a generic sense, the present invention provides preferred embodiments of specimen identification systems that are enhanced by the use of functions of *n*th-order autocorrelation functions.

In one group of systems, entitled the *n*-tuple systems, identification is based on direct comparisons of *n*th-order autocorrelation functions of the specimen with similar functions of reference patterns.

Another group of systems, entitled the entropy systems, is based on comparisons of certain functions of *n*th-order autocorrelation functions of the specimen to similar functions of reference patterns. These functions provide a measure of the relative order (or disorder) present within the specimen, and permit identification that is invariant to specimen registration, size, shear or rotation. The "entropy" function is a particularly useful type of order (disorder) function.

In another froup of systems, entitled the feature analysis systems, identification of the specimens is based on the presence or absence of various sub-patterns (features) within the specimen. The features correspond to elements of *n*th-order autocorrelation functions.

An object of this invention is to provide specimen identification methods and apparatus utilizing *n*th-order autocorrelation function comparison and functions of *n*th-order autocorrelation function comparison to obtain specimen identification which is highly discriminatory.

Another object of this invention is to provide specimen identification methods and apparatus utilizing comparison of functions of *n*th-order autocorrelation functions to obtain specimen identification that is invariant to certain characteristics of the specimen that are not necessary for identification.

A further object is to provide specimen identification methods and apparatus utilizing order and disorder function comparison to obtain specimen identification which is invariant to certain specimen characteristics which are not necessary for identification, such as registration, size, rotation and shear.

Another object is to provide specimen identification methods and apparatus utilizing entropy function comparison to obtain specimen identification which is invariant to certain specimen characteristics which are not necessary for identifications, such as registration, size, rotation and shear.

Another object is to provide specimen identification methods and apparatus wherein identification is based on elements of *n*th-order autocorrelation functions which enable various areas of the specimen to be analyzed with respect to various features.

A further object is to provide specimen identification methods and apparatus wherein identification is based on the relative positions of selected features within the specimen.

Another object is to provide specimen identification apthe relative time of occurrence of elements of *n*th-order autocorrelation functions of a time-varying function of the specimen.

Another object is to provide specimen identification apparatus and methods wherein identification is based on the sequence of occurrence of elemens of *n*th-order autocorrelation functions of a time-varying function of the specimen.

A still further object is to provide specimen identification methods and apparatus wherein identification is based on autocorrelation functions of feature functions.

The foregoing, and other objects, features and advantages of the invention will be apparent from the following description of the invention which is paragraphed as follows:

I. Introductory Theory
- (a) First-Order Autocorrelation Functions
- (b) Nth-Order Autocorrelation Functions
- (c) Order, Disorder and Entropy Functions II. Application of Theory to Specimen Identification Systems
- (a) N-Tuple Systems
- (b) Entropy Systems
- (c) Feature Analysis Systems III. Description of Drawings
IV. Block Diagram Description
V. Detailed Description
- (a) Manual Generation of Nth-Order Autocorrelation Functions
- (b) Basic Symbols and Circuits
- (c) Specimen Scanner and N-Tuple Generator Circuit
- (d) Identification Circuits
  - (1) N-Tuple Systems
    - Reference Storage and Correlator Circuit
    - Maximum Signal Indicator
  - (2) Entropy Systems
    - Entropy Generator Circuit
  - (3) Feature Analysis Systems
    - First Embodiment
    - Second Embodiment
    - Third Embodiment VI. System Stability
VII. Summary I. *Introductory theory*—(a) *First-order autocorrelation functions.*—The specimen identification techniques outlined in the previously-cited article by L. P. Horwitz and G. L. Shelton, Jr., make use of first-order autocorrelation function comparison. Using this technique, if the specimen to be identified is considered to be a matrix of discrete areas having coordinates $(x, y)$ that are predominately black or predominately white, depending upon the positions of the lines that the specimen comprises, there is a function $f(x, y)$ that is "1" for each instance where the area about the coordinates $(x, y)$ is black and "0" where white. The first-order autocorrelation function of the specimen function defines the number of pairs of black areas separated by a given distance in a given direction (vector), over all distances and directions (vectors). If $(x, y)$ is a point on the pattern, and $(x+x^{(1)}, y+y^{(1)})$ is another point on the pattern separated from the point $(x, y)$ by $(x^{(1)}, y^{(1)})$, then the product $f(x, y)f(x+x^{(1)}, y+y^{(1)})=1$ only where both points are black. This procedure is performed for every pair of points in the specimen to generate the first-order autocorrelation function $$D^{(1)}(x^{(1)}, y^{(1)})$$

which is defined as:

$$D^{(1)}(x^{(1)}, y^{(1)})=\sum_{x,y} f(x, y)f(x+x^{(1)}, y+y^{(1)}) \quad (1)$$

The specimen "S" is then compared to (correlated with) a similar function $D_{R_a}{}^{(1)}(x^{(1)}, y^{(1)})$ of each reference pattern $R_a$, and normalized with respect to $D_{R_a}{}^{(1)}(x^{(1)}, y^{(1)})$ to provide comparison sums $S_{S,R_a}$ as follows:

$$S_{S,R_a}=\frac{\sum_{x^{(1)},y^{(1)}} D_S{}^{(1)}(x^{(1)}, y^{(1)})\cdot D_{R_a}{}^{(1)}(x^{(1)}, y^{(1)})}{\left\{\sum_{x^{(1)},y^{(1)}} [D_{R_a}{}^{(1)}(x^{(1)}, y^{(1)})]^2\right\}^{1/2}} \quad (2)$$

where:

$$\left\{\sum_{x^{(1)},y^{(1)}} [D_{R_a}{}^{(1)}(x^{(1)}, y^{(1)})]^2\right\}^{1/2}$$

is the normalization factor.

The reference pattern $R_a$ that produces the largest comparison sum determines the identification of the specimen. The comparison sums are normalized to guarantee that the largest sum will be caused by the reference pattern that is similar to the specimen. The Schwartz inequality, as found on page 417 of a text authored by Wilfred Kaplan, entitled Advanced Calculus, 1952, published by the Addison-Wesley Publishing Co., may be used to show that:

$$\sum_{x^{(1)},y^{(1)}} \frac{D_S{}^{(1)}(x^{(1)}, y^{(1)})\cdot D_{R_a}{}^{(1)}(x^{(1)}, y^{(1)})}{\left\{\sum_{x^{(1)},y^{(1)}} [D_{R_a}{}^{(1)}(x^{(1)}, y^{(1)})]^2\right\}^{1/2}} \quad (3)$$

is a maximum over the various reference choices when $$D_S{}^{(1)}(x^{(1)}, y^{(1)})=D_{R_a}{}^{(1)}(x^{(1)}, y^{(1)})$$

(b) *Nth-order autocorrelation function.*—The first-order autocorrelation function has been shown to define the specimen in terms of the pairs of black areas within the specimen that are separated by vector $(x^{(1)}, y^{(1)})$. Similarly, the second-order autocorrelation function $$D^{(2)}(x^{(1)}, y^{(1)}; x^{(2)}, y^{(2)})$$

defines the specimen in terms of the triples of black areas within the specimen which are separated by each pair of vectors $(x^{(1)}, y^{(1)})$ and $(x^{(2)}, y^{(2)})$. This function may be defined as:

$$D_S{}^{(2)}(x^{(1)}, y^{(1)}; x^{(2)}, y^{(2)})=\sum_{x,y}[f(x, y)]\cdot[f(x+x^{(1)}, y+y^{(1)})]\cdot[f(x+x^{(2)}, y+y^{(2)})] \quad (4)$$

Similarly, the $n$th-order autocorrelation function of the specimen may be defined as:

$$D_S{}^{(n)}(x^{(1)}, y^{(1)}; \ldots; x^{(n)}, y^{(n)})=\sum_{x,y}[f(x, y)]\cdot[f(x+x^{(1)}, y+y^{(1)})]\cdot \ldots \cdot[f(x+x^{(n)}, y+y^{(n)})] \quad (5)$$

For simplicity of expression, the substitution:

$$f(r)=f(x, y) \quad (6)$$

is made into (1), (4) and (5) to provide:

$$D^{(1)}(r^{(1)})=\sum_r f(r)\cdot f(r+r^{(1)}) \quad (7)$$

$$D^{(2)}(r^{(1)}, r^{(2)})=\sum_r f(r)\cdot f(r+r^{(1)})\cdot f(r+r^{(2)}) \quad (8)$$

$$D^{(n)}(r^{(1)}, \ldots r^{(n)})=\sum_r f(r)\cdot f(r+r^{(1)}) \ldots \cdot f(r+r^{(n)})$$

A zero-order autocorrelation function may also be defined as:

$$D^{(0)}=\sum_r f(r) \quad (10)$$

This function represents the total number of matrix areas that are covered by the specimen.

A specimen identification system utilizing autocorrelation function comparison is inherently registration invariant because the functions are summed over $x, y$ to provide a result that is independent of the actual specimen position.

Some functions of autocorrelation functions have been found to further enhance specimen identification, either by improving the distinction between different specimens having certain similarities (discriminating functions) or by disregarding small differences which are present when the same specimen is printed in different type fonts (smoothing functions).

Functions within these classes are shown with respect to first-order autocorrelation functions in a patent application Serial Number 45,034 filed on July 25, 1960 by Lawrence P. Horwitz and Glenmore L. Shelton, Jr. The use of discriminating or smoothing functions in connection with $n$th-order autocorrelation functions is an obvious extension of the teaching in that application.

(c) *Order, disorder and entropy functions.*—Other functions of autocorrelation functions that may also be used to enhance specimen identification are the order functions (and disorder functions) which provide a measure of the order (or disorder) present in the specimen pattern. An inherent characteristic of an order function is that it assumes a minimum value if all sub-patterns (e.g., pairs, triples, etc.) are equally frequent in occurrence, while a disorder function assumes a maximum value in this case. (Since order and disorder are inversely related, any order function may be considered to be a disorder function, and conversely.) Particularly useful types of disorder functions (i.e., functions which contain invariance to certain specimen characteriscs which are not discriminatory) are functions of the type:

$$-\sum_{r^{(1)},\ldots,r^{(n)}} g[D^{(n)}(r^{(1)}, \ldots, r^{(n)})] \quad (11)$$

In order that such a function have the properties of a disorder function, it is necessary that:

$$-\sum_{r^{(1)},\ldots,r^{(n)}} g[D^{(n)}(r^{(1)}, \ldots, r^{(n)})] \leq -\sum_{r^{(1)},\ldots,r^{(n)}} g\left[\sum_{r^{(1)},\ldots,r^{(n)}} \frac{D^{(n)}(r^{(1)}, \ldots, r^{(n)})}{N_D}\right] \quad (12)$$

The number $N_D$ may be defined as the number of distinct $(n+1)$ point combinations to be found within the actual specimen matrix under consideration or any greater number. It may also be defined as the maximum number of distinct $(n+1)$ point combinations which can be formed in any configuration with $D^{(0)}$ points, i.e.

$$\frac{D^{(0)}!}{[D^{(0)}-n-1]!(n+1)!}$$

or, if different orderings are counted separately $$\frac{D^{(0)}!}{(D^{(0)}-n-1)!}$$

In the latter case, $N_D$ may be made larger by the inclusion of combinations that do not exist within the specimen, but (12) remains valid. The sum $$\sum_{r^{(1)}\ldots r^{(n)}}$$

must be interpreted consistently with $N_D$. It then follows from (12) that $$\frac{1}{N_D}\sum_{r^{(1)},\ldots,r^{(n)}} g[D^{(n)}(r^{(1)},\ldots,r^{(n)})] \geq g\left[\sum_{r^{(1)},\ldots,r^{(n)}} \frac{D^{(n)}(r^{(1)},\ldots,r^{(n)})}{N_D}\right] \quad (13)$$

All functions $$g[D^{(n)}(r^{(1)},\ldots,r^{(n)})]$$

having the property (13) where the equal sign is valid only for equal frequency of occurrence of each of the subpatterns among the $N_D$ possibilities, are acceptable for purposes of this invention. All functions having the property (13) within approximations which retain its utility are acceptable. One of the systems to be described utilizes such a function in (11) of the form:

$$g[D^{(n)}(r^{(1)},\ldots,r^{(n)})]=\frac{D^{(n)}(r^{(1)},\ldots,r^{(n)})}{\frac{D^{(0)}!}{[D^{(0)}-n-1]!}}\cdot\ln\frac{D^{(n)}(r^{(1)},\ldots,r^{(n)})}{D^{(0)}} \quad (14)$$

The resulting expression is entitled the $n$th-order entropy function and is defined as:

$$E^{(n)}=-\sum_{r^{(1)},\ldots,r^{(n)}}\frac{D^{(n)}(r^{(1)},\ldots,r^{(n)})}{\frac{D^{(0)}!}{(D^{(0)}-n-1)!}}\cdot\ln\frac{D^{(n)}(r^{(1)},\ldots,r^{(n)})}{D^{(0)}} \quad (15)$$

Although the term "entropy" was originally used as a measure in the fields of thermodynamics and statistical mechanics, it is considered appropriate for use in the field of specimen identification due to its parallel concept as a measure of order.

The entropy function is obviously registration invariant because it is a function of the autocorrelation function which contains this inherent characteristic. The entropy function is also invariant to rotation, shear and size. Since these invariance properties refer to the continuous underlying input pattern, they are limited to those cases where $D^{(0)}$ is large, $n \ll D^{(0)}$, and the transformed patterns are still well-approximated on the given mesh spacing of the representative matrix. The sequence of entropies $E^{(1)}$, $E^{(2)} \ldots E^{n \ll D^{(0)}}$ is under these conditions invariant to all affine (linear) transformations of the specimen as defined by:

$$x=\alpha_1 x'+\beta_1 y'+C_1$$
$$y=\alpha_2 x'+\beta_2 y'+C_2$$

where the transformed specimen is represented by $x'$, $y'$.

In order to prove that the $n$th-order entropy function is invariant to changes in size and shape (under linear transformations) when $D^{(0)}$ is large, it is convenient to convert the sum into an integral.

The factorial expression in the denominator of the first factor in the summand of (15) may be rewritten as:

$$\frac{D^{(0)}!}{[D^{(0)}-n-1]!}=D^{(0)}(D^{(0)}-1)(D^{(0)}-2)\ldots(D^{(0)}-n) \quad (16)$$

$(D^{(0)})^{n+1}$ may be factored out of the right side of (16), one factor $D^{(0)}$ from each term of the product, to provide:

$$\frac{D^{(0)}!}{[D^{(0)}-n-1]!}=[D^{(0)}]^{n+1}\cdot\left[1-\frac{1}{D^{(0)}}\right]\cdot\left[1-\frac{2}{D^{(0)}}\right]\ldots\cdot\left[1-\frac{n}{D^{(0)}}\right] \quad (17)$$

The essential vestige of the discrete structure of the character matrix is explicit in the product shown in (17). To convert to integral form, it must be assumed that $D^{(0)}$ is large compared to $n$. In this case (17) is well approximated by:

$$\frac{D^{(0)}!}{[D^{(0)}-n-1]!}=[D^{(0)}]^{n+1}\cdot\left[1-\frac{1+2+3+\ldots n}{D^{(0)}}\right] \quad (18)$$

which may be rewritten as:

$$\frac{D^{(0)}!}{[D^{(0)}-n-1]!}=[D^{(0)}]^{n+1}\cdot\left[1-\frac{n(n+1)}{2D^{(0)}}\right] \quad (19)$$

Therefore if $D^{(0)} \gg n(n+1)/2$, $[D^{(0)}]^{n+1}$ may be substituted into (15) for the factorial expression to provide:

$$E^{(n)}\cong-\sum_{r^{(1)},\ldots,r^{(n)}}\frac{D^{(n)}(r^{(1)},\ldots,r^{(n)})}{[D^{(0)}]^{n+1}}\cdot\ln\frac{D^{(n)}(r^{(1)},\ldots,r^{(n)})}{[D^{(0)}]} \quad (20)$$

Since $D^{(0)}$ is large, an elementary area $\Delta$ can be introduced around each matrix point $r$ (in such a way as to cover the entire scanned surface) so as to convert (9) into a form which may be well-approximated by an integral as follows:

$$\Delta D^{(n)}(r^{(1)},\ldots,r^{(n)})=\sum_r \Delta f(r)\cdot f(r+r^{(1)})\cdot\ldots f(r+r^{(n)}) \quad (21)$$

which can be converted to:

$$\Delta D^{(n)}(r^{(1)},\ldots,r^{(n)}) \cong \int d\tau f(r)\cdot f(r+r^{(1)})\cdot\ldots f(r+r^{(n)}) \quad (22)$$

where $d\tau$ is the differential area element for the plane on which $f(r)$ is defined and the quantities $r$ and $r^{(1)},\ldots,r^{(n)}$ have units of length associated with them in contradistinction to their interpretation in Equation (21) where they refer to matrix points. This connection with the geometry of the pattern is necessary in order to demonstrate the effect of the transformations.

In the following equations, $\Delta$ is held constant and (15) is approximated by:

$$E^{(n)}\cong-\int\frac{d\tau^{(1)}\cdot d\tau^{(2)}\cdot\ldots d\tau^{(n)}}{\Delta^n}\cdot\left\{\frac{\frac{1}{\Delta}\int d\tau\cdot[f(r)\cdot f(r+r^{(1)})\cdot\ldots f(r+r^{(n)})]}{[D^{(0)}]^{n+1}}\cdot\ln\frac{\frac{1}{\Delta}\int d\tau\cdot[f(r)\cdot f(r+r^{(1)})\cdot\ldots f(r+r^{(n)})]}{[D^{(0)}]}\right\} \quad (23)$$

which can be written more conveniently as:

$$E^{(n)}\cong-\int\frac{d\tau^{(1)}\cdot d\tau^{(2)}\cdot\ldots d\tau^{(n)}}{[\Delta D^{(0)}]^n}\cdot\left\{\frac{\int d\tau\cdot[f(r)\cdot f(r+r^{(1)})\cdot\ldots f(r+r^{(n)})]}{\Delta D^{(0)}}\cdot\ln\frac{\int d\tau\cdot[f(r)\cdot f(r+r^{(1)})\cdot\ldots f(r+r^{(n)})]}{\Delta D^{(0)}}\right\} \quad (24)$$

Since $D^{(0)}$ is the number of black points in the pattern described by $f(r)$ and $\Delta$ is the area ascribed to each, the total area A of the specimen is $$A=\Delta D^{(0)} \quad (25)$$

It then follows from (24) that $$E^{(n)} \cong -\int \frac{d\tau^{(1)} \cdot d\tau^{(2)} \cdot \ldots d\tau^{(n)}}{A^n} \cdot \left\{ \frac{\int d\tau \cdot [f(r) \cdot f(r+r^{(1)}) \cdot \ldots f(r+r^{(n)})]}{A} \cdot \ln \frac{\int d\tau \cdot [f(r) \cdot f(r+r^{(1)}) \cdot \ldots f(r+r^{(n)})]}{A} \right\} \quad (26)$$

In order to consider the effect of a linear transformation on the specimen $f(r)$ and to show that the entropy functions of this pattern do not change in value, the entropy $E'^{(n)}$ for a pattern $f'(r)$ is to be calculated, where $f'(r)$ is related to $f(r)$ by $$f'(r) = f(r') \quad (27)$$

and $r'$ is related to $r$ by a linear transformation. The entropy functions are obviously unaffected by constants in the linear transformation (producing a shift within the scanning field), since the entropy functions contain the inherent registration invariance of the autocorrelation functions. Hence it suffices to consider only linear homogeneous transformations. For these, $$\int d\tau \cdot f'(r) \cdot f'(r+r^{(1)}) \cdot \ldots f'(r+r^{(n)}) = \int d\tau \cdot f(r') \cdot f(r'+r'^{(1)}), \ldots f(r'+r'^{(n)}) \quad (28)$$

$$= \int d\tau' \cdot J\left(\frac{r}{r'}\right) \cdot f(r') \cdot f(r'+r'^{(1)}) \cdot \ldots f(r'+r'^{(n)})$$

$r^{(n)}$ according to the same homogeneous transformation that relates $r'$ and $r$. The quantity $J(r/r')$ is the Jacobian (functional determinant) of this transformation and it is a non-zero constant in the case of non-singular (dimension preserving, i.e., invertible,) linear transformations. If $r'$ and $r$ are related (in terms of $x$, $y$) according to:

$$x = \alpha_1 x' + \beta_1 y' \quad (29)$$
$$y = \alpha_2 x' + \beta_2 y'$$

then $$J\left(\frac{r}{r'}\right) = \alpha_1\beta_2 - \beta_1\alpha_2 \equiv J \quad (30)$$

The significance of the Jacobian becomes clear if one considers Equation (28) for the case $n=0$. Applying the result (30) to (28) for this degenerate situation, one obtains $$\int d\tau \cdot f'(r) = J \int d\tau' \cdot f(r') \quad (31)$$

or defining A' as the area of the pattern given by $f'(r)$, $$A' = JA \quad (32)$$

Hence, the Jacobian is given by the ratio of the area of the transformed pattern, $f'(r)$ to the original pattern $f(r)$. In the cases of a rotation, shear, or any other transformation for which the area is essentially preserved, $J=1$. In general, however, the entropy of the pattern $f'(r)$ is given by (26) as:

$$E'^{(n)} \cong -\int \frac{d\tau^{(1)} \cdot d\tau^{(2)} \cdot \ldots d\tau^{(n)}}{A'^n} \cdot \left\{ \frac{\int d\tau \cdot [f(r') \cdot f(r'+r'^{(1)}) \cdot \ldots f(r'+r'^{(n)})]}{A'} \cdot \ln \left[ \frac{\int d\tau \cdot [f(r') \cdot f(r'+r'^{(1)}) \cdot \ldots f(r'+r'^{(n)})]}{A'} \right] \right\} \quad (33)$$

$$E'^{(n)} \cong -\int \frac{J^n}{A'^n} \cdot d\tau^{(1)} \cdot d\tau'^{(2)} \cdot \ldots d\tau'^{(n)} \cdot \left\{ \frac{J}{A'} \int d\tau' \cdot [f(r') \cdot f(r'+r'^{(1)}) \cdot \ldots f(r'+r'^{(n)})] \cdot \ln \left[ \frac{J}{A'} \int d\tau' \cdot [f(r') \cdot f(r'+r'^{(1)}) \cdot \ldots f(r'+r'^{(n)})] \right] \right\} \quad (34)$$

It now follows from a comparison of (34) and (26) and the use of (32), i.e., $J/A'=1/A$, that:

$$E'^{(n)} \cong E^{(n)} \quad (35)$$

This result shows that the entropy of a pattern $f(r)$ is invariant under all affine transformations, so long as the summations of Equation (15) are well-approximated by the integrals of (26). This is assured by the condition that $D^{(o)} \gg n(n+1)/2$.

II. *Application of theory to specimen identification systems.*—In the preceding description, $n$th-order autocorrelation functions and $n$th-order entropy functions have been defined and their invariance properties have been indicated. Three types of specimen identification systems that are based on these functions are to be described.

(a) *N-tuple systems.*—In the first type of identification systems to be described, entitled the $n$-tuple systems, $n$th-order autocorrelation functions of the specimen $D_S^{(n)}(r^{(1)}, \ldots, r^{(n)})$ are compared to similar functions of reference patterns $D_{R_a}^{(n)}(r^{(1)}, \ldots, r^{(n)})$, for all reference patterns $R_a$ to generate comparison sums $S_{S,R_a}$ according to:

$$S_{S,R_a} = \frac{\sum_{r^{(1)},\ldots,r^{(n)}} D_S^{(n)}(r^{(1)}, \ldots, r^{(n)}) \cdot D_{R_a}^{(n)}(r^{(1)}, \ldots, r^{(n)})}{\left\{ \sum_{r^{(1)},\ldots,r^{(n)}} [D_{R_a}^{(n)}(r^{(1)}, \ldots, r^{(n)})]^2 \right\}^{1/2}} \quad (36)$$

where the denominator is a normalizing factor of the type shown to be necessary in the discussion of Equation (2). The largest comparison sum is indicative of the identity of the specimen.

(b) *Entropy systems.*—In the second type of systems, entitled the entropy systems, specific measures of order, entitled $n$th-order entropy functions $E_S^{(n)}$ of the specimen, are compared to similar functions of reference patterns $E_{R_a}^{(n)}$ for all reference patterns $R_a$, to generate comparison sums $S_{S,R_a}$ according to:

$$S_{S,R_a} = \frac{\sum_n E_S^{(n)} \cdot E_{R_a}^{(n)}}{\left\{ \sum_n [E_{R_a}^{(n)}]^2 \right\}^{1/2}} \quad (37)$$

Again the largest comparison sum is indicative of the identity of the specimen.

(c) *Feature analysis systems.*—In the third type of systems, entitled the feature analysis systems, identification is based on portions of $n$th-order autocorrelation functions. Using these techniques, the specimen is analyzed with respect to particular features and the specimen is identified accordingly. For example, a "7" may be distinguished from a "1" by examining the specimen for the presence of a horizontal line using conventional logic circuits. Three embodiments of feature analysis systems are shown and described. In two of the embodiments, decoding logic is used which contains inherent reference storage. In the third embodiment, identification is accomplished by analyzing the autocorrelation functions of feature functions of the specimens, where the feature functions are dependent upon selected elements of $n$th-order autocorrelation functions of the specimens.

III. *Description of drawings.*—The invention in all of its embodiments, will be described in greater detail in connection with the accompanying drawings.

Figure 1:
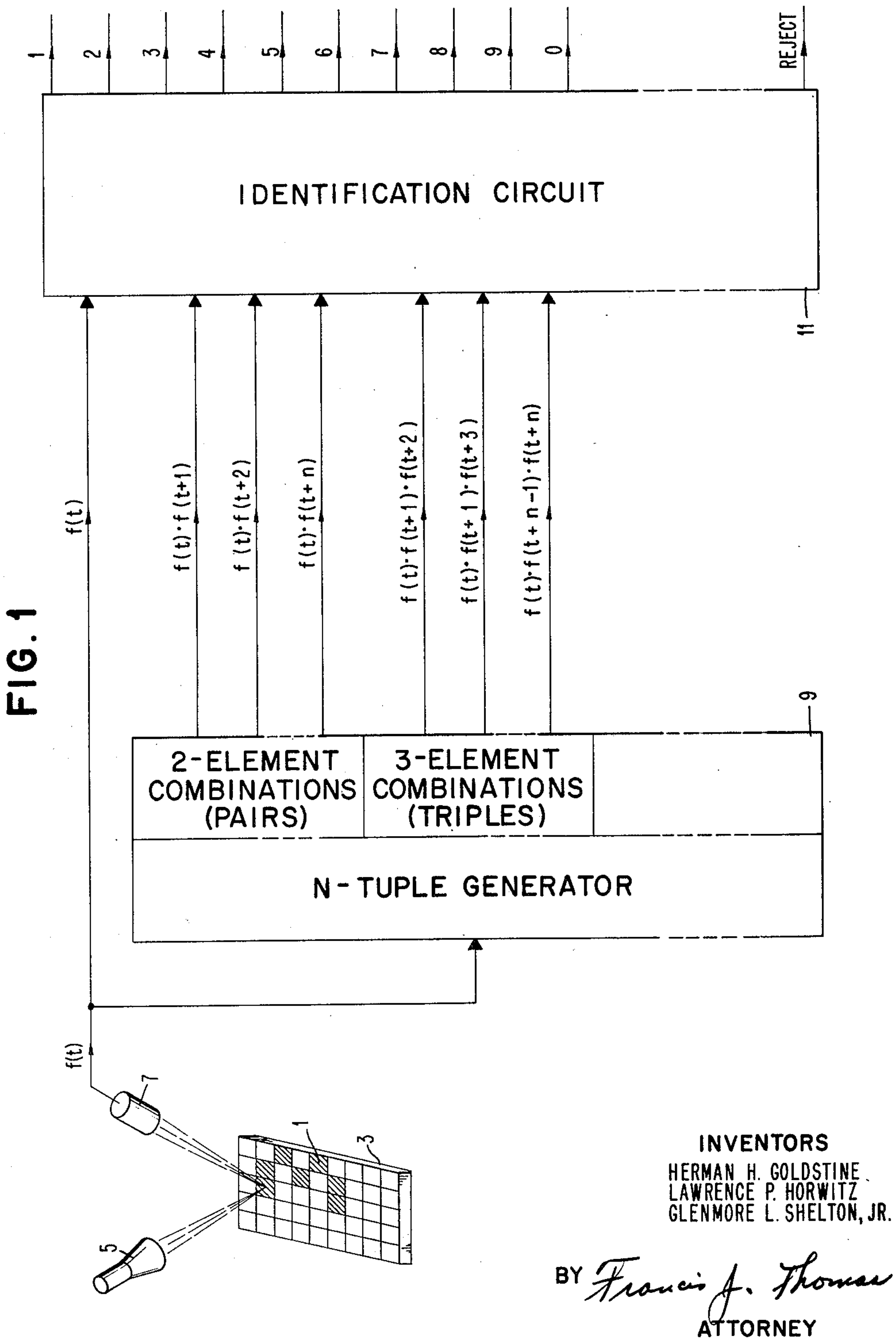
FIGURE 1 is a general block diagram that is generic to all embodiments.
Figures 28, 28A:
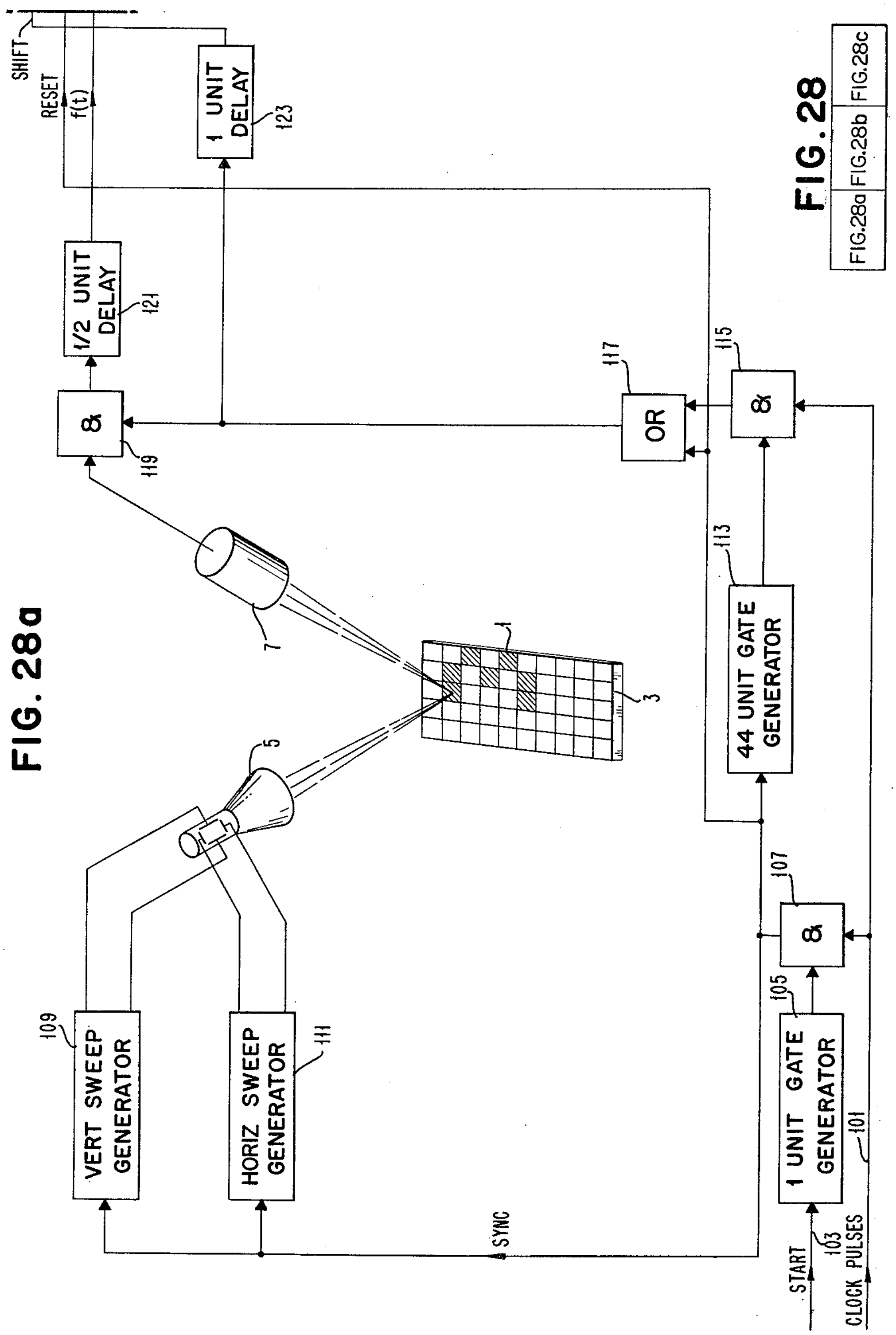
FIGURE 28 shows the relationship of FIGURES 28*a* through 28*c*.
Figure 28B:
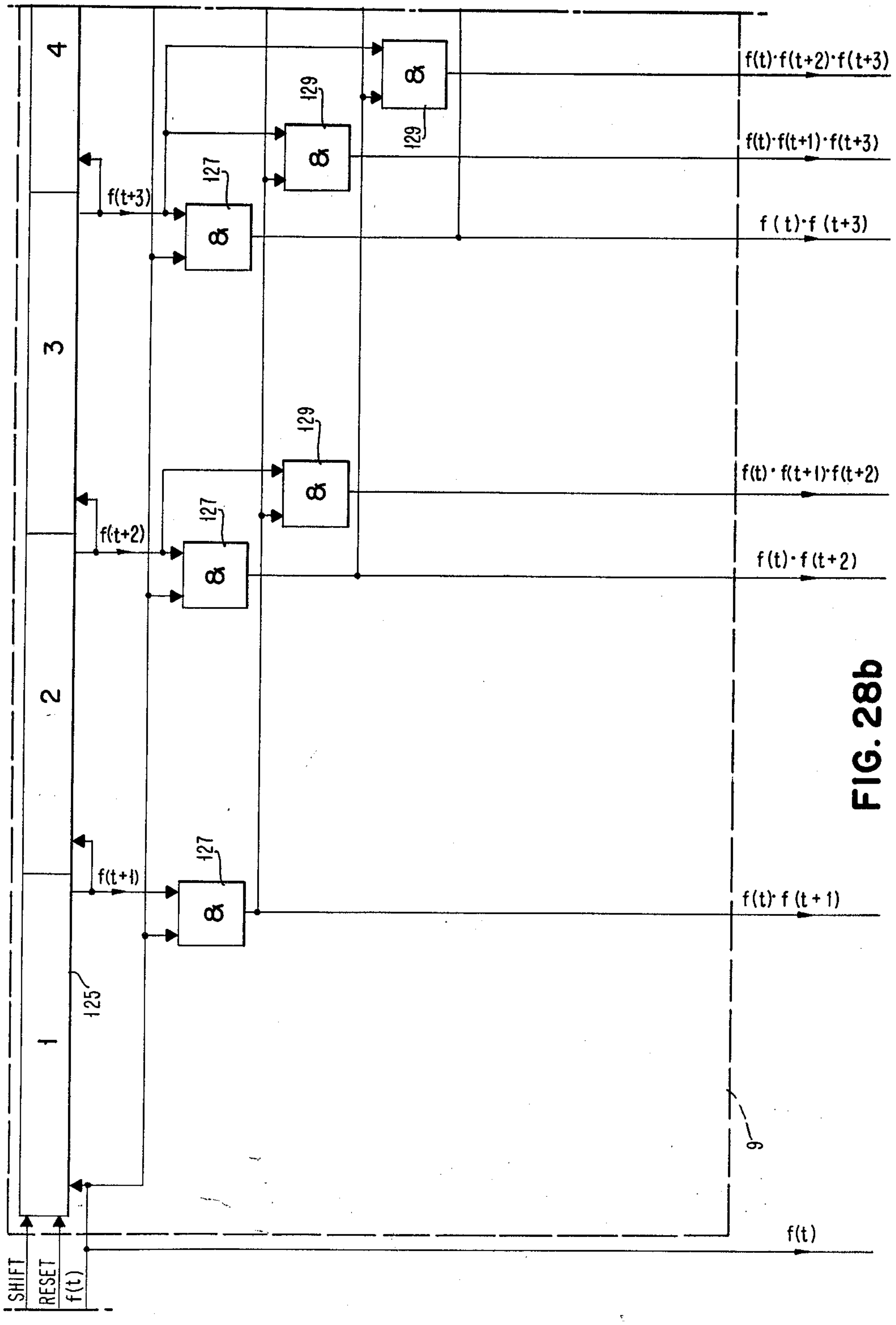
Figure 28C:
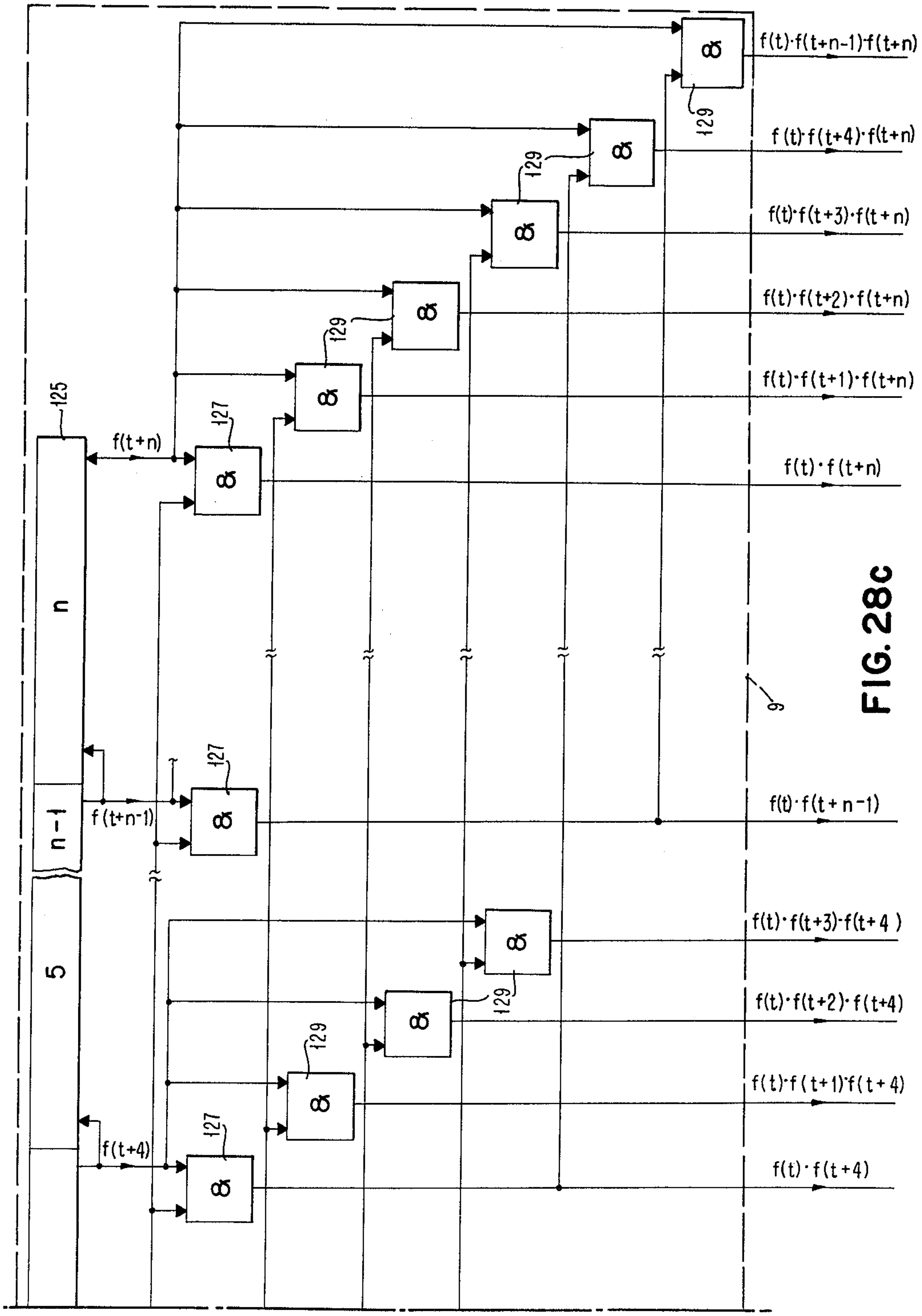

FIGURES 28*a* through 28*c* are detailed diagrams of a specimen scanner and *n*-tuple generator circuit that is suitable for use in the general block diagram of FIGURE 1 for all embodiments.

Figure 2:
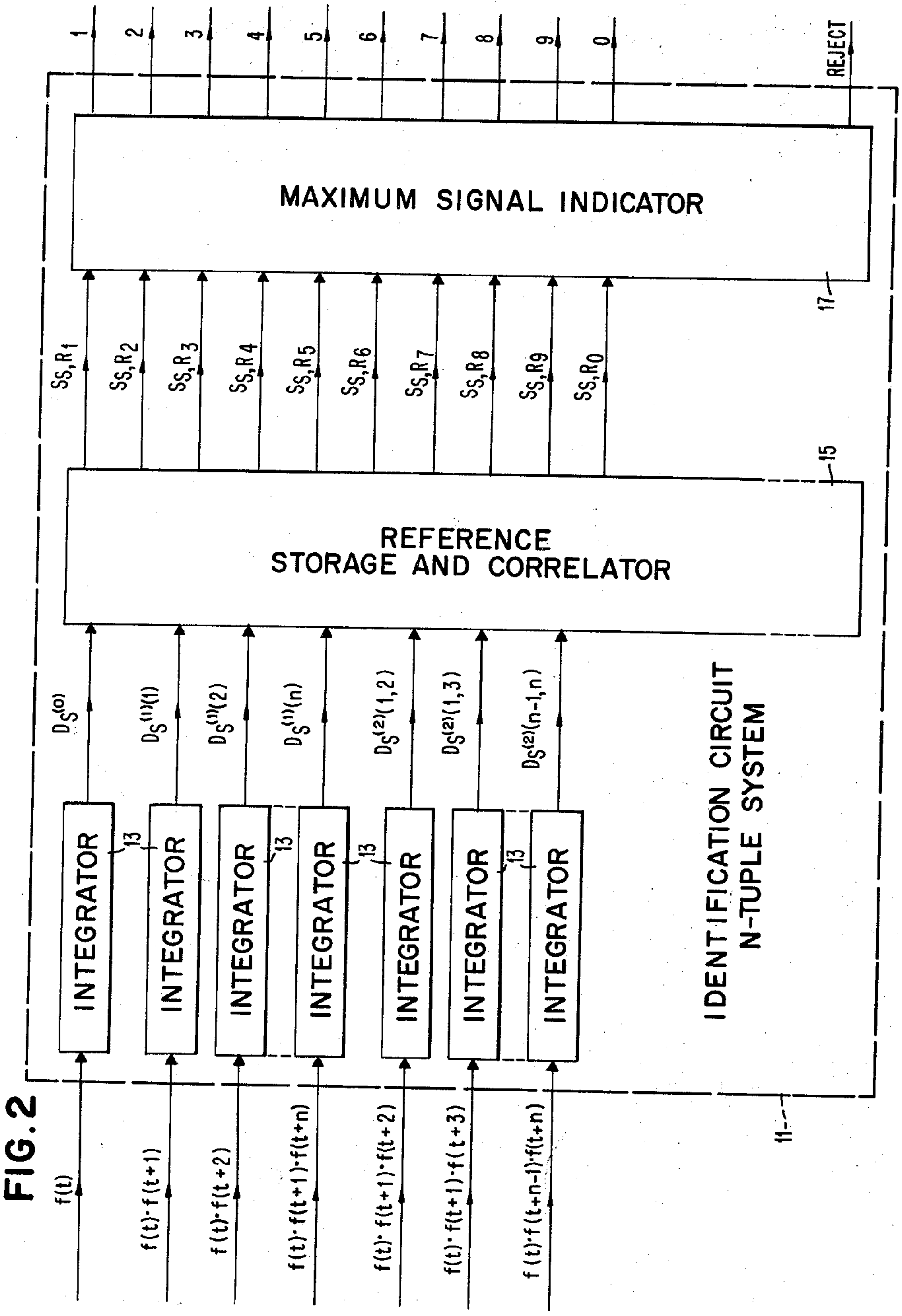
FIGURE 2 is a detailed block diagram of the $n$-tuple system identification circuits that is suitable for use in the general block diagram of FIGURE 1.
Figure 3:
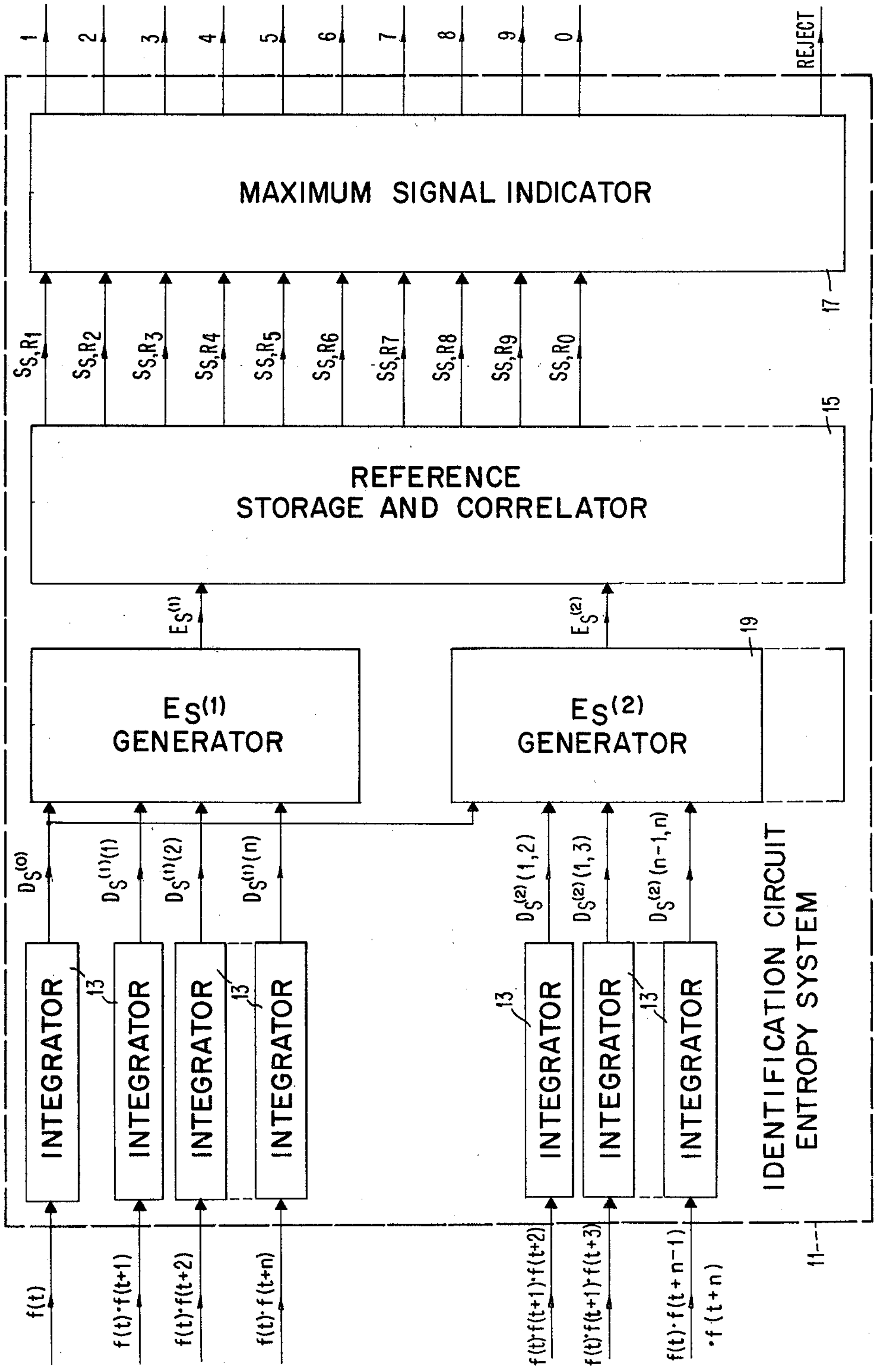
FIGURE 3 is a detailed block diagram of the entropy system identification circuits that is suitable for use in the general block diagram of FIGURE 1.
Figure 29:
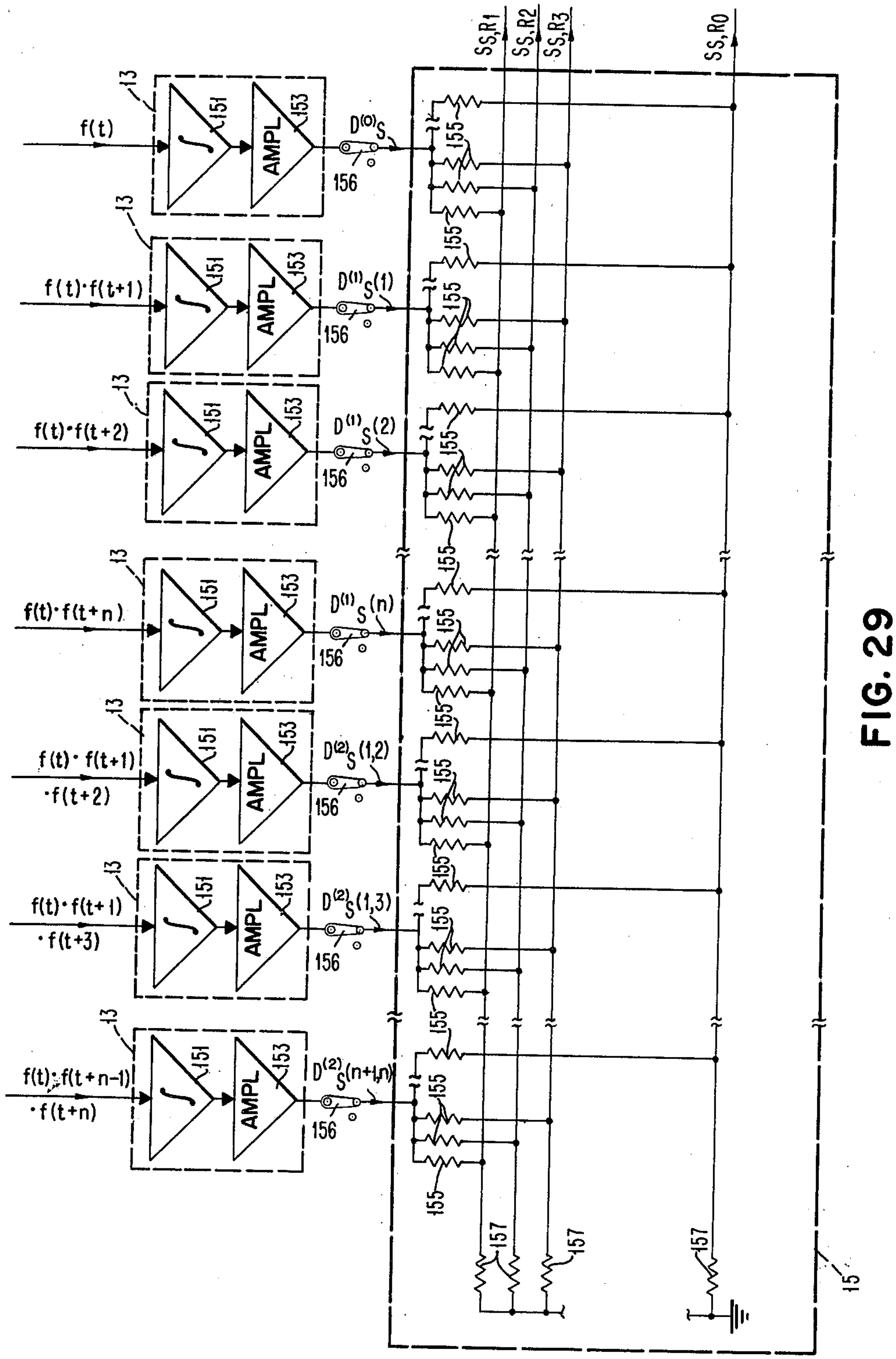

FIGURE 29 is a detailed diagram of a group of integrators and a reference storage and correlator circuit that are suitable for use in the identification circuits of FIGURES 2 and 3.

Figure 30:
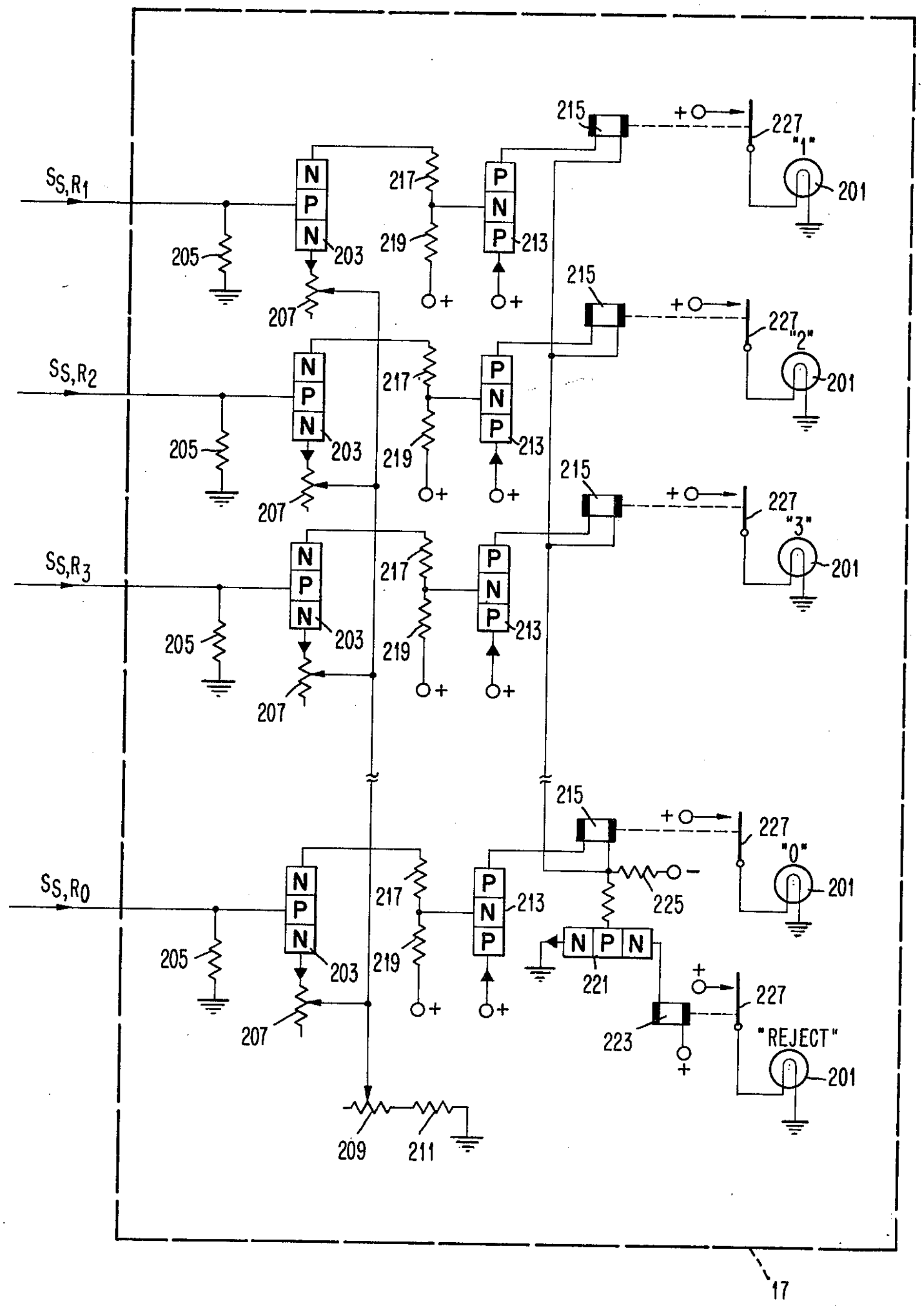

FIGURE 30 is a detailed diagram of a maximum signal indicator that is suitable for use in the identification circuits of FIGURES 2 and 3.

Figure 31:
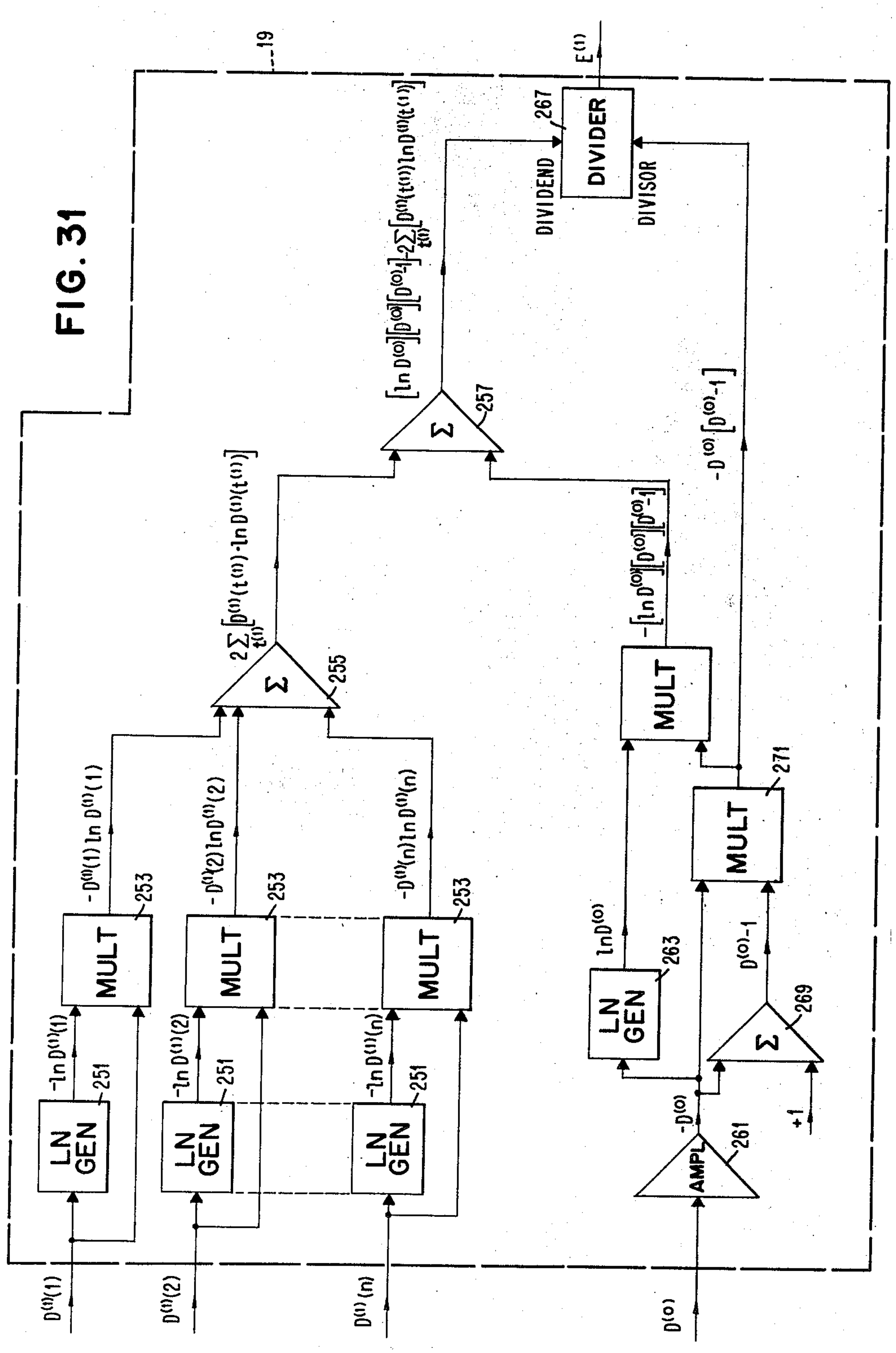

FIGURE 31 is a detailed diagram of an entropy generator that is suitable for use in the identification circuit of FIGURE 3.

Figure 32A:
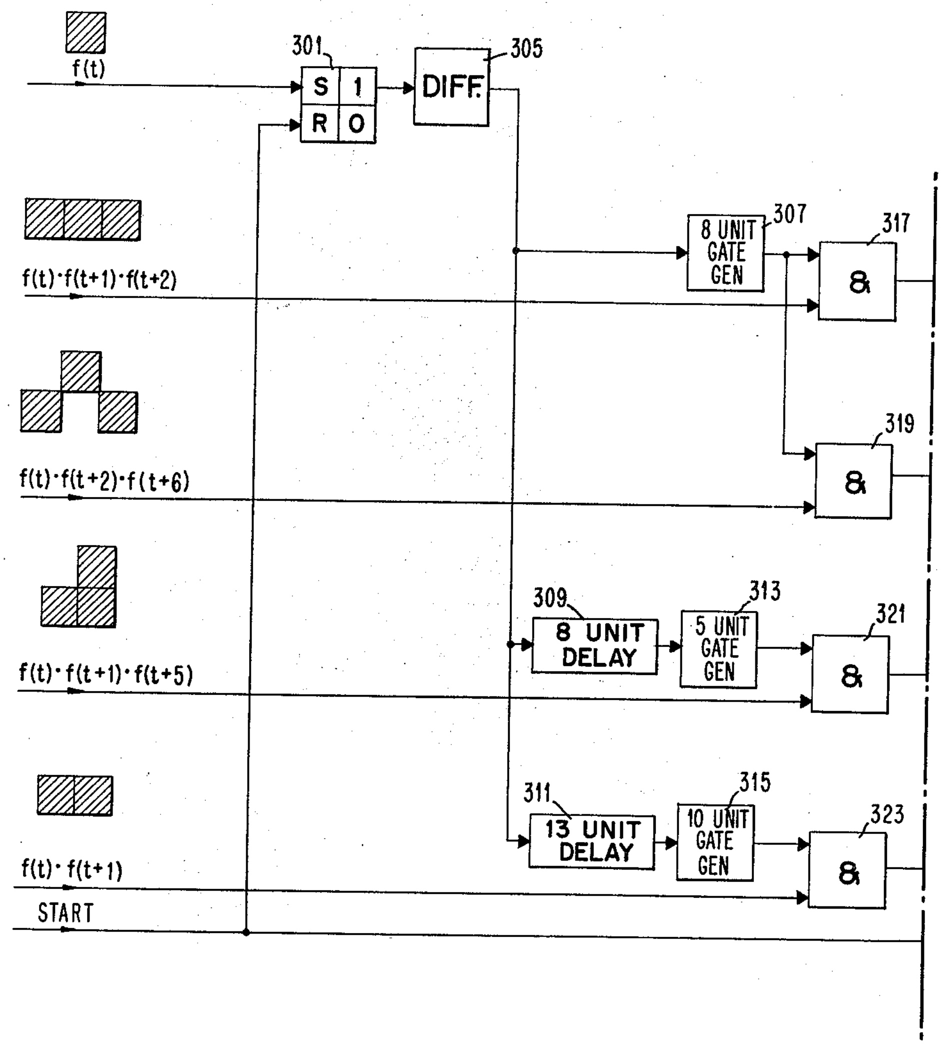
Figure 32:
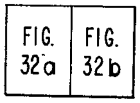
Figure 32B:
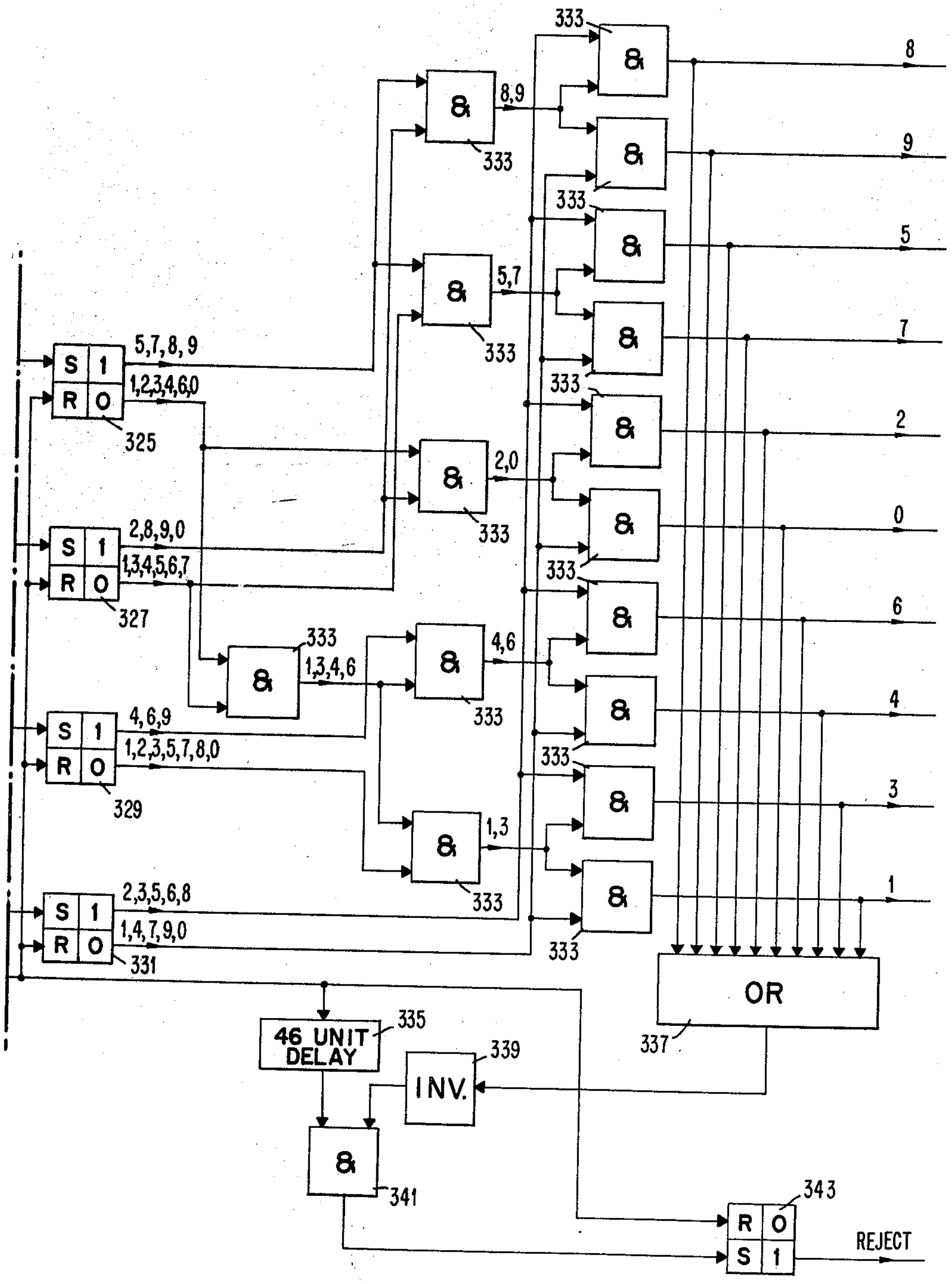

FIGURE 32 shows the relationship of FIGURES 32*a* and 32*b*.

Figure 4:
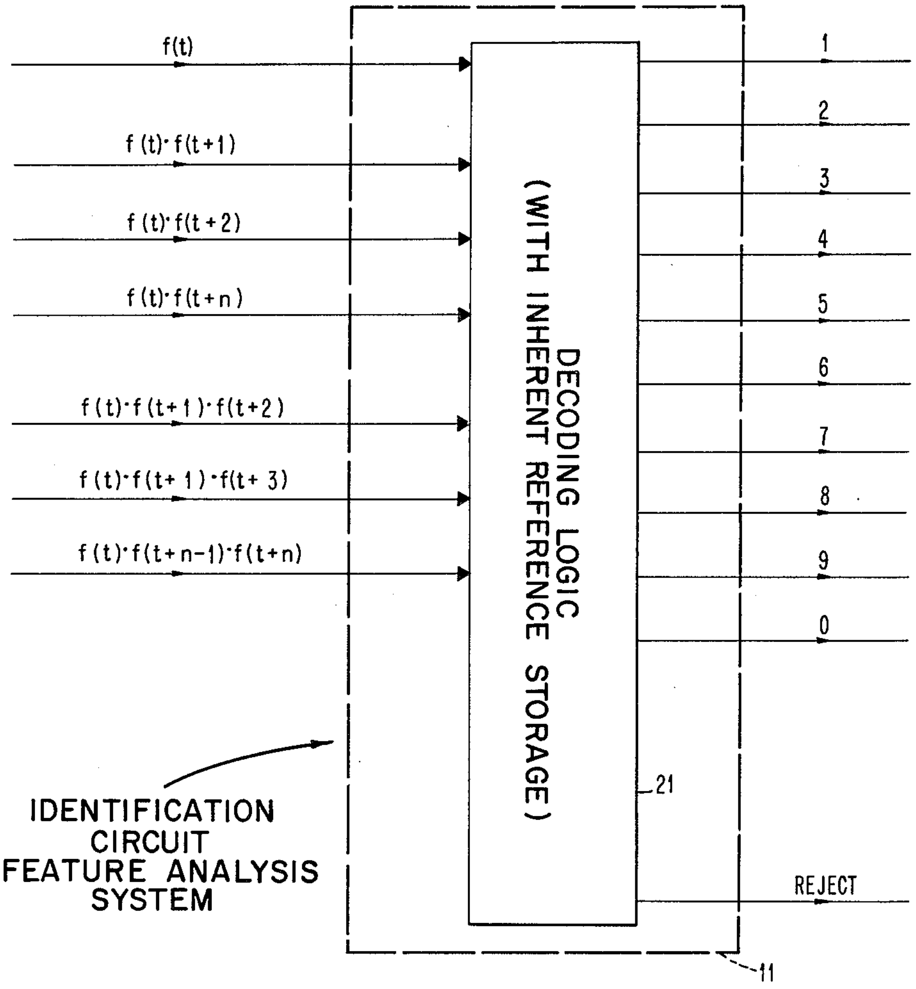
FIGURE 4 is a detailed block diagram of the feature analysis system identification circuits that is suitable for use in the general block diagram of FIGURE 1.

FIGURES 32*a* and 32*b* are detailed diagrams of a decoding logic circuit for the patterns shown in FIGURES 7 through 16 that is suitable for use in the identification circuit of FIGURE 4.

Figures 33, 33A:
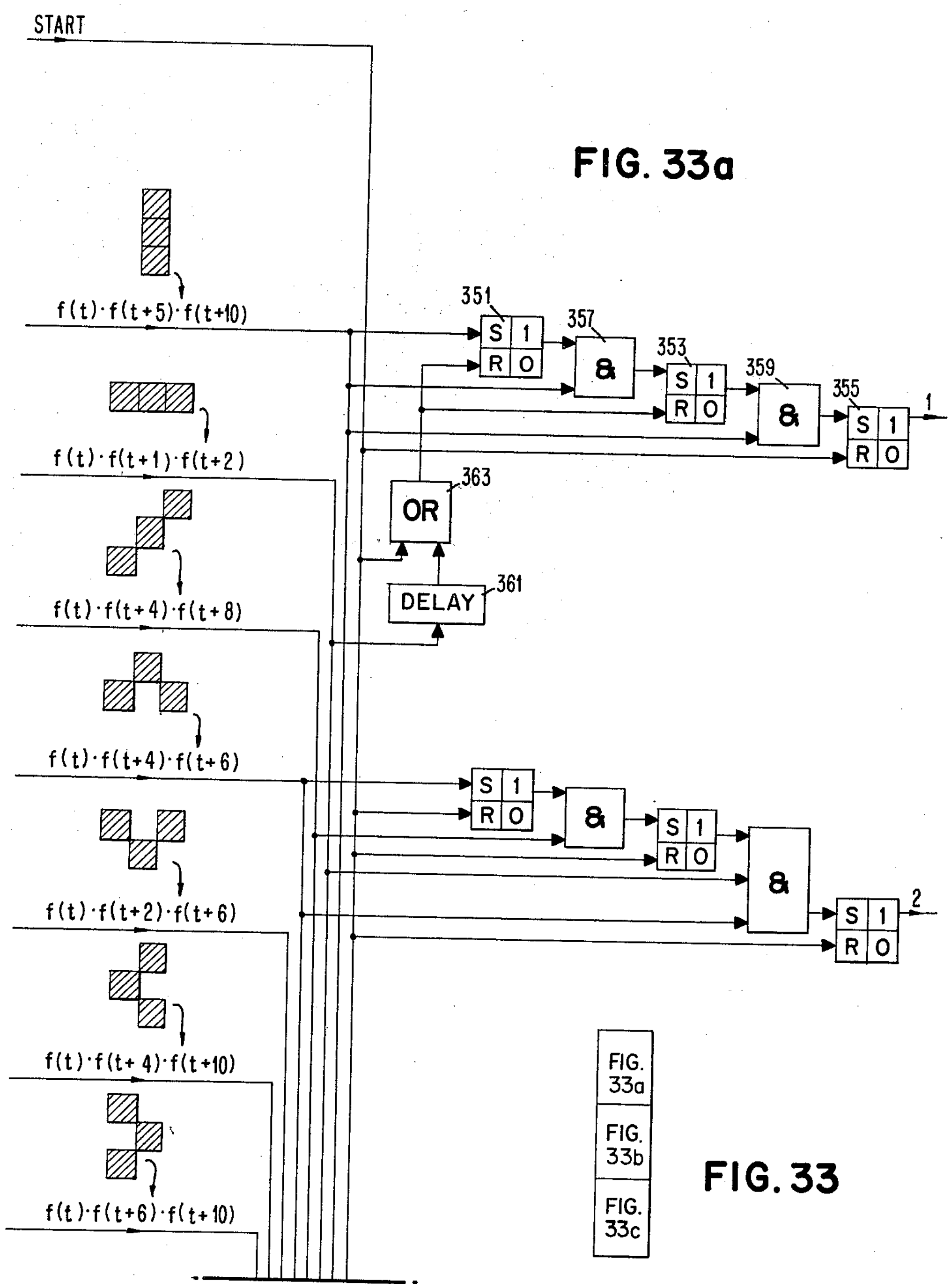
Figure 33B:
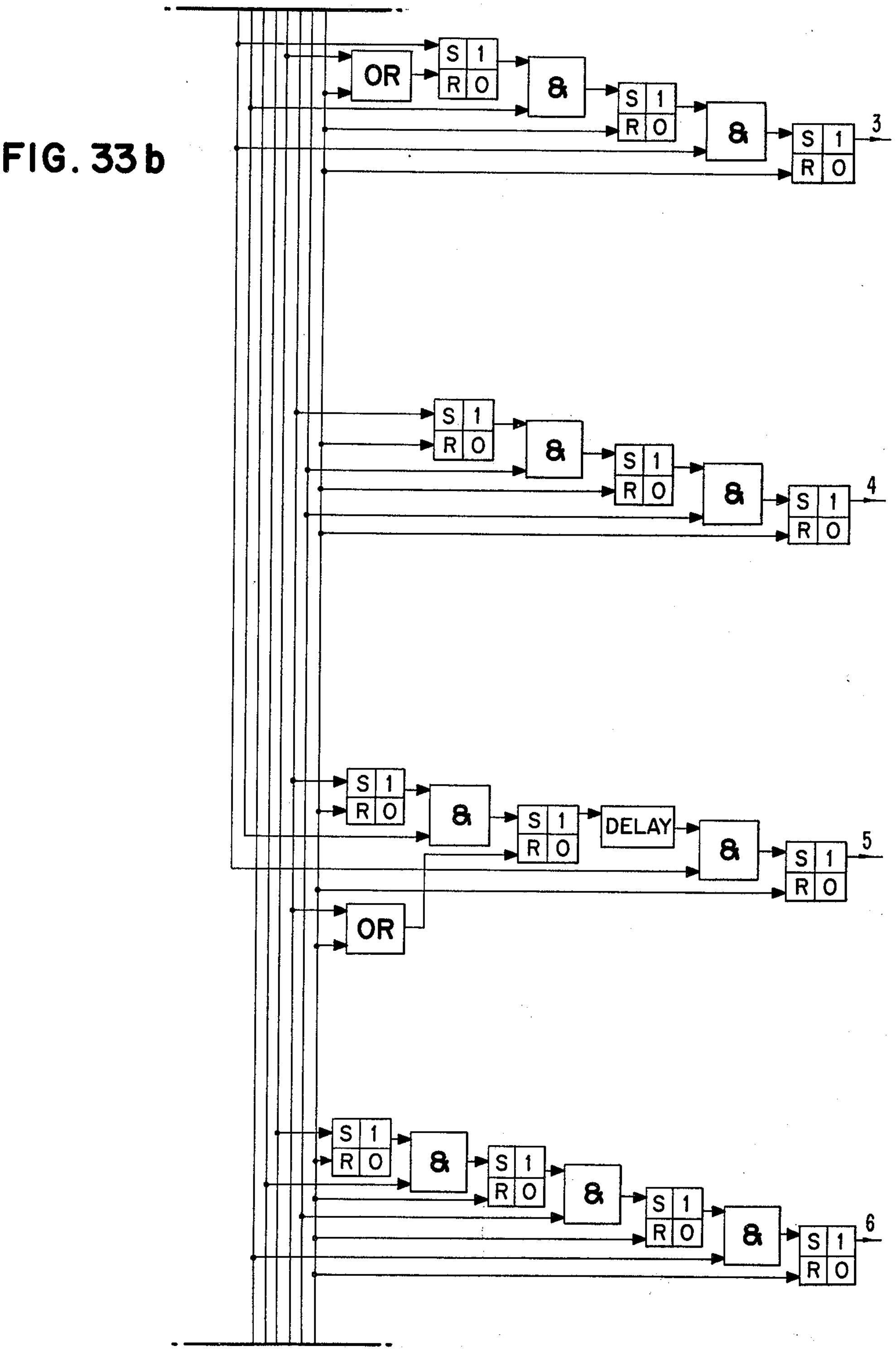
Figure 33C:
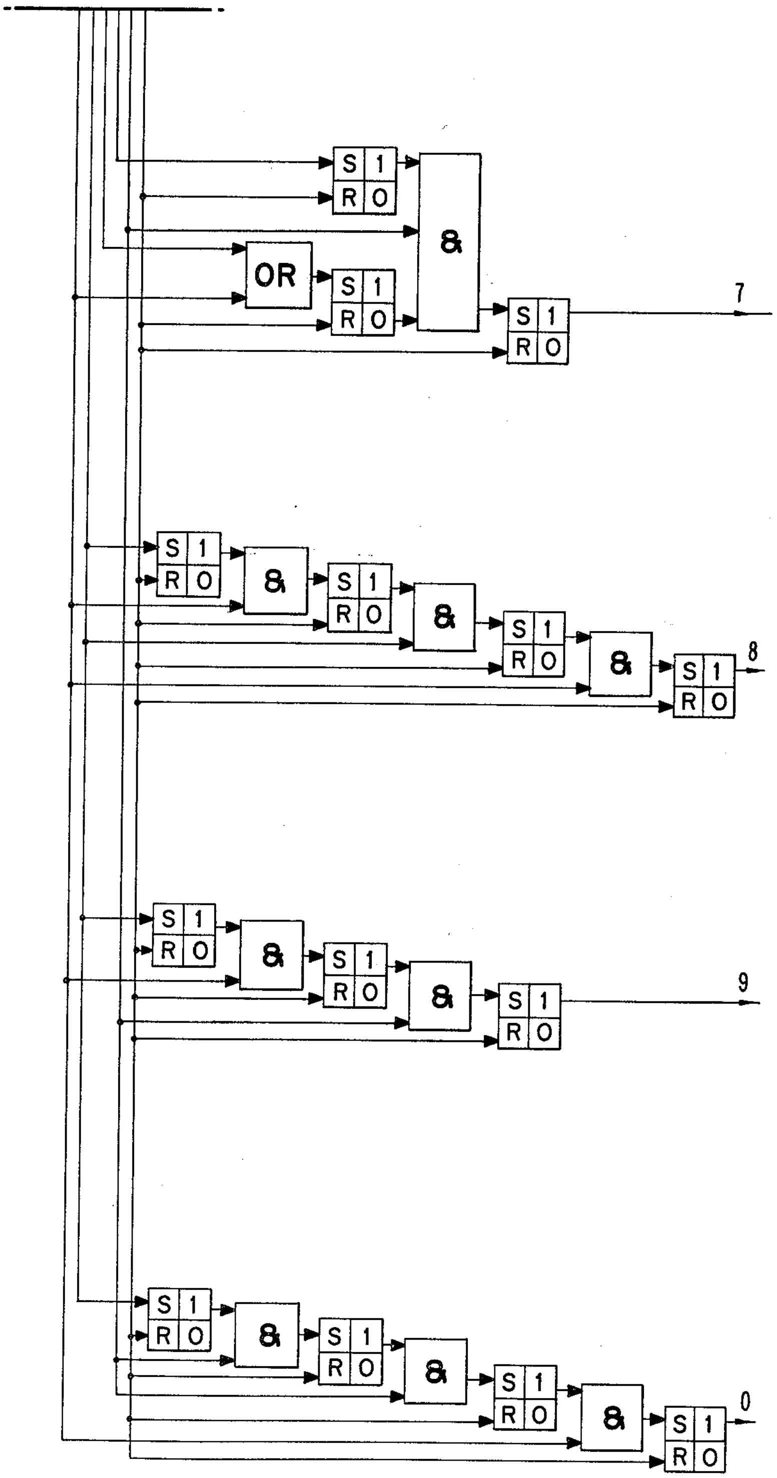

FIGURE 33 shows the relationship of FIGURES 33*a*, 33*b* and 33*c*.

FIGURES 33*a*, 33*b* and 33*c* are detailed diagrams of a second decoding logic circuit for the patterns shown in FIGURES 7 through 16, that is suitable for use in the identification circuit of FIGURE 4.

Figure 34A:
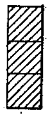
Figure 34A:
Figure 34A:
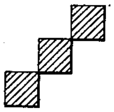
Figure 34A:
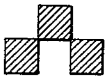
Figure 34A:
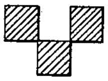
Figure 34A:
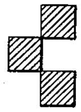
Figure 34A:
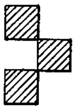
Figure 34:
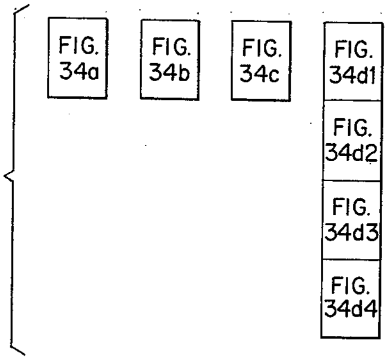

FIGURE 34 shows the relationship of FIGURES 34*a*, 34*b*, 34*c*, 34*d*1, 34*d*2, 34*d*3, and 34*d*4.

Figures of FIGURE 34 are a group of charts which outline the method of operation of a third decoding logic circuit that is suitable for use in the identification circuit of FIGURE 4.

Figures 35, 35A:
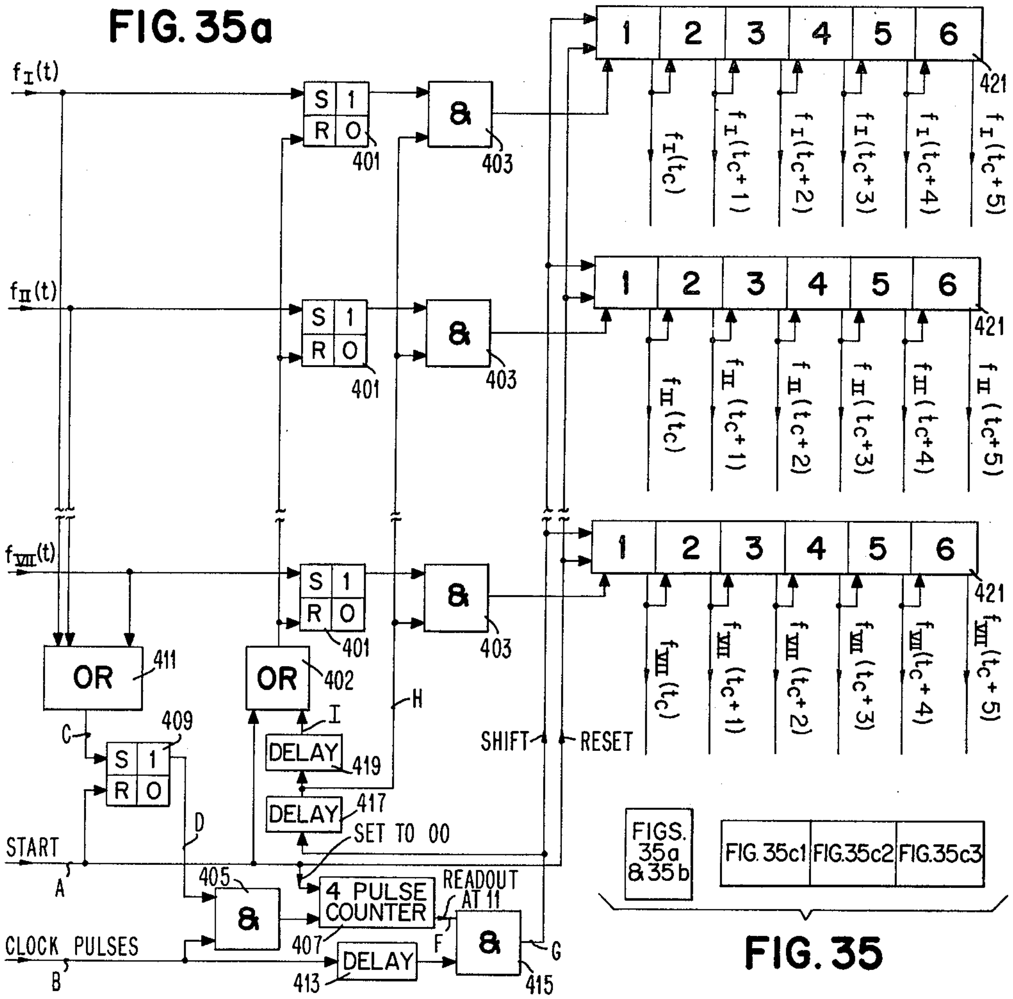

FIGURE 35 shows the relationship of FIGURES 35*a*, 35*b*, 35*c*1, 35*c*2, and 35*c*3.

Figures of FIGURE 35 are detailed diagrams of the third decoding logic circuit that is suitable for use in the identification circuit of FIGURE 4.

Figure 36:
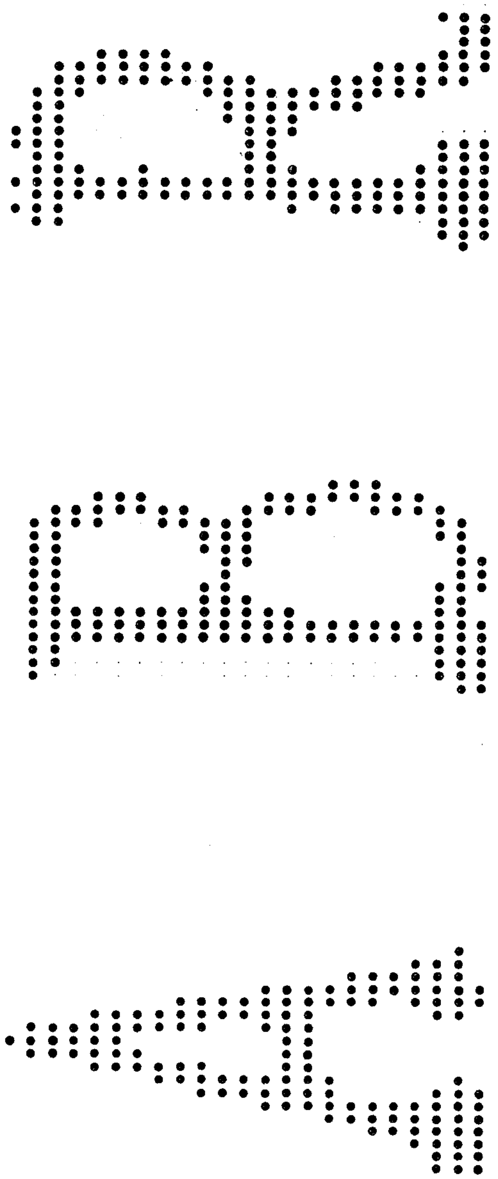

FIGURE 36 is a chart showing three typical high-resolution reference patterns: "A," "B" and "R."

Figure 37:
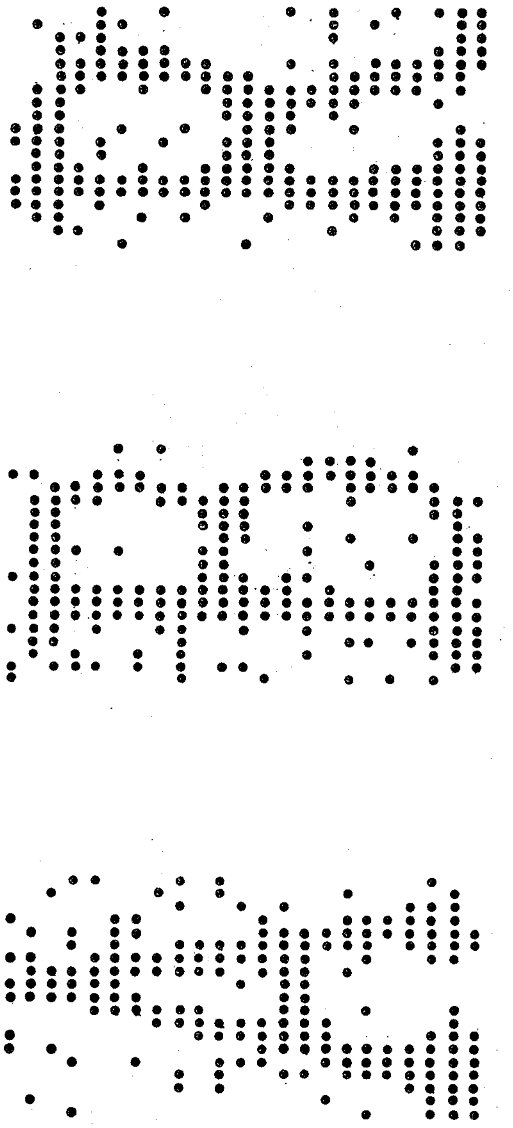
Figure 38:
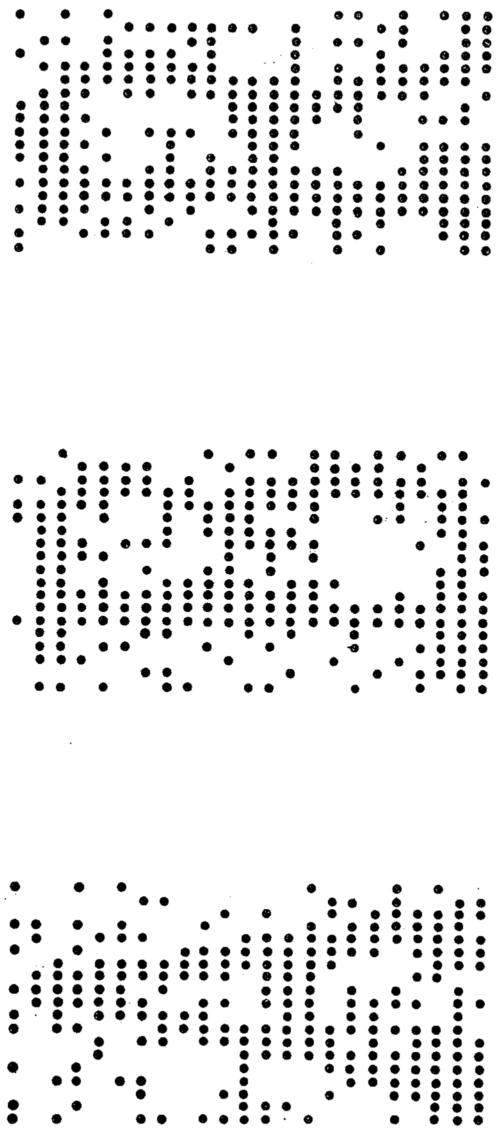

FIGURES 37 and 38 are charts showing degraded high-resolution test patterns "A," "B" and "R."

FIGURE 39 is a correlation chart showing the stability of the *n*-tuple system using the reference and test patterns shown in FIGURES 36, 37 and 38.

IV. *Block diagram description.*—The block diagram of FIGURE 1 is generic to all of the embodiments of the invention. The specimen 1 to be identified is shown to be located somewhere on a matrix 3. The size of the matrix and the number of elements in the matrix is controlled by the scanning device which is shown by way of example to include a flying-spot scanner 5 and a phototube 7. The variable $r$ used previously may be converted to the variable time $(t)$ if a one-to-one correspondence is maintained between the variables. The conversion is now made to permit analysis of the specimen as a function of time and the relationship is preserved by the technique to be used in converting the specimen to a function of time, as will be described below.

A binary time-varying electrical signal that is a function of time and representative of the specimen is generated by the phototube as the light beam scans the specimen and applied to an *n*-tuple generator 9 and an identification circuit 11. Each output lead from the *n*-tuple generator contains a series of pulses, each of which indicates the presence of a corresponding pair, triple, etc. of elements within the specimen signal. For example, the lead designated $f(t)\cdot f(t+1)$ contains a pulse when the specimen is present at two elements of the matrix that are adjacently scanned. If the matrix is scanned in a series of horizontal lines and the specimen is presumed to be a "3" as shown, then the signal $f(t)$ contains two pairs of adjacent bits, one corresponding to each two-element horizontal line (top and bottom) of the specimen "3" and the lead designated $f(t)\cdot f(t+1)$ contains two pulses. The sum of the pulses generated on those leads that represent two-element combinations is indicative of the first-order autocorrelation function of the specimen. Similarly the sum of pulses generated on the leads representing three-element combinations is indicative of the second-order autocorrelation function. In a like manner, all higher orders of the autocorrelation function may also be generated.

The identification circuit 11 provides an indication of the identity of the specimen based on the specimen signal $f(t)$ and the output signals from the *n*-tuple generator 9. A reject output is also provided to indicate that the specimen cannot be unequivocally identified.

While each type of system embodying of the invention uses an *n*-tuple generator 9, each type requires a distinct identification circuit 11. The *n*-tuple systems use an identification circuit 11 that is shown in block form in FIGURE 2. In these systems, identification is based on a comparison of various orders of the autocorrelation function of the specimen with corresponding functions of reference patterns. The block diagram is especially pertinent to the *n*-tuple system wherein all orders of autocorrelation functions that are generated participate in the comparison sums. In other embodiments, the comparison sums are calculated from a single order or group of orders of autocorrelation functions. The pulse trains that are generated by the *n*-tuple generators 9 (FIGURE 1) are summed in integrators 13 to provide signals indicative of various-order autocorrelation function of the specimen. These signals are applied to a reference storage and correlator circuit 15 which generates a comparison sum $S_{S,R_a}$ for each reference $R_a$ according to Formula (36). A maximum signal indicator 17 provides an indication of the identity of the specimen (or a reject indication) based on the largest of these sums. Obviously, the various orders of autocorrelation functions can be weighted differently during correlation or separate comparison sums for each order of autocorrelation function can be generated and weighted before combining.

The entropy systems contain identification circuits 11 that are shown in block diagram form in FIGURE 3. In these systems identification is based on a comparison of various orders of entropy functions of the specimen with corresponding functions of reference patterns according to Formula (37). The pulse trains that are generated by the *n*-tuple generator 9 (FIGURE 1) are summed in integrators 13 to provide signals that are indicative of various orders of autocorrelation functions of the specimen. These signals are applied to entropy generators 19, which, in turn, provide output signals that are indicative of corresponding orders of entropy functions of the specimen. A reference storage and correlator circuit 15 accepts the entropy signals and generates comparison sums which are applied to a maximum signal indicator 17 to provide an indication of the identity of the specimen.

In the feature analysis systems, selected *n*-tuples are applied to the identification circuit 11, shown in block diagram form in FIGURE 4, from the *n*-tuple generators.

This permits the use of a simplified $n$-tuple generator as the number of generator outputs is radically reduced.

Figure 5:
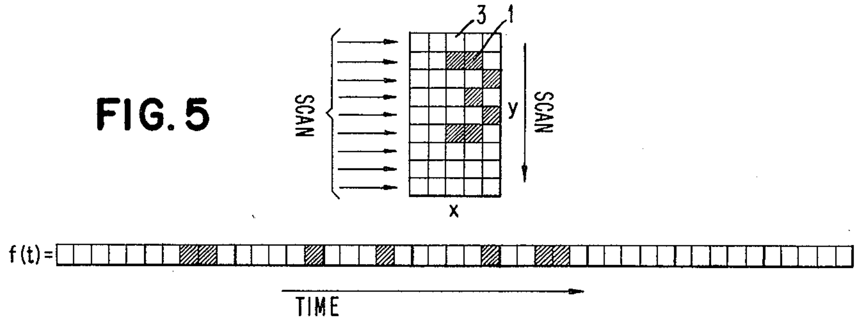
FIGURE 5 is an explanatory diagram showing the conversion from the variable $(x, y)$ to the variable $(t)$ for a typical pattern.
Figure 6:
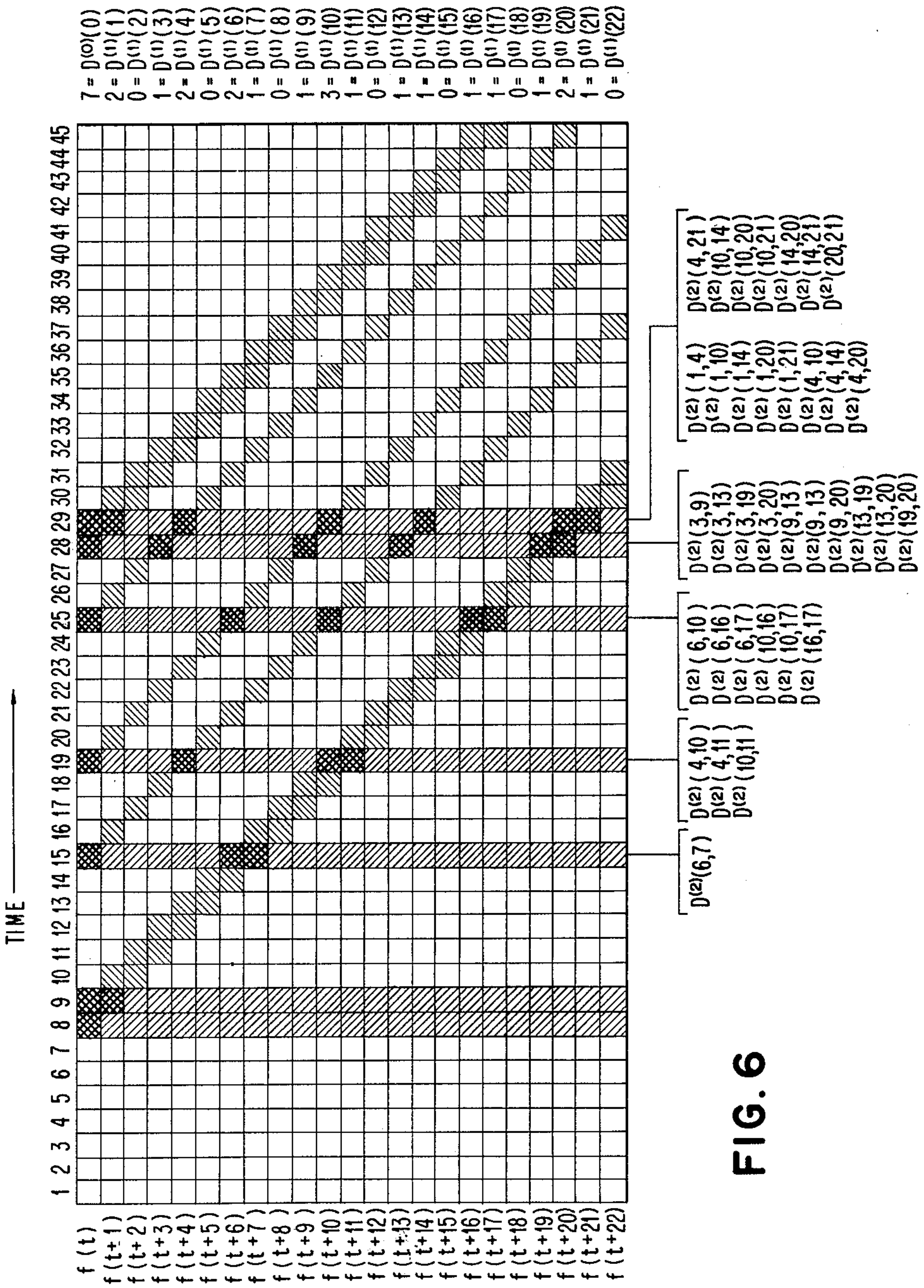
FIGURE 6 is an explanatory diagram showing the generation of the first-order (pairs) and second-order (triples) autocorrelation functions for the pattern shown in FIGURE 5.

*V. Detailed description*—(a) *Manual generation of Nth-order autocorrelation and entropy functions.*—The following description, with respect to FIGURES 5 and 6 provides a simple and practical technique for generating $n$th-order autocorrelation functions. This technique will be seen to readily lend itself to an electronic embodiment. FIGURE 5 shows a 3 x 5 specimen 1 (the arabic numeral "3") located on a 5 x 9 matrix 3 that is scanned by a succession of horizontal lines that cover the area of the matrix. The matrix may be swept by vertical lines if desired. The example specimen (numeral "3"), if swept horizontally provides a function of time $f(t)$ as shown in FIGURE 5. The design and operation of the $n$-tuple generator are simplified if the width of the scanning matrix is sufficiently greater than the width of the specimen to provide a number of blank columns equal to at least one less than the specimen width. In the example shown in FIGURE 5, a 3 x 5 specimen is scanned on a 5 x 9 matrix, which is adequate in size to fulfill this consideration for either horizontal or vertical scanning. The matrix may be made larger than shown without adversely affecting the operation of the system.

The function of time $f(t)$ for the example specimen (numeral "3") is repeated as the top row of the diagram in FIGURE 6. This function is incrementally delayed in time to provide $f(t+1)$, $f(t+2)$, etc., as indicated by the areas containing slant-right lines in the corresponding rows on the diagram. The original function $f(t)$ is projected vertically using slant-left lines. Those areas containing both slant-right and slant-left lines are indicative of non-zero products $f(t)\cdot f(t+t^{(1)})$. The sums of these products are the elements of the first-order autocorrelation function sums $D^{(1)}(t^{(1)})$ and are indicated to the right of the chart. The elements of the second-order autocorrelation function sums $D^{(2)}(t^{(1)}t^{(2)})$ may also be selected from the chart by observing those columns that contain three or more areas containing both slant-right and slant-left lines. For example, at time 15, $f(t)$, $f(t+6)$ and $f(t+7)$ are present (not zero) indicating an element of the second-order autocorrelation function $D^{(2)}(6, 7)$. The remaining elements of this function for the example specimen are indicated below the diagram. It can be noted that one element $D^{(2)}(4, 10)$ appears twice indicating that the example pattern contains a recurring triple which is observable in FIGURE 5 to be the triple that is present at the two curved areas of the numeral "3."

The various-order autocorrelation functions can be generated using the technique based on FIGURE 6 if sufficient zeros are present between rows of scanned specimen data. The number of zeros were automatically introduced in the example by the provision of a scan matrix having a dimension in the direction of scan that exceeds the corresponding dimension of the specimen by one less than the specimen dimension (or greater). Thus if an M x N specimen that is scanned in the N direction is located on a M x $(2N-1)$ matrix, sufficient zeros are present to enable the technique based on FIGURE 6 to be used to generate the various-order autocorrelation functions. The matrix shown in FIGURE 5 has a size $[(2M-1) \times (2N-1)]$ to provide adequate zeros regardless of the scan direction.

Adequate zeros are required between rows of scanned specimen data to preserve the one-to-one correspondence between the variables $r$ and $t$ or incorrect autocorrelation function sums may be generated. Consider the examples of two pairs of bits in a horizontally-scanned 3 x 5 specimen where the first pair of bits are adjacently located along a horizontal scan line and the second pair of bits comprises a bit at the end of one scan line and another at the beginning of the next scan line. These pairs are distinguished in the $r$ plane, where the first is represented by $f(r)\cdot f(r+r^{(1)})$ corresponding to $f(x, y)\cdot f(x+1, y+0)$ and the second by $f(r)\cdot f(r+r^{(2)})$ corresponding to $f(x, y)\cdot f(x+2, y+1)$.

If no zeros were added between rows of specimen data, these distinct pairs would be ambiguously represented by $f(t)\cdot f(t+1)$. By the addition of two zeros, the first pair is represented by $f(t)\cdot f(t+1)$ and the second by $f(t)\cdot f(t+3)$, and the one-to-one correspondence is maintained.

Obviously the required zeros could be added to the specimen data using other methods, but the registration invariant property of the system makes it feasible to scan the specimen over an area that is greater than the actual specimen area anyway, so all conditions are simply satisfied by merely providing a scanning matrix that exceeds the specimen size by the amount required to permit the use of the technique based on FIGURE 6. If a scanning matrix that is larger than the minimum required for this technique, certain first-order autocorrelation function sums are always zero. Those sums that are trivial (always zero) are related to the dimension of the specimen N and the dimension of the matrix P in the scanning direction and occur for pairs $$f(t)\cdot f(t+k(P-N)+c) \quad (38)$$

where $k$ and $c$ are positive integers and $$k>0$$
$$0\geqq c\geqq P-2N$$

The total number of non-redundant and non-trivial first-order autocorrelation function sums $D^{(1)}(t^{(1)})$ is dependent upon the specimen size M x N and is independent of the size of the scanning matrix. This number may be defined as:

$$\frac{(2M-1)(2N-1)-1}{2} \quad (39)$$

There is also one zero-order autocorrelation function sum $D^{(0)}$ which represents the sum of the specimen bits.

The total number of non-redundant and non-trivial $n$th-order autocorrelation function sums $$D^{(n)}(t^{(1)}, \ldots t^{(n)})$$

for an M x N specimen equals $$C^{MN}_{n+1} - C^{(M-1)N}_{n+1} - C^{M(N-1)}_{n+1} + C^{(M-1)(N-1)}_{n+1} \quad (40($$

where $C_{n+1}^{K}$ represents the number of K things taken $n+1$ at a time which equals:

$$\frac{K!}{(n+1)!(K-n-1)!}$$

The particular sums that are trivial in the second-order autocorrelation function may be defined as those where:

$$t_2 = n + \left[w - \frac{1}{2}\right] - \frac{w}{2|w|} - \frac{Kw}{|w|} + c(2n-1) \quad (41)$$

where $w=t_1-k(2n-1)$; $w\neq 0$; $c$ and $k$ are integers; $c>0$; and $k$ is selected such that: $-(n-1)\leqq w\leqq (n-1)$.

The locations of the trivial higher-order autocorrelation function sums can be determined by extending the preceding formula or by experimentation. (One method of determining this is to use a specimen that is black throughout and generate all trivial and non-trivial sums. Any of these sums that are zero are indicative of the trivial sums.) This invention may also be practiced using an n-tuple generator that generates all trivial and non-trivial sums because the trivial sums do not adversely affect the system.

Nth-order entropy functions can be calculated from $n$th-order autocorrelation functions using Formula (15), substituting $t$ for $r$. The following procedure for generating the second-order entropy function for the pattern "3" (FIGURE 5) is based on the triples shown in FIGURE 6. One triple is shown to occur twice $$[D^{(2)}(4, 10)]$$

and 33 triples are shown to occur once. Since there are $(n+1)!$ total (redundant and non-redundant) $n$-tuples for each non-redundant $n$-tuple, there are $33\times6=198$ total triples that occur once and 6 that occur twice. Using the formula, the following calculation is obtained:

$$-\left\{198\left[\frac{1}{\frac{7!}{4!}}\ln\frac{1}{7}\right]+6\left[\frac{2}{\frac{7!}{4!}}\ln\frac{2}{7}\right]\right\}=1.91$$

where 7 is substituted for $D^{(0)}$ and 2 for $n$.

Figure 8:
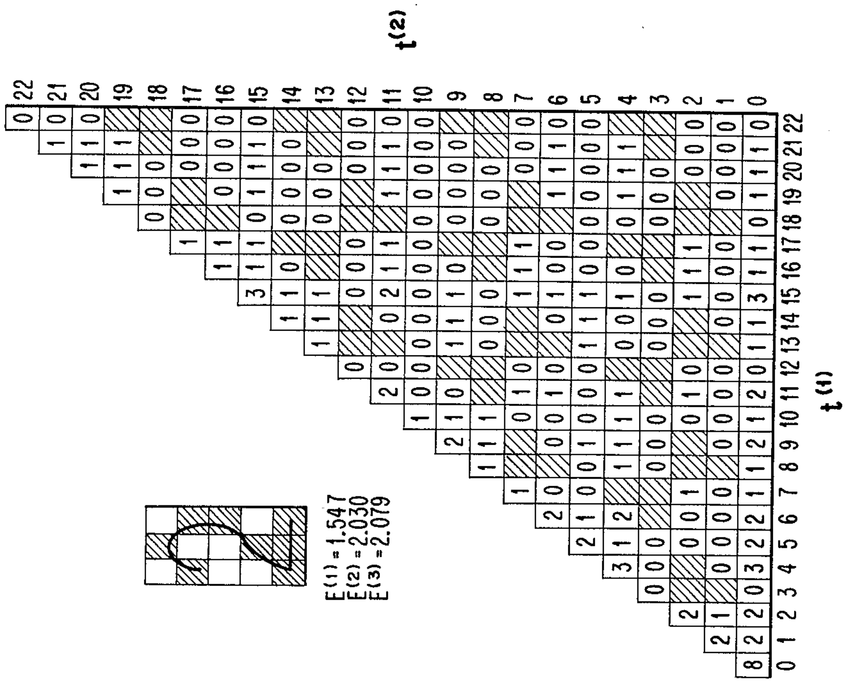
FIGURES 7 through 16 are charts indicating ten low-resolution reference patterns and their first-order and second-order autocorrelation functions and entropy functions.
Figure 7:
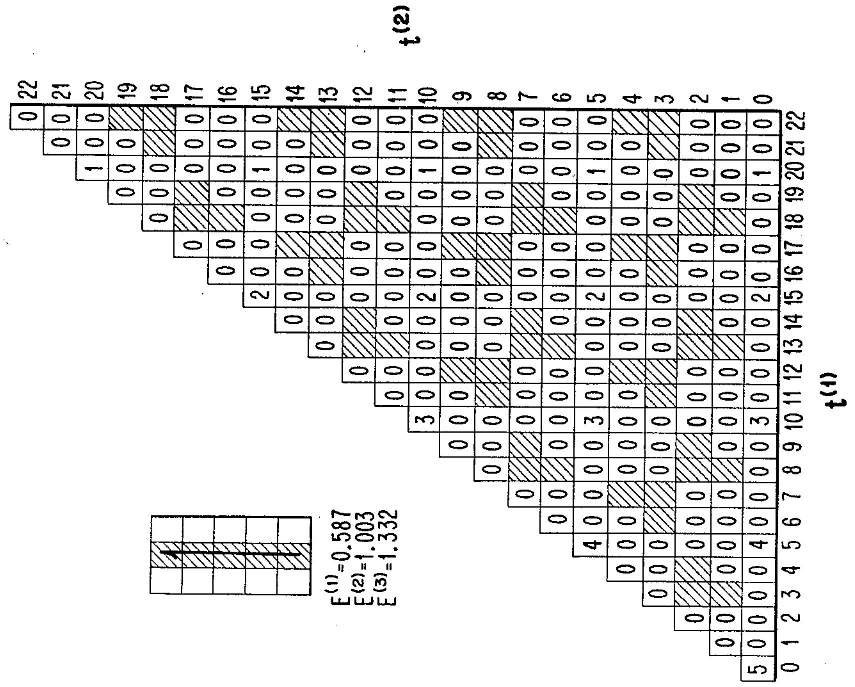
Figure 10:
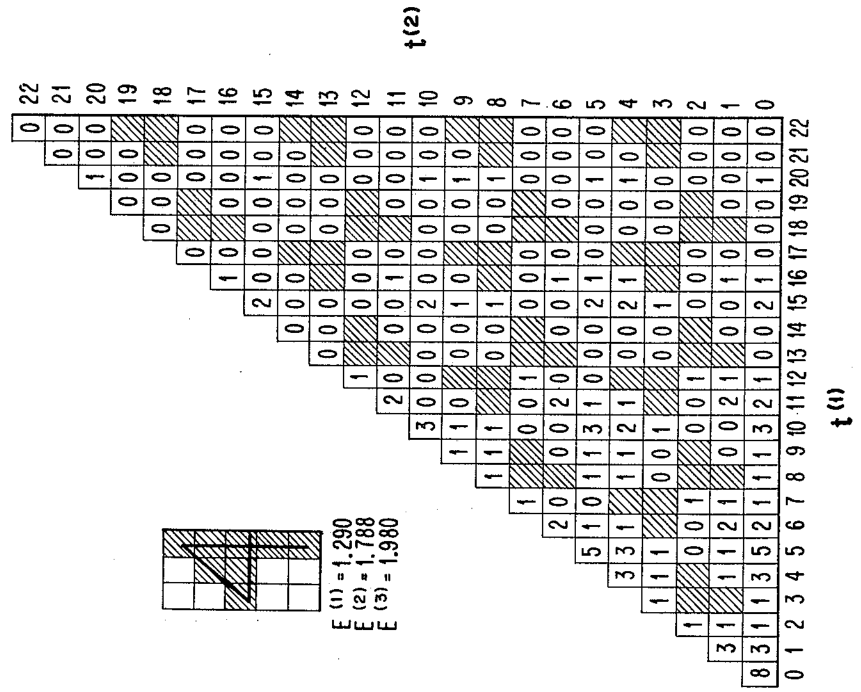
Figure 9:
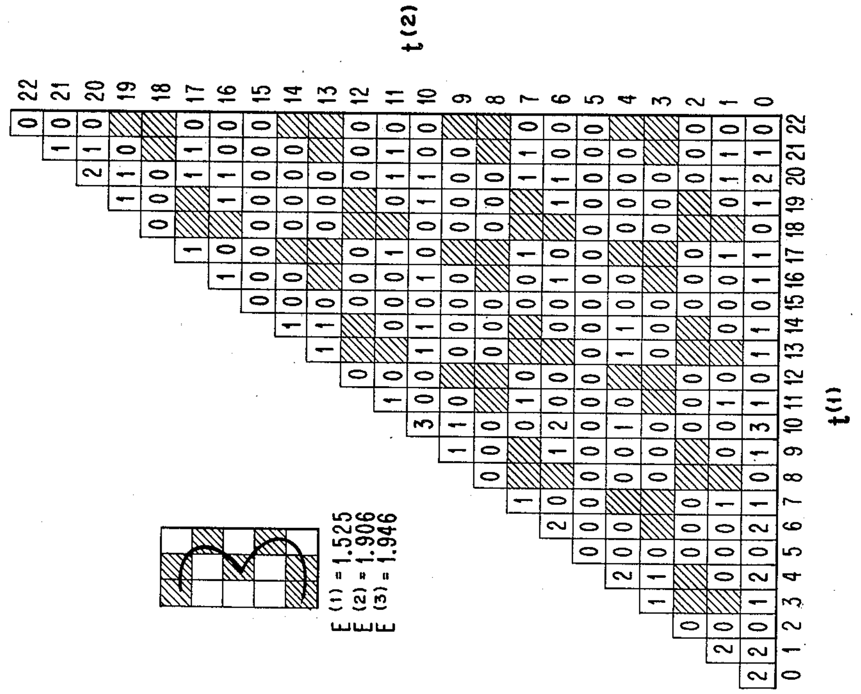
Figure 12:
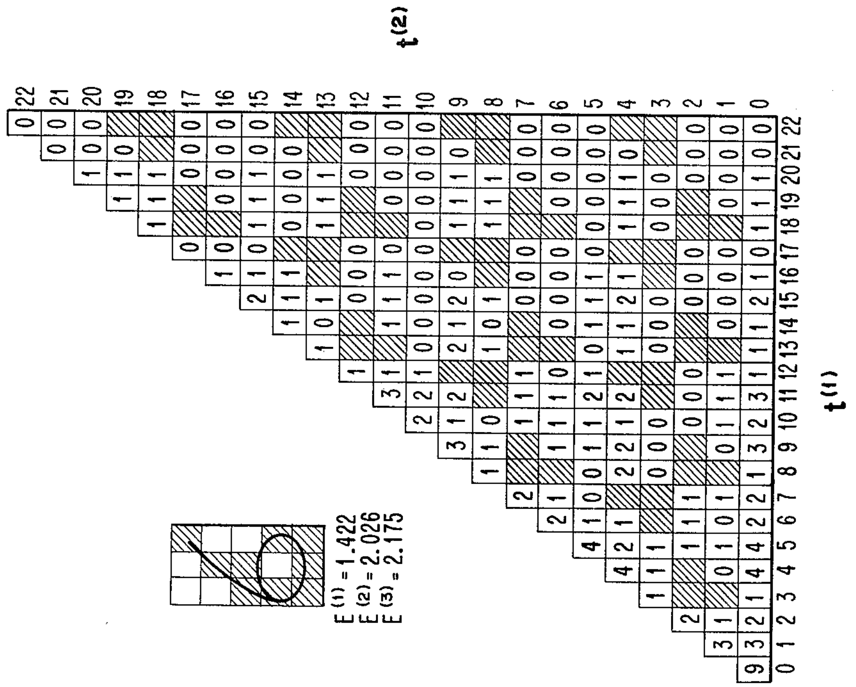
Figure 11:
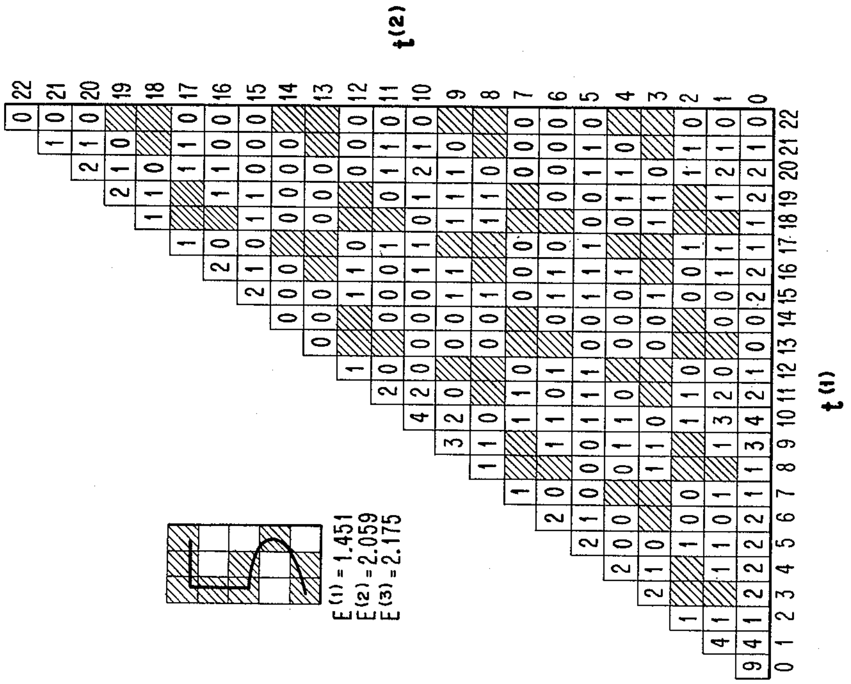
Figure 14:
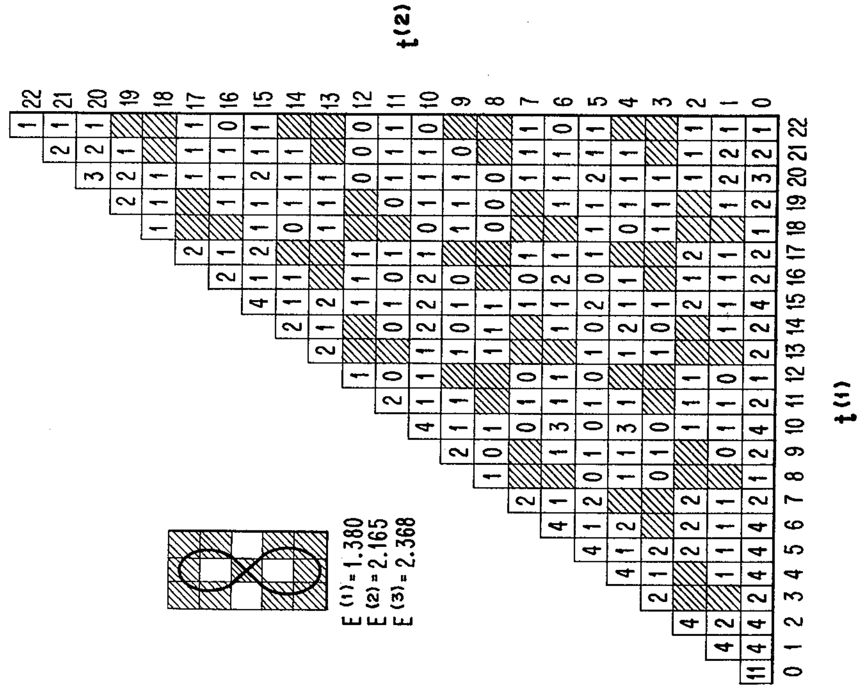
Figure 13:
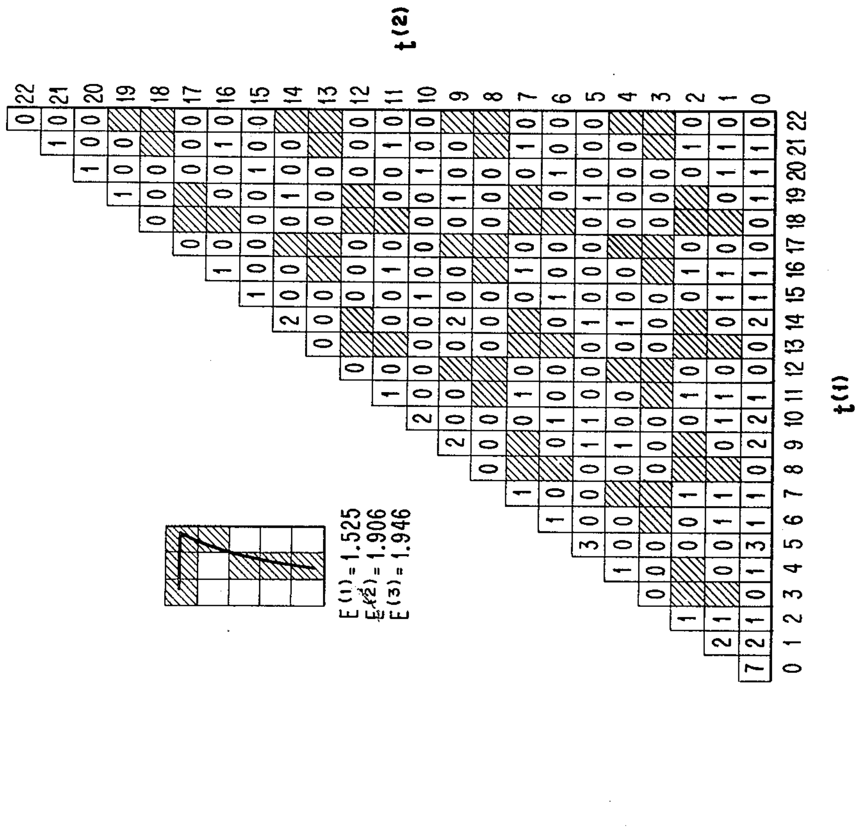
Figure 16:
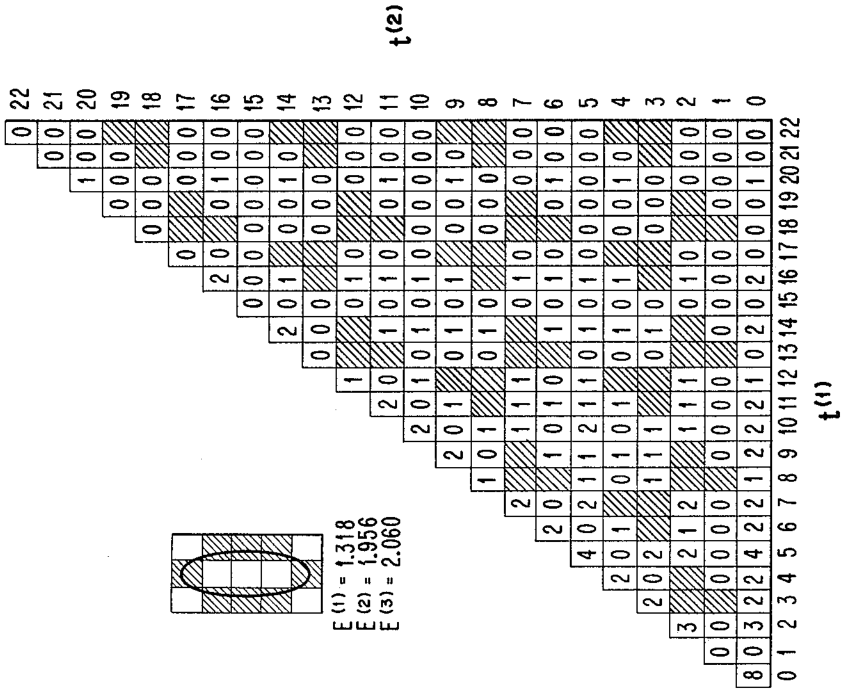
Figure 15:
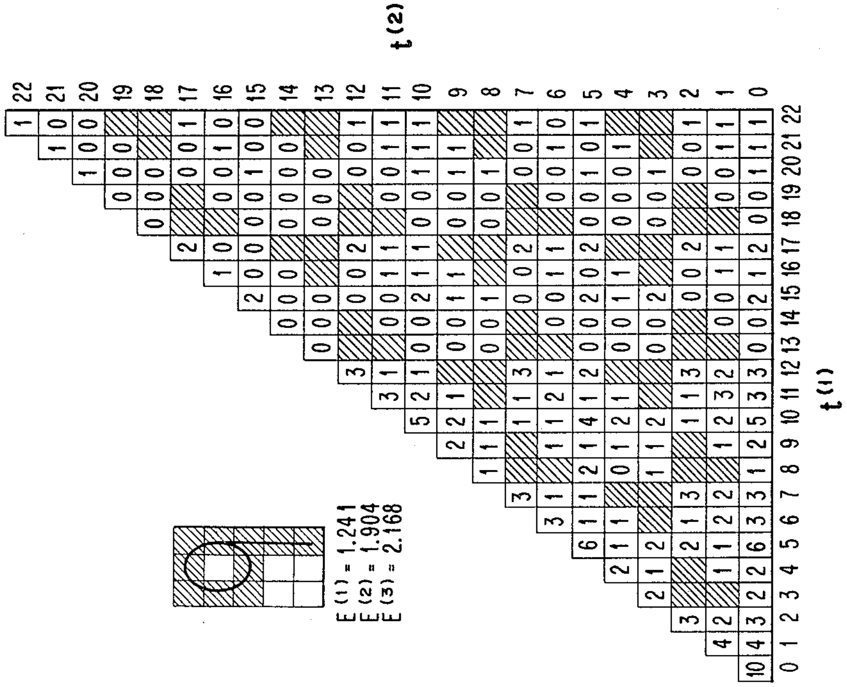

Ten 3 x 5 reference patterns (arabic numerals) and their first-order and second-order autocorrelation functions and their first, second and third-order entropy functions are shown in FIGURES 7 through 16. The first-order autocorrelation functions appear along the bottom rows of the charts, corresponding to the various values of $t^{(1)}$, where $t^{(2)}$ equals zero. These functions also appear along the diagonals of the chart where $t^{(1)}$ equals $t^{(2)}$. In both of these cases, the second-order autocorrelation function generates into a first-order function. This first-order function would also appear as the column corresponding to $t^{(1)}=0$ if the charts were extended above their diagonals. The charts have been abbreviated in this respect because the elements on one side of the diagonals are reflections of the elements on the other side. The elements of the second-order autocorrelation function for the reference pattern "3" shown in FIGURE 9 can be observed to be those shown below the chart in FIGURE 6. The result of the second-order sample entropy calculation (1.91) is also shown in FIGURE 9.

This technique based on FIGURE 6 may obviously be extended to generate third-order autocorrelation functions merely by listing the four-point combinations appearing in the various columns. The cross-hatched areas on the charts (FIGURES 7 through 16) indicate the trivial second-order autocorrelation function sums. The data provided in FIGURES 7 through 16 for ten reference patterns is directly used to establish the parameters in the $n$-tuple system and forms the basis from which the parameters in the entropy system and the design of the feature analysis system are established.

(b) *Basic symbols and circuits.*—The detailed diagrams to be described below, include several symbols for circuits which are now described in detail with respect to FIGURES 17 through 27.

Four texts that provide a basic introduction to digital and analog computer circuits as well as typical circuits that can be used in the practice of this invention are: Digital Computer Components and Circuits by R. K. Richards, published by D. Van Nostrand Company, 1957; Analog and Digital Computer Technology by Norman R. Scott, published by the McGraw-Hill Book Company, 1960; Arithmetic Operations in Digital Computers by R. K. Richards, published by D. Van Nostrand Company, 1955; and Analog Computer Techniques by Clarence L. Johnson, published by the McGraw-Hill Book Company, 1956.

Figure 17:
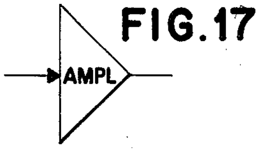
FIGURES 17 through 27 are diagrams of symbols and circuits that are suitable for use in the detailed diagrams of FIGURES 28 through 32.
Figure 18:
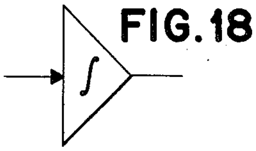
Figure 19:
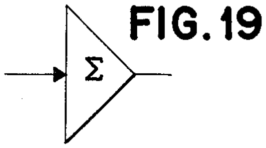

FIGURE 17 shows the symbol for a conventional analog amplifier. FIGURE 18 shows the symbol for an analog integrator of the type shown and described in the Scott reference at page 9. A summing amplifier of the type shown and described in the Scott reference at page 7 is shown in block form in FIGURE 23. The amplifier, integrator and summing amplifier shown in FIGURES 17, 18 and 19 respectively, contain one stage of amplification, and hence provide outputs that are inverted functions of their inputs.

Figure 20:
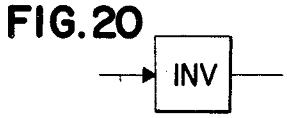
Figure 21:
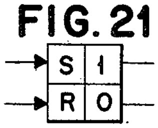

FIGURES 20 through 25 show symbols for various basic digital circuits. FIGURE 20 shows an inverter which generates a binary output signal which is opposite to its binary input signal. If the two binary conditions are labelled "1" and "0," a "1" input causes a "0" output and a "0" input causes a "1" output. FIGURE 21 shows a basic bistable circuit, which is referred to as a flip-flop. The flip-flop is set by applying a signal to the set (S) input. This provides a binary "1" level at its "1" output and a "0" level at its "0" output. This circuit is reset by applying a signal to the reset (R) input which provides a "0" level at its "1" output and a "1" level at its "0" output. There is no effect on the circuit if an "S" input is applied when a circuit is already set, or if an "R" input is applied when previously reset.

Figure 22:
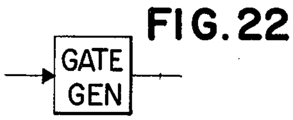
Figure 23:
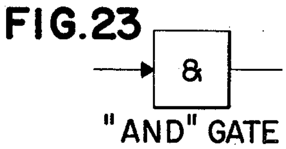

The symbol for a gate generator is shown in FIGURE 22. This circuit generates a binary "1" level for a period of time immediately after the application of an input signal and generates a "0" level at all other times.

Figure 24:
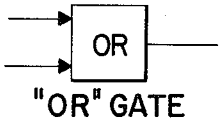
Figure 25:

An "and" gate, as shown in FIGURE 24, provides a "1" output if all inputs receive signals "1" at the same time. An "or" gate, as shown in FIGURE 25, provides a "1" output if any input receives a "1" signal. A delay circuit, as shown in FIGURE 26, passes signals applied to its input after a period of time, without affecting their shape or amplitude.

Figure 26:
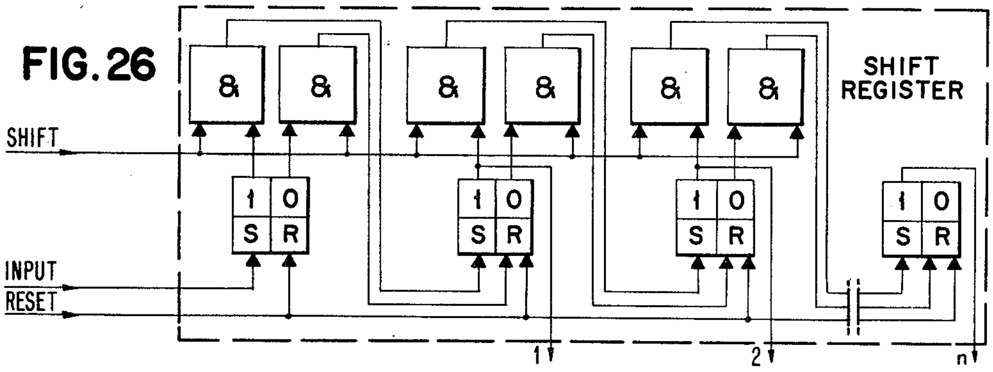

A shift register is shown in FIGURE 26. This register is comprised of a group of shift register "sections" in tandem. The previously-cited R. K. Richard's text entitled Arithmetic Operations in Digital Computers contains an explanation of these and other shift register sections on pages 144–148. A reset input is applied to each flip-flop in the register. The data input to the shift register is applied serially to the set input of the lowest-order flip-flop. Shift pulses are applied to the shift register in between each input data bit. These pulses condition the "and" gates which cause the data stored in each flip-flop to be transferred to the next highest order flip-flop. Outputs are provided to indicate the data in the various orders of the register.

Figure 27:
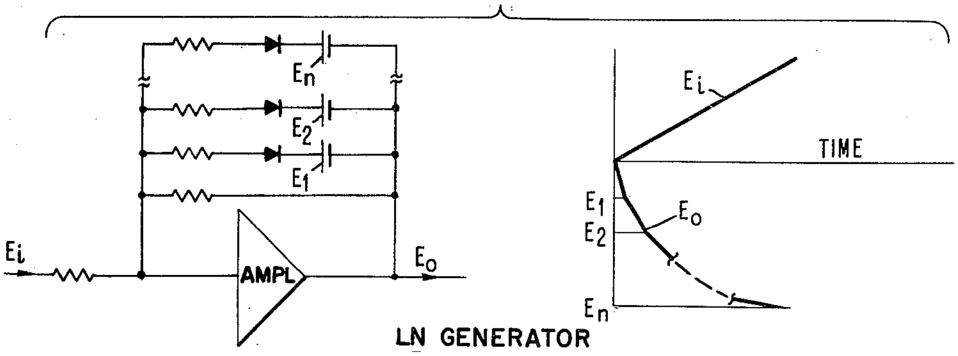

The natural logarithmic (base $e$) generator shown in FIGURE 27 contains an amplifier and a group of feed-back resistances. There are several feed-back paths—all but one contain a diode and a battery. Each battery supplies a voltage that is different from the voltages applied by the other batteries (as shown on the waveshape). The number of feed-back resistances that have an effect on the circuit is dependent upon the amplitude of the input voltage. That is, as the input signal increases (in a positive direction) the back-bias voltages on the diodes (caused by the batteries) are successively overcome and the diodes conduct, placing additional feedback paths in the circuit. The shape of the output voltage depends upon the shape of the input voltage (shown, for example, as a sloped line), the battery voltages and the resistance of the feed-back resistors. By using a large number of feed-back paths with appropriate components, an output voltage waveform comprising a larger number of short straight lines is generated which approximate a natural logarithmic function of the input signal. A circuit similar to this is shown on page 154 of the previously-cited Johnson reference.

An analog-multiplier-divider that is suitable for use in the detailed circuits is shown in FIGURE 8–2 of the previously-cited Johnson reference.

(c) *Specimen scanner and N-tuple generator circuit.*—An $n$-tuple generator 9 that is suitable for use in all embodiments of the invention is shown in FIGURE 28*b* and *c*. This circuit generates the products that make up the zero-order, first-order, and second-order autocorrelation function sums, namely $f(t)$; $f(t)\cdot f(t+t^{(1)})$; and $f(t)\cdot f(t+t^{(1)})\cdot f(t+t^{(2)})$. For the sake of simplicity of explanation, all such products are generated, including those second-order autocorrelation function elements that have been shown to be trivial (such as $$f(t)\cdot f(t+1)\cdot f(t+3))$$

The circuits shown in FIGURE 28 have been drawn with an orientation that renders an extension to higher-order-$n$-tuples obvious.

An input scanning device, including the control circuits that are necessary to present the specimen data in the proper form to be utilized by the $n$-tuple generator, are shown on FIGURE 28*a*. The specimen 1 on the matrix 3 is scanned by a beam of light generated by a flying-spot scanner 5. A phototube 7 receives the light reflected by the matrix and generates a time-varying voltage whose amplitude is dependent upon the amount of light impinging upon the tube. The matrix 3 does not exist as such, but rather, represents the area of the surface (e.g. paper) that is scanned. The scanning device is not limited to the structure shown, but can be selected from the myriad of available input transducers.

The control circuits are responsive to clock pulses which occur with a pulse repetition time of "1 unit" on a lead 101, and to a start pulse which occurs at the beginning of each identification cycle on a lead 103. The start pulse triggers a 1-unit gate generator 105 which provides a conditioning level to an "and" gate 107. The first clock pulse that occurs after the start pulse is passed by the "and" gate and applied as a synchronizing signal to a vertical sweep generator 109 and to a horizontal sweep generator 111. The output signals from these circuits are applied to the deflection circuit of the flying-spot scanner 5 to control the position of the scanning light beam. In this embodiment, the specimen is scanned by a raster of horizontal lines. The vertical sweep generator provides one relatively low frequency sweep voltage each time it is synchronized. A free-running horizontal sweep generator is used, having sufficient frequency stability to remain in synchronization during all of the sweeps within one raster.

The clock pulse passed by "and" gate 107 is also used to trigger a 44-unit gate generator 113 which provides a conditioning level to an "and" gate 115. This gate passes the forty-four clock pulses that immediately follow the pulse passed by "and" gate 107, and the entire forty-five clock pulses are applied through an "or" gate 117 to condition an "and" gate 119.

The phototube 7 output is sampled at forty-five intervals of time, corresponding to the forty-five elements of the scanning matrix 3, by the "and" gate 119. The specimen data passed by the "and" gate is applied to the *n*-tuple generator 9 through a ½ unit delay 121 and is labelled "$f(t)$". The forty-five clock pulses passed by the "or" gate 117 are applied to the *n*-tuple generator through a 1-unit delay 123 and are labelled "shift." The first clock pulse after the start pulse (from "and" gate 107) is also applied to the *n*-tuple generator and is labelled "reset." Thus, the *n*-tuple generator is reset at the beginning of each identification cycle and then the specimen data $f(t)$ is sequentially applied, with a shift pulse occuring between each bit of the specimen data.

The *n*-tuple generator 9 (FIGURES 28*b* and *c*) is comprised of an *n*-bit shift register 125 and two groups of two-input "and" gates 127 and 129. The operation of this circuit is based on the technique outlined with respect to FIGURE 6. The specimen data signal $f(t)$ is applied as the input to the shift register and each output represents $f(t+t^{(1)})$ where $t^{(1)}$ varies from 1 through 22 for a 3 x 5 specimen on a 5 x 9 matrix and from 1 through $[(2m-1)(2n-1)-1]/2$ for an $m$ x $n$ specimen located on a $(2m-1)$ x $(2n-1)$ matrix.

Each element of a first-order autocorrelation function sum $f(t)\cdot f(t+t^{(1)})$ is generated as the output of the "and" gate 127 which are applied $f(t)$ and the appropriate $f(t+t^{(1)})$. Each element of a second-order autocorrelation function sum $f(t)\cdot f(t+t^{(1)})\cdot f(t+t^{(2)})$ is generated as the output of the "and" gate 129 to which are applied $f(t)\cdot f(t+t^{(1)})$ (generated by the appropriate "and" gate 127) and the appropriate $f(t+t^{(2)})$ from the shift register 125.

The *n*-tuple generator 9 can obviously be extended to generate elements of higher-order autocorrelation function sums by the use of additional two-level "and" gates to which the appropriate signals are applied.

(d) *Identification circuits.*—Each embodiment has been shown to require a distinct identification circuit. These circuits have been briefly described with respect to the block diagrams of FIGURES 1 through 4 and are to be described in detail now with respect to FIGURES 29 through 32.

(1) *N-tuple Systems.*—The *n*-tuple system utilizes an identification circuit of the type shown in block diagram form in FIGURE 2 comprising a group of integrators 13, a reference storage and correlator circuit 15, and a maximum signal indicator 17. The group of integrators and the reference storage and correlator circuit are shown in FIGURE 29. The maximum signal indicator is shown in FIGURE 30. The identification circuit may operate on all orders of autocorrelation functions that are generated by the *n*-tuple generator or one or more orders of autocorrelation functions. The various orders of functions, or their constituent sums, may be weighted unequally.

*Reference storage and correlator circuits*

The reference storage and correlator circuit 13 (FIGURE 29) accepts the elements of the *n*th-order autocorrelation function sums $[f(t)\cdot f(t+t^{(1)}), \ldots, f(t+t^{(n)})]$ from the *n*-tuple generator (FIGURE 28) and generates the corresponding autocorrelation function sums $[D_S^{(n)}(t^{(1)}, \ldots, t^{(n)})]$. All or some of the sums are compared to (correlated with) stored reference sums $[D_{R_a}^{(n)}(t^{(1)}, \ldots, t^{(n)})]$ and normalized to provide comparison sums $S_{S,R_a}$ according to the following formula which corresponds to Formula (36), with the variable $r$ replaced by $t$:

$$S_{S,R_a}=\frac{\sum_{t^{(1)},\ldots\, t^{(n)}} D_S^{(n)}(t^{(1)},\ldots,t^{(n)})\cdot D_{R_a}^{(n)}(t^{(1)},\ldots,t^{(n)})}{\left\{\sum_{t^{(1)},\ldots,\, t^{(n)}}[D_{R_a}^{(n)}(t^{(1)},\ldots,t^{(n)})]^2\right\}^{1/2}} \tag{42}$$

When the comparison is limited to one order (or several orders) of the autocorrelation functions, a resultant reduction in circuitry is possibly. Regardless of the order or orders of autocorrelation function that are used in the system, the largest comparison sum $S_{S,R_a}$ that is generated is indicative of the identity of the specimen.

The elements of the autocorrelation function sums that are applied from the *n*-tuple generator (FIGURE 28) are summed in integrators 13 (FIGURE 29) to form the specimen autocorrelation function sums. Each integrator 13 contains an analog integrator circuit 151 and an amplifier 153. The amplifier is used to invert the integrator circuit output to compensate for the inherent inversion of this circuit.

The specimen autocorrelation function sums generated by the integrators 13 are compared to (correlated with) reference autocorrelation function sums in the reference storage and correlation circuit 15 by the use of resistor networks (Kirchoff adders). Each horizontal output lead contains a sum $S_{S,R_a}$ developed according to (40) for the particular reference pattern $R_a$. The autocorrelation function sums from integrators 13 are selectively applied to the horizontal output leads through a reference storage resistor 155 under the control of switches 156. The switches can be set to provide many embodiments of identification systems, including those that are based on a single order and those based on a group of orders of autocorrelation functions. Each horizontal output lead is also connected to ground through a normalizing resistor 157. Thus, the integrator 13 output voltages are applied groups of voltage dividers, each comprising a resistor 155 and a resistor 157. The output voltage component (across resistor 157) from each applied voltage (integrator 13 output) is:

$$\frac{\text{(applied voltage) (resistance of resistor 157)}}{\text{(resistance of resistor 155)}+\text{(resistance of resistor 157)}} \tag{43}$$

which may be rewritten as:

$$\frac{(\text{applied voltage})\dfrac{1}{(\text{resistance of }155+\text{resistance of }157)}}{\dfrac{1}{\text{resistance of }157}} \quad (44)$$

Each total output voltage (across the appropriate resistor 157) may be represented as:

$$\frac{\sum_i\left[(\text{applied voltage})_i\dfrac{1}{(\text{resistance of }155_i+\text{resistance of }157)}\right]}{\dfrac{1}{\text{resistance of }157}} \quad (45)$$

This expression (45) is in a suitable form to permit the computation of (42) by the proper choice of resistors 155 and 157. The ohmic value of each normalizing resistor 157 (corresponding to each reference pattern $R_a$) is first selected [from (42) and (45)] according to $$(\text{resistance of }157)=\frac{C}{\left\{\sum_{t^{(1)},\ldots t^{(n)}}[D_{R_a}^{(n)}(t^{(1)},\ldots,t^{(n)})]^2\right\}^{1/2}} \quad (46)$$

where C is a constant factor for all reference patterns and where the elements $D_{R_a}^{(n)}(t^{(1)},\ldots,t^{(n)})$ are computed from the reference patterns as shown above. In the embodiments using a single order of autocorrelation function comparison based on the patterns shown in FIGURES 7 through 16, the ohmic values of the resistances 157 are proportional to:

| Patterns | Order | | |
|---|---|---|---|
| | First | Second | Third |
| 1 | 183 | 224 | 378 |
| 2 | 139 | 129 | 120 |
| 3 | 169 | 164 | 169 |
| 4 | 118 | 110 | 112 |
| 5 | 109 | 99 | 877 |
| 6 | 107 | 97 | 877 |
| 7 | 169 | 164 | 169 |
| 8 | 78 | 67 | 54 |
| 9 | 82 | 71 | 63 |
| 0 | 125 | 123 | 118 |

The ohmic value of each reference storage resistor 155, for each $R_a$ is next determined from (42) and (45) according to:

$$(\text{resistance of }155)=\left[\frac{k}{D_{R_a}^{(n)}(t^{(1)},\ldots,t^{(n)})}-(\text{resistance of }157)\right] \quad (47)$$

where $k$ is a constant factor in all computations and chosen to cause output voltages $S_{S,R_a}$ to be generated that fall within a range suitable for use by the subsequent circuit (maximum signal indicator).

The actual values of the reference storage resistors 155 corresponding to the reference patterns shown in FIGURES 7 through 16 are not given because their calculation is obvious in view of the fact that the resistances of the normalizing resistances 157 as well as the autocorrelation function sums (FIGURES 7 through 16) have been given.

*Maximum signal indicator*

The comparison sums $S_{S,R_a}$ from the reference storage and correlator circuit 15 are applied to a maximum signal indicator 17 which is shown in detail in FIGURE 30. This circuit provides an output indication of the largest of these sums, which corresponds to the identity of the specimen after the system has stabilized (after all system operations have been completed). The identity of the specimen is indicated, or a reject is indicated, by the glowing of a corresponding output lamp 201.

The input signals (comparison sums) are applied to the base connections of a group of NPN type transistors

203. Each transistor base circuit includes a resistor 205 to protect the transistor in the case of a disconnected input signal. The emitter-base connection of the transistors provides a diode action that, in conjunction with resistors 207, and a common path for current including resistors 209 and 211, permits current flow only to the transistor base to which the most positive signal is applied. The voltage drop across resistors 209 and 211 back-biases the transistors 203 associated with the less positive input signals, preventing current flow in their base circuits. The sensitivity of the circuit is defined as the amount that the most positive input signal must exceed the adjacent (second most positive signal) to back-bias the transistor associated with the latter signal. The sensitivity is controlled by the setting of resistor 209. Resistors 207 are adjusted to provide a constant and equal emitter resistance for all of the transistors 203 regardless of the setting of resistor 209. As the common resistance in the emitter circuits is varied by a change in the setting of resistor 209, the settings of resistors 207 are changed in the opposite direction to maintain a constant total emitter resistance. Resistors 207 may be controlled simultaneously with control of resistor 209 by the use of a common control shaft. The minimum common resistance in the emitter circuit is determined by the fixed resistor 211. If the resistance of resistor 211 is labelled $R_{211}$, the active resistance of resistor 209 is labelled $R_{209}$, the active resistance of resistor 207 is labelled $R_{207}$ and the emitter-base resistance of a transistor 203 is labelled $R_{203}$, then the smallest ratio between the amplitudes of the most positive signal $E_i$ and the adjacent signal $E_j$ that may be tolerated without indicating a reject is approximately:

$$\frac{R_{203}+R_{207}+R_{209}+R_{211}}{R_{209}+R_{211}} \quad (48)$$

Only the transistor associated with the most positive input signal is permitted to conduct if the most positive signal exceeds the adjacent signal by an amount greater than the sensitivity of the system.

The output of the conducting transistor 203 is applied to an associated PNP transistor switch 213 which, in turn, provides current to operate a relay 215 associated with the largest input signal. A group of resistors 247 provide protection for transistors 203 and 213. A second group of resistors 219 provide a path for leakage current in the base circuits of transistors 213.

A reject circuit containing a transistor 221 and the reject relay 233 operates when the largest two or more applied signals are approximately equal. This condition causes two or more relays 215 to operate. Transistor 2 is ordinarily non-conducting due to the negative voltage at its base (which is equal to the supply voltage applied to a resistor 225 less the voltage drop across the resistor). When two or more relays 215 are operated simultaneously, a sufficient current flows in resistor 225 to provide a voltage to the base of transistor 221 which is above its cut-off value and the transistor conducts, operating relay 223. Each relay has a set of contacts 227 which control the operation of the corresponding indicator 201. Thus, the maximum signal indicator 17 provides an indication of the identity of the specimen, or a reject indication if the specimen cannot be unequivocally identified.

(2) *Entropy systems.*—An identification circuit 11 that is suitable for use in the entropy systems has been discussed with respect to the block diagram in FIGURE 3. This circuit is similar to the identification circuit used in the *n*-tuple systems, except that the integrator 13 (FIGURE 3) outputs are applied through entropy generators 19 to the reference storage and correlator circuit 15. The integrators 13 and the maximum signal indicator 17 have already been described in detail with respect to FIGURES 29 and 30. Since only one signal is applied to the reference storage and correlator circuit for each order of entropy used, this circuit is less complex than the circuit required in the $n$-tuple system. The reference storage and correlator circuit will not be described in detail, because it differs from the circuit described with respect to FIGURE 29, only in the number of input signals that are applied and the number of reference storage resistors 155 that are used. The output signals from the reference storage and correlator circuit represent the comparison sums $S_{S,Ra}$ according to Formula (37).

*Entropy generator circuit*

Although the block design of the entropy system (FIGURE 3) shows a generalized system employing several orders of entropy functions, for simplicity, the detailed description is to be limited to identification based on the first-order entropy function only.

The first-order entropy generator 19 shown in FIGURE 31 accepts the zero-order and first-order autocorrelation function sums $D^{(0)}$ and $D^{(1)}(t^{(1)})$ and generates the function:

$$E^{(1)}=\frac{[\ln D^{(0)}][D^{(0)}][D^{(0)}-1]-2\sum_{t^{(1)}}[D^{(1)}(t^{(1)})\cdot\ln D^{(1)}(t^{(1)})]}{[D^{(0)}]\cdot[D^{(0)}-1]} \quad (49)$$

This function may be shown to be identical to function (15) when $n=1$ and the variable $t$ is substituted for the variable $r$, compensation is made (the factor 2 for this order of entropy) for the simplification of the $n$-tuple generator which only produces the non-redundant $n$-tuples, and where the following substitution is made:

$$\sum_{t^{(1)}}D^{(1)}(t^{(1)})=[D^{(0)}][D^{(0)}-1] \quad (50)$$

is applied as the second input to the summing amplifier 257. This amplifier generates the sum:

$$\ln D^{(0)}\sum_{t^{(1)}}D^{(1)}(t^{(1)})-\sum_{t^{(1)}}[D^{(1)}(t^{(1)})\cdot\ln D^{(1)}(t^{(1)})]$$

which is applied as the dividend to an analog divider circuit 267.

The output signal $-D^{(0)}$ from amplifier 261 combined with a signal representing $+1$ in a summing amplifier 269 to provide $D^{(0)}-1$ which is multiplied by $-D^{(0)}$ in an analog multiplier 271. The multiplier output $-D^{(0)}(D^{(0)}-1)$ is applied as the divisor to the divider 267 and the quotient that is developed represents the desired first-order entropy function (49). This function is then applied to a reference storage and correlator circuit of the type shown in FIGURE 29 and the output of this circuit is applied to a maximum signal indicator of the type shown in FIGURE 30.

Higher-order ($n$th-order) entropy generators can be constructed in a similar manner where the first-order autocorrelation functions sums are replaced by the appropriate higher-order ($n$th-order) sums and the $$-D^{(0)}(D^{(0)}-1)$$

output from multiplier 271 is replaced with $$-D^{(0)}\cdot[D^{(0)}-1][D^{(0)}-2]\;.\;.\;.\;[D^{(0)}-n]$$

This quantity can be generated by cascading summing amplifiers 269 and multipliers 271. The factor of 2 before the summation sign in Equation (49) is replaced with a factor $(n+1)!$ The $n$th-order entropy function that is generated is of the form $$E^{(n)}=\left\{\frac{[\ln D^{(0)}][D^{(0)}][D^{(0)}-1]\ldots[D^{(0)}-n]-[(n+1)!]\sum_{t^{(1)},\ldots,t^{(n)}}[D^{(n)}(t^{(1)},\ldots t^{(n)})\cdot\ln D^{(n)}(t^{(1)},\ldots,t^{(n)})]}{[D^{(0)}][D^{(0)}-1]\ldots[D^{(0)}-n]}\right\} \quad (51)$$

The total number of $n$-tuples (non-redundant and redundant) equals $(n+1)!$ times the number of non-redundant $n$-tuples. Thus, for the first entropy ($n=1$), each non-redundant $n$-tuples (pairs) is multiplied by 2. This form (49) of the function is used because it parallels the circuits in FIGURE 31.

The first-order autocorrelation function sums $D^{(1)}(t^{(1)})$ are applied to natural logarithmic generators 251 which provide outputs of the form $-\ln D^{(1)}(t^{(1)})$. The change in sign here and at other points in the following description are caused by the inherent inversion in the logarithmic generators and other analog circuits. Each of these signals is multiplied by the corresponding $D^{(1)}(t^{(1)})$ in an analog multiplier 253 and the products $$-D^{(1)}(t^{(1)})\cdot\ln D^{(1)}(t^{(1)})$$

are combined in a summing amplifier 255 to provide $$\sum_{t^{(1)}}D^{(1)}(t^{(1)})\cdot\ln D^{(1)}(t^{(1)})$$

as one input to another summing amplifier 257.

The input signals $D^{(1)}(t^{(1)})$ to the entropy generator are combined in a summing amplifier 259 to produce $$-\sum_{t^{(1)}}D^{(1)}(t^{(1)})$$

The remaining input signal $D^{(0)}$ is inverted in an amplifier 261 and applied to a natural logarithmic generator 263 which develops a signal representative of $\ln D^{(0)}$. The output of the summing amplifier 259 is multiplied by the output of the logarithmic generator 263 in an analog multiplier and the product $$-\ln D^{(0)}\sum_{t^{(1)}}D^{(1)}(t^{(1)})$$

(3) *Feature analysis systems.*—Identification circuits for three embodiments of feature analysis systems are shown in detail in FIGURES 32, 33 and 35, respectively. These embodiments are based on the reference pattern shown in FIGURES 7 through 16. In two of these embodiments (FIGURES 32 and 33), decoding logic circuits with "reference storage" that is inherent in their design are used. Although the particular decoding logic that is shown provides identification of the specific patterns shown in FIGURES 7 through 16, the logic may obviously be extended to provide identification of any specimens. In the third embodiment (FIGURE 35) identification is based on a comparison between the autocorrelation function of a feature function of the specimen with similar functions of reference patterns. The feature functions depend upon selected elements of autocorrelation functions of the specimen and reference patterns.

*First embodiment*

Certain outputs of the $n$-tuple generator circuit (FIGURE 28) are applied to the identification circuit for the first embodiment shown in FIGURE 32. These particular signals are selected because they contain sufficient data to permit discriminating between the ten reference patterns shown in FIGURES 7 through 16. They are:

$$f(t)\cdot f(t+1)\cdot f(t+2);\; f(t)\cdot f(t+2)\cdot f(t+6);\; f(t)\cdot f(t+1)\cdot f(t+5);\text{ and } f(t)\cdot f(t+1)$$

Many other combinations of signals from the $n$-tuple generator also contain sufficient data to discriminate between the ten patterns and can be used. When the selected $n$-tuples are limited to these with relatively small displacements, a relatively simple $n$-tuple generator may be used. In the case of the $n$-tuples shown in the embodiment, the largest displacement is equal to 6 and the $n$-tuple generator may be constructed with a six-element shift register. The specimen data signal $f(t)$ and a start signal are also applied to this circuit from the control circuit shown in FIGURE 28$a$. Block diagrams of the patterns that these signals represent are shown above the lead indications.

The start signal is applied to reset all flip-flops in the circuit before the other input signals are present. The first bit of the specimen data signal $f(t)$ is applied to set a flip-flop 301 which generates a "1" output level. This signal is shaped into a sharp pulse by a differentiator 305 and applied directly to trigger an 8-unit gate generator 307 and through an 8-unit delay 309 and a 13-unit delay 311 to trigger a 5-unit gate generator 313 and a 10-unit gate generator 315, respectively. Each gate generator 307, 313, 315 conditions one or more "and" gates 317, 319, 321, 323 which pass the $n$-tuple, input signals that occur while they are conditioned. The duration of the output levels of the gate generators and the amount of delay (if any) before triggering the generators is dependent upon the particular reference pattern features that correspond to the signals from the $n$-tuple generator that are used as the basis for identification. The design of these circuits is not rigid—it is only necessary that the various "and" gates 317, 319, 321, 323 provide a different combination of output signals for each reference pattern.

In the embodiment shown, which is based on the particular reference patterns shown in FIGURES 7 through 16, "and" gate 317 provides an output when the specimen contains a three-element horizontal line corresponding to the $n$-tuple $f(t) \cdot f(t+1) \cdot f(t+2)$ during its first or second scanned rows because the "and" gate is conditioned to pass signals occurring for eight units of time after the first specimen data bit. The duration of eight units of time is used because the bits in each row of a three column specimen occur during three time units and two spacing bits are generated between the rows due to the use of a five-column scanning matrix. Thus, "and" gate 317 provides an output signal if the specimen is a "5," "7," "8" or "9."

Similarly, "and" gate 319 provides a signal if the specimen contains the feature corresponding to a signal $$f(t) \cdot f(t+2) \cdot f(t+6)$$

from the $n$-tuple generator within its first and second rows. This occurs when the specimen is a "2," "8," "9" or "0."

When the specimen is a "4," "6," or "9," a feature is present in the second and third rows corresponding to the $n$-tuple $f(t) \cdot f(t+1) \cdot f(t+5)$ and a signal is provided by "and" gate 321. This "and" gate is conditioned while the third row of specimen data bits are generated (for five units of time starting after an eight unit delay) by the action of gate generator 313 and delay 309. This feature, and any feature which requires an analysis of two rows of bits, necessarily generates a corresponding $n$-tuple signal only during the scanning of the lower row. Therefore the "and" gate is conditioned while the lower row is scanned. If the "and" gate were also conditioned while the upper row were scanned, a signal would be generated if the two row feature had its lower row in either of the two rows during which the "and" gate was conditioned. This precaution is not taken with respect to the two row feature corresponding to $f(t) \cdot f(t+2) \cdot f(t+6)$ because the specimen was analyzed for this feature within its first two scanned rows and the lower row of the feature necessarily occurs during the second row of the specimen bits.

When the specimen is a "2," "3," "5," "6" or "8," "and" gate 323 provides an output signal corresponding to a two-bit horizontal line feature occurring during the fourth or fifth rows of specimen bits due to the action of a delay 311 and a gate generator 375.

The gate generators and delays may be modified to account for certain presumptions that may be made with respect to the features under analysis. For example, "and" gate 317 could be conditioned for only one unit of time at two different times, corresponding to the occurrences of the third bits of the first two rows of the specimen bits because the three unit horizontal line feature under analysis can only terminate (and generate the corresponding $n$-tuple) at the end of a row. It can be further noted that no reference patterns contains a three-unit horizontal line feature in its second row of bits, which eliminates the necessity of conditioning the "and" gate at the end of the second row. These and other modifications can obviously be made without adversely affecting the identification of specimens, but in the interest of circuit simplicity, they have not been made.

Each "and" gate 317, 319, 321, 323 output is applied to the set input of a corresponding flip-flop 325, 327, 329, 331. A "1" level is present on one or the other of each pair of flip-flop output leads corresponding to the identity of the specimen and the leads are so labelled.

An indication of the identity of the specimen is provided by a tree of "and" gates 333 under control of the flip-flops according to well-known techniques. Each "and" gate 333 output level is labelled corresponding to the identification of the specimen or specimens that cause a signal to be present.

The start signal is also applied to a 46-unit delay 335 which provides an output signal after the matrix has been completely scanned and the identification logic has had time to provide a signal on the appropriate output lead. If the specimen is identified, a signal is applied through an "or" gate 337 and an inverter 339 to inhibit an "and" gate 341. If the specimen is not identified, the "and" gate 341 is not inhibited and the signal from the delay 335 is passed to set a flip-flop 343 which, in turn, generates a reject signal indicating the failure to identify the specimen.

The feature analysis system identification circuit of FIGURE 32 can be obviously extended to provide an indication of the identity of any specimen by the use of suitable logic and input signals.

*Second embodiment*

The feature analysis system of specimen identification making use of the second-embodiment identification circuit shown in FIGURE 33 is less sensitive to noise than the first embodiment because identification is less dependent upon the exact time of occurrence of the first bit specimen data.

Seven $n$-tuples (triples) are applied to this circuit from the $n$-tuple generator (FIGURE 28) as indicated. Although other $n$-tuples can be selected, these have been found to represent significant features and, since no $n$-tuple requires a time displacement in excess of 10, a simple $n$-tuple generator is usable.

The identification circuit shown in FIGURE 33 makes use of a group of straight-forward binary logic circuits, each of which is designed to generate an output signal when the specimen is similar to the associated reference pattern. Although a reject circuit is not shown, the output leads can be applied to a circuit of the type shown in FIGURE 32$b$ to provide a reject indication when the specimen cannot be identified. The logic circuit for providing an indication when the specimen is a "1" is shown in FIGURE 33$a$ and it comprises three flip-flops 351, 353 and 355; two "and" gates 357 and 359; a delay 361, and an "or" gate 313. The circuit provides an output indication if three 3-element vertical line features $$[f(t) \cdot f(t+5) \cdot f(t+10)]$$

are successively present in the specimen and if no 3-element horizontal line $[f(t) \cdot f(t+1) \cdot f(t+2)]$ is present (as in a "7" or a "9," each of which also contain three 3-element vertical line features). The first 3-element vertical line feature that is present sets flip-flop 351, which conditions "and" gate 357. This gate provides an output to set flip-flop 353 when the second 3-element vertical line feature occurs, which in turn, conditions "and" gate 359 which provides an output to set flip-flop 355 upon the occurrence of the third 3-element vertical line feature. The 3-element horizontal line feature signal is applied to reset flip-flop 351 and 353 through the delay 361 and the "or" gate 363 to inhibit identification when the specimen is a "7" or a "9." The delay is in the order of one half of a time unit and insures that the flip-flops are reset when a horizontal line feature occurs at the same time as a vertical line feature. All flip-flops are also reset by the "start" signal prior to identification.

The remaining circuits shown in FIGURE 33 operate in a similar and obvious manner. The circuits may be complicated if redundancy is desired. For example, the circuit for indicating a "1" may be reset when any feature other than a vertical line is present.

*Third embodiment*

The identification circuitry for the third embodiment is shown in FIGURE 35 and will be described below. The method of operation of this circuit is to be described first with respect to FIGURE 34.

In this embodiment, autocorrelation functions of feature functions of the specimen are compared to similar functions of reference patterns, where the feature functions depend upon elements of autocorrelation functions of the specimen and reference patterns. In this manner, highly invariant identification is provided.

The selected features are represented by *n*-tuples (elements of autocorrelation functions) as indicated in FIGURE 34*a*. These features are designated by Roman numerals and, for simplicity, only these numeral designations will be used below.

Figure 34B:
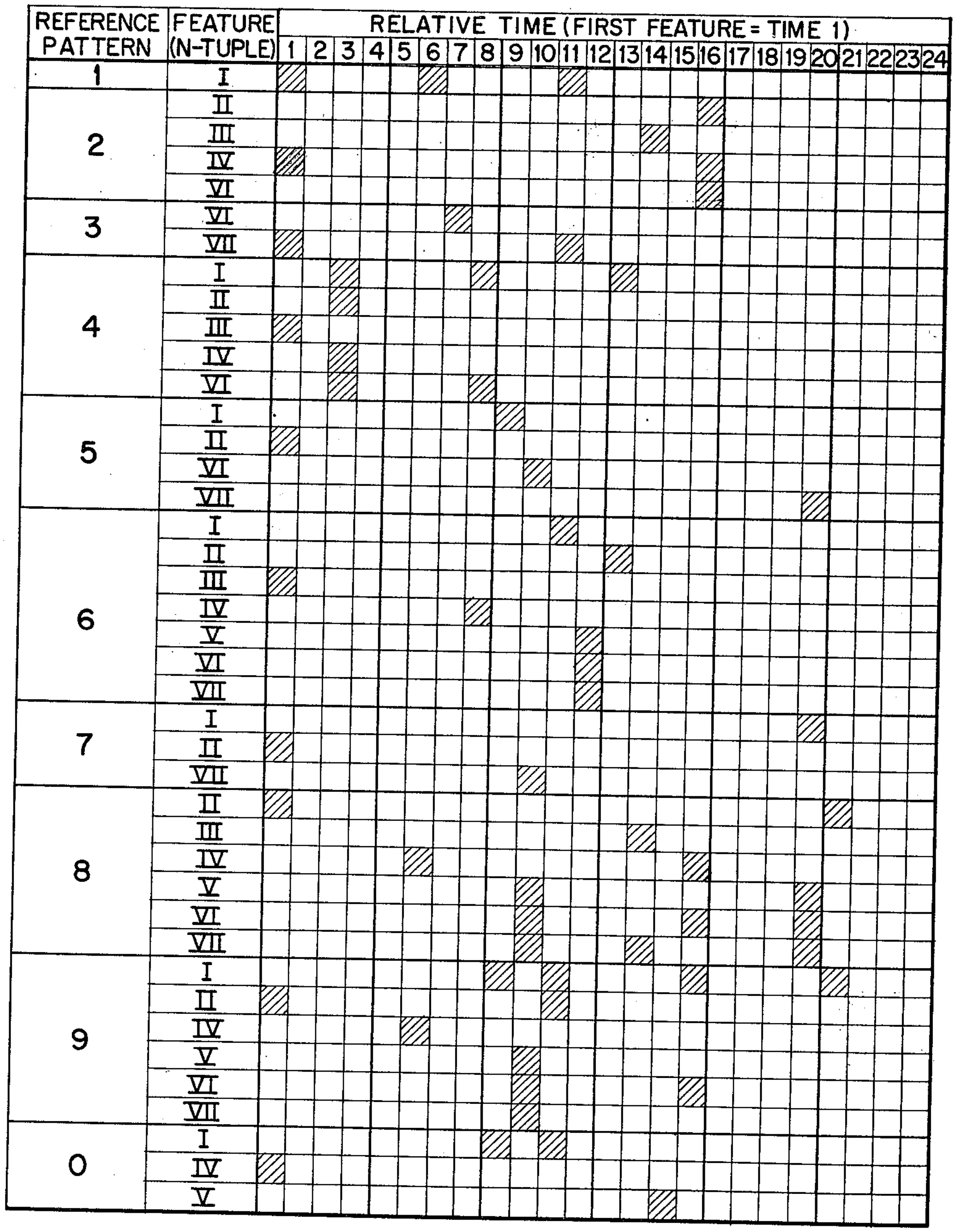

A feature function for each reference pattern (FIGURES 7 through 16) is shown in FIGURE 34*b*. In this chart, various areas are shaded to correspond to the relative times of occurrence of the selected features in the reference patterns. The first feature in any pattern is considered to occur at time one and the remaining features are tabulated with respect to this time.

Figure 34C:
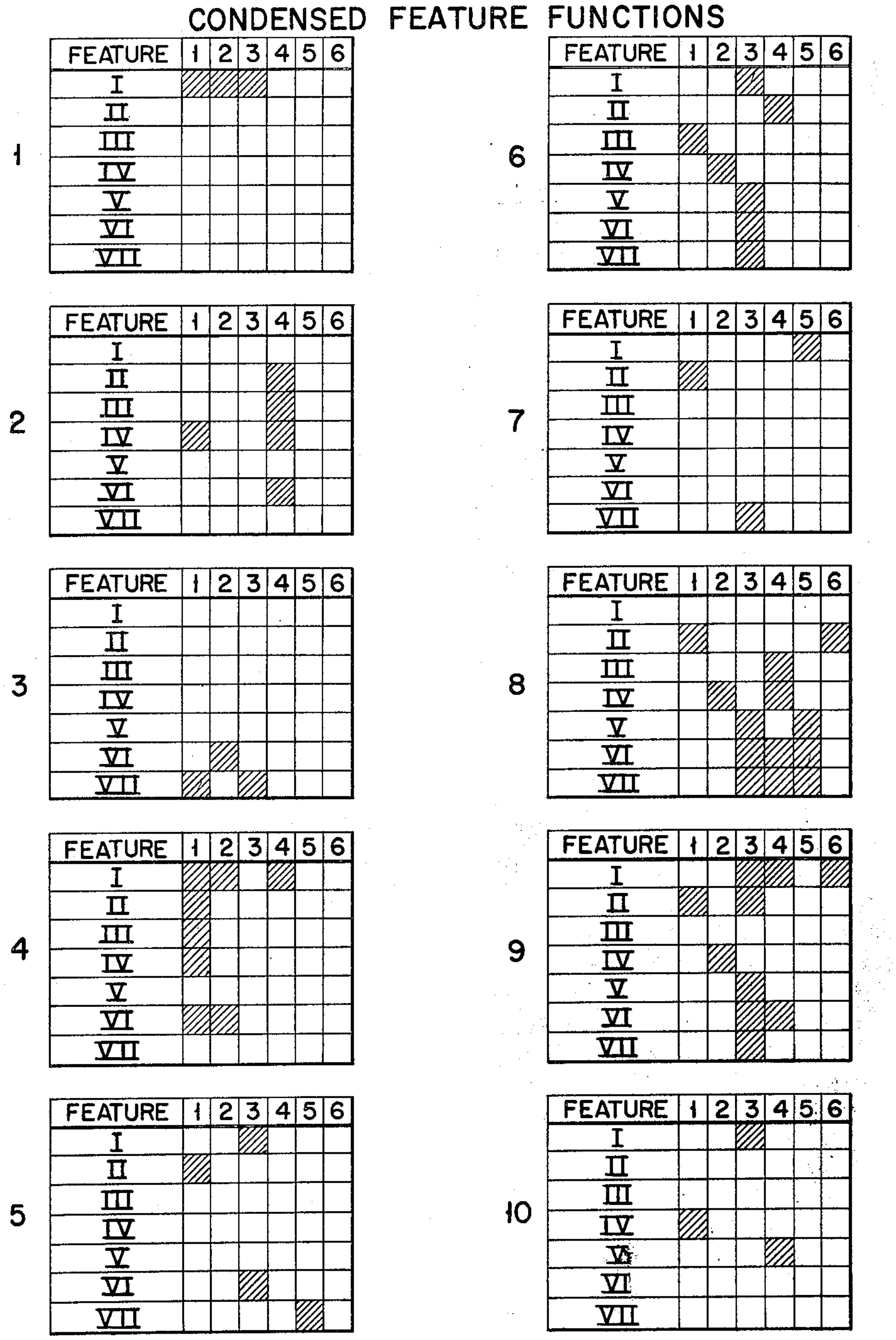

Consolidated feature functions for the reference patterns are shown in FIGURE 34*c*. Each unit of time in these charts corresponds to four units of time in FIGURE 33*b*. Where a feature occurs more than once within a four-unit group in FIGURE 33*b* (for example, feature I, pattern "9," at relative times 9 and 11), the additional occurrences are disregarded.

The first-order autocorrelation functions of the consolidated feature functions (FIGURE 34*c*) of the reference patterns are shown in FIGURE 34*d*. Each column of this chart corresponds to a reference pattern. The autocorrelation function elements are shown vectorially along the left side of the chart. The first row merely contains the sums of the elements in the feature functions. The following rows are arranged such that the vectors are grouped according to column width. Since the autocorrelation function is symmetric, both directions of the vector are shown, and any single pair of points may be represented by either vector. Hence, all sums are even numbers except the sum of the elements in the function (first row). The autocorrelation functions of the consolidated feature functions form the basis of identification.

Figure 35B:
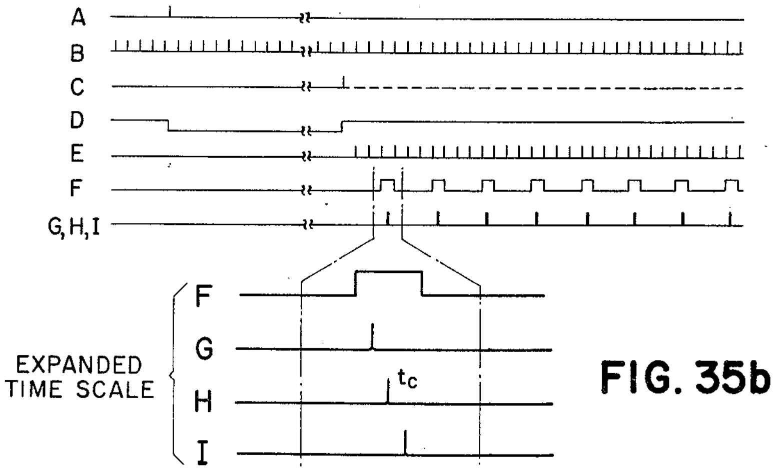

The circuitry in FIGURE 35*a* and the associated timing diagram in FIGURE 35*b* show a method of generating the consolidated feature functions and their autocorrelation functions. Each *n*-tuple (which represents a selected feature) is applied to an associated flip-flop 401. These flip-flops are reset prior to identification by a start signal (waveshape A) that is applied through an "or" gate 402. These flip-flops in conjunction with a group of "and" gates 403 generate the consolidated feature function of the input functions as follows. Clock pulses (waveshape B) applied to an "and" gate 405 are passed (as waveshape E) to a four-pulse counter 407, under the control of a flip-flop 409 (waveshape D). This flip-flop is reset prior to identification by the start pulse and is set (to condition "and" gate 405) by the first feature signal (waveshape C), through an "or" gate 411. The counter 407 is set to 00 by the start signal A and provides an output signal when it registers a count of 11. This is caused by the third clock pulse after the first feature pulse, and by every succeeding fourth clock pulse (waveshape F). The clock pulses are also applied through a delay 413 to an "and" gate 415. Those clock pulses that coincide with the counter output F are passed by the "and" gate as waveshape G. These pulses are also applied to series-connected delays 417 and 419 to generate waveshapes H and I. Delays 413, 417 and 419 are small and waveshapes F, G, H and I are shown in an expanded time scale to show their relationships. Waveshape H represents the consolidated time signal $t_c$, $t_c+1$, $t_c+2$, . . . .

The consolidated feature function is stored in a group of shift registers 421. These registers are reset by the start pulse A and their stored data is shifted by the output signal from "and" gate 415 (waveshape G). After the application of each shift pulse, the flip-flop 401 outputs are sampled by "and" gate 403 (at times $t_c$, $t_c+1$, $t_c+2$, . . ., by waveshape H) and following this, the flip-flops are reset by waveshape I, through "or" gate 402. Thus, if one or more input signals are applied to a flip-flop 401 during the four units of time between sampling, a signal is applied to the corresponding shift register 421.

A column-type autocorrelator is shown in FIGURE 35*c*. This circuit generates the autocorrelation function of the consolidated feature function of the specimen as it is being generated in the shift registers 421 in FIGURE 35*b*. The comparison functions $S_{S,R}$ between the specimen and reference pattern functions are also generated by the circuit shown in FIGURE 35*c* on the horizontal output leads.

The sum of the elements in the consolidated feature function is developed by an integrator 451 as the signals $f_I(t_c)$, $f_{II}(t_c)$, . . ., $f_{VII}(t_c)$ are applied from the first sections of the shift registers 421. Since every element in every column of the function passes through the first section of one of the shift registers, the integrator output is indicative of the sum of the function elements.

The one-column vectors in the autocorrelation function of the consolidated feature function are generated by a group of six integrators 453 (of which the first and last are shown). The sum of the one unit-length, one-column (vertical) vectors is accomplished by integrating the shift register output pairs:

$$f_I(t_c)\cdot f_{II}(t_c)$$
$$f_{II}(t_c)\cdot f_{III}(t_c)$$
$$f_{III}(t_c)\cdot f_{IV}(t_c)$$
$$f_{IV}(t_c)\cdot f_V(t_c)$$
$$f_V(t_c)\cdot f_{VI}(t_c)$$
$$f_{VI}(t_c)\cdot f_{VII}(t_c)$$

which are applied to the integrator 453 through a group of "and" gates 455. Since each such pair represents two vectors, the integrator summing resistor 457 is shown to have a weight of "1," where the integrator 451 summing resistor 459 has a weight of "½." The weights indicate the relative ohmic values of the resistors. Since all one-column, one unit-length vectors in any column of the feature function pass through the first sections of the shift registers, the integrator output is indicative of all such vectors, regardless of their location in the feature function.

All six unit-length, one-column (vertical) vectors in the feature function are obtained as the sum of the pair:

$$f_I(t_c)\cdot f_{VII}(t_c)$$

In a similar manner, the remaining one-column vector sums are generated by circuits that are not shown.

All two-column vector sums are obtained by "and" gates 461 and integrators 463. In this case, an output from a first section of a shift register and an output from a second section of a shift register are applied to each "and" gate, as all two-column vectors (in any columns of the feature function) are represented by pairs of elements that occur at the outputs of the first two sections of the shift registers.

The six column vectors are obtained by "and" gates 465 and integrators 467 in a similar manner, as shown. The three-column, four-column and five-column vector summing circuits are similar in operation and, hence, not shown.

Each integrator output is applied through an amplifier 469 to a correlation circuit comprising a group of reference storage resistors 471 and a group of normalizing resistors 473. This circuit operates in the same manner as the circuit shown and described with respect to FIGURE 29. Thus, the ohmic values of the normalizing resistors 473 may be computed by Formula (46) where the elements $D_{R_a}^{(n)}(t^{(1)}, \ldots, t^{(n)})$ are replaced by the elements of the autocorrelation function of the consolidated feature function of the reference pattern $R_a$. These normalizing resistor values for the reference patterns shown in FIGURES 7 through 16 are proportional to the values indicated in FIGURE 34*d4* in the row labelled "normalization factors." The ohmic values of each reference storage resistor 471, for each reference pattern $R_a$ is next determined according to Formula (47) where the values of the previously-determined normalizing resistors 473 are substituted for "resistance of 157" in the formula.

Many elements of the autocorrelation functions of the reference patterns are zero, as shown in FIGURE 34*d*. In these cases, the reference storage resistors have computed ohmic values of infinity and the corresponding amplifier 469 output signals (FIGURE 35*c*) are not applied to the correlation circuit. The circuit shown in FIGURE 35*c* shows some amplifiers which have no output connections. These circuits have been shown in order to provide a complete description of a technique which is suitable for identifying a variety of specimen types. Obviously, these circuits would be deleted in a special purpose identification system which was designed to identify only the patterns shown in FIGURES 7 through 16. The horizontal output leads (FIGURE 35*c*) are connected to a maximum signal indicator, of the type shown in FIGURE 30, to provide identification of the specimen.

VI. *System stability.*—While the use of first-order autocorrelation functions provides stable (noise-insensitive) specimen identification, the use of higher-order autocorrelation functions provides even greater system stability. Three typical high-resolution reference patterns: "A," "B" and "R" are shown in FIGURE 36, as they appear to a scanner. These patterns are selected because of their similarities in structure, to show the enhanced operation of the system under adverse conditions. FIGURES 37 and 38 show the same high-resolution patterns that have been degraded by the addition of noise. The group 1 test patterns shown in FIGURE 37 contain 50 added noise bits, while group 2 test patterns shown in FIGURE 38 contain 100 added noise bits.

The enhanced stability that is achieved by the use of higher-order autocorrelation function comparison is clearly shown in the correlation table of FIGURE 39. The ideal specimen (FIGURE 36) and the groups 1 and 2 test patterns (FIGURES 37 and 38) are compared to ideal reference patterns using first-order autocorrelation function $D^{(1)}(x', y')$ comparison and second-order autocorrelation function $D^{(2)}(x', y')$ comparison. In both cases, the degenerate functions are included. That is, the first-order function includes the zero-order function and the second-order function includes both the zero-order and first-order functions. The chart has been normalized such that the ideal specimen provides a comparison of 1.000 with the corresponding reference patterns. It may be noted that the second-order function provides considerably greater discrimination, even when using ideal specimens. All group 1 test patterns provide the highest comparison sum when compared to their corresponding reference patterns using both techniques, but the first-order comparison system would indicate a reject for the pattern "B." All group 2 test patterns provide the highest comparison sums when compared to an "R" when using first-order comparison, and the system would correctly identify the "R," incorrectly identify the "A," and indicate a reject for the "B." Using second-order comparison with group 2 test patterns, the "B" and "R" provide the highest comparison sums when compared to their corresponding reference patterns and the "A" provides the highest comparison sum when compared to an "R." In this case, the "A" and "B" would be rejected and the "R" would be properly identified.

Thus, the higher-order autocorrelation function comparison techniques provide identification that is more discriminating with a lower error rate.

VII. *Summary.*—Several systems which provide enhanced specimen identification have been shown and described. The use of *n*th-order autocorrelation functions in the identification of specimens is common to all embodiments. In the *n*-tuple systems, identification is based on a direct comparison of these functions with corresponding functions of reference patterns. The entropy (order) systems generate highly-invariant functions of *n*th-order autocorrelation functions and comparisons are made between these functions and similar functions of reference patterns. In the feature analysis systems, the specimen is analyzed with respect to selected *n*-tuples and identification is based on the presence or absence of these *n*-tuples.

The specimen identification systems which have been shown and described contain many advantages that are not present in other systems, such as high stability under noise and invariance to linear transformations of the specimen such as: registration, size, rotation and shear. These advantages are especially valuable when the general characteristics of the specimens are known but the actual type font and location of the specimens are in question. These enhanced characteristics of the present invention are particularly useful in the identification of handwritten specimens.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A specimen identification apparatus, comprising in combination: means for generating a function of *n*th-order autocorrelation function of specimen data located throughout the specimen, where *n* is greater than one; and means for comparing the function with functions of reference patterns, to identify the specimen.

2. A specimen identification apparatus comprising, in combination: means for generating an *n*th-order autocorrelation function $D_S^{(n)}(t^{(1)}, \ldots, t^{(n)})$ of the specimen S which is a function of time $f(t)$, where $n$ is greater than one; means for generating a plurality of comparison sums $S_{S, R_a}$, one for each reference pattern $R_a$, according to $$S_{S,\, R_a} = \frac{\sum_{t^{(1)}, \ldots t^{(n)}} D_S^{(n)}(t^{(1)}, \ldots t^{(n)} \cdot D_{R_a}^{(n)}(t^{(1)}, \ldots, t^{(n)})}{\left\{ \sum_{t^{(1)}, \ldots, t^{(n)}} \left[ D_{R_a}^{(n)}(t^{(1)}, \ldots, t^{(n)}) \right]^2 \right\}^{1/2}}$$

and means responsive to the comparison sums for providing an indication of the largest of these sums, whereby an indication of the identity of the specimen is provided.

3. A specimen identification apparatus comprising, in combination: means for generating a disorder function of the specimen; and means for comparing the function with functions of reference patterns to identify the specimen.

4. A specimen identification apparatus comprising, in combination: means for generating an entropy function of the specimen; and means for comparing the function with functions of reference patterns, to identify the specimen.

5. A specimen identification apparatus comprising, in combination: means for generating a plurality of elements of $n$th-order autocorrelation functions of the specimen, where $n$ is greater than one for at least one of specimen data located throughout the pluarlity of elements; and a logic circuit responsive to the generated elements, where the design of the logic circuit is controlled by reference patterns, for identifying the specimen.

6. A specimen identification apparatus comprising, in combination: means for generating a time-varying function of the input specimen; a time delay circuit having an input and a plurality of outputs, where the time delay between the input and any one of the outputs is different from the time delay between the input and all other outputs; means for applying the time-varying function to the input of the time delay circuit; a plurality of coincidence means; means for applying the input time-varying function to each of the coincidence means; means for applying at least one selected output of the time delay circuit to each of the coincidence means; timing means responsive to the input time-varying function for generating control signals which occur at times that are related to portions of the time-varying input signal that correspond to selected areas of the specimen; and logic circuit responsive to the outputs of the coincidence means and the control signals generated by the timing means for providing an indication of the identity of the specimen, where the selection of the outputs of the time delay circuit that are applied to the coincidence means and the selection of the time of occurrence of the control signals generated by the timing means is based on the occurrence of discriminating features that are present at various areas of the reference patterns.

7. A specimen identification apparatus comprising, in combination: means for generating a function of the specimen of the type:

$$-\sum_{r^{(1)},\ldots r^{(n)}} g[D^{(n)}(r^{(1)},\ldots,r^{(n)})]$$

where $D^{(n)}(r^{(1)},\ldots,r^{(n)})$ represents an $n$th-order autocorrelation function of the specimen and where:

$$-\sum_{r^{(1)},\ldots,r^{(n)}} g[D^{(n)}(r^{(1)},\ldots,r^{(n)})] \leq$$

$$-\sum_{r^{(1)},\ldots,r^{(n)}} g\left[\sum_{r^{(1)},\ldots,r^{(n)}} \frac{D^{(n)}(r^{(1)},\ldots r^{(n)})}{N_D}\right]$$

where $N_D$ is defined as equal to or greater than:

$$\frac{D^{(0)}!}{[D^{(0)}-n-1]!}$$

where $D^{(0)}$ represents the zero-order autocorrelation function and means for comparing this function with functions of reference patterns to identify the specimen.

8. A specimen identification apparatus comprising, in combination: means for generating a function $E^{(n)}$ of the specimen of the type:

$$E^{(n)}=-\sum_{r^{(1)},\ldots,r^{(n)}} \frac{\frac{D^{(n)}(r^{(1)},\ldots,r^{(n)})}{D^{(0)}}}{(D^{(0)}-h-l)!}\cdot\ln\frac{D^{(n)}(r^{(1)},\ldots,r^{(n)})}{D^{(0)}}$$

where $D^{(n)}(r^{(1)},\ldots,r^{(n)})$ represents the $n$th-order autocorrelation function of the specimen and where $D^{(0)}$ represents the zero-order autocorrelation function; and means for comparing this function with functions of reference patterns to identify the specimen.

9. An apparatus for identifying a specimen comprising in combination: means for generating a plurality of, but not all, elements of an $n$th-order autocorrelation function of specimen data located throughout the specimen; and means for applying the generated elements to a logic circuit whose design is controlled by reference patterns, to identify the specimen.

10. A specimen identification apparatus comprising, in combination: means for generating a feature function of the specimen comprising plurality of elements of an $n$th-order autocorrelation function of the specimen, where each element corresponds to a feature; means for generating an autocorrelation function of the feature function of the specimen; and means for comparing the autocorrelation function of the feature function of the specimen to functions of reference patterns, to identify the specimen.

11. A specimen identification apparatus comprising, in combination: means for generating a feature function comprising a plurality of elements of an $n$th-order autocorrelation function of the specimen, where each element corresponds to an $n$-tuple within the specimen, at relative times that are dependent upon the relative location of the corresponding $n$-tuples within the specimen; means for generating an autocorrelation function of the feature function; and means for comparing the autocorrelation function of the feature function with functions of reference patterns, for identifying the specimen.

12. A specimen identification apparatus comprising, in combination: means for generating a feature function comprising a plurality of elements of an $n$th-order autocorrelation function of the specimen, where each element corresponds to an n-tuple within the specimen, at consolidated time intervals that are dependent upon the relative location of the corresponding $n$-tuples within the specimen; means for generating an autocorrelation function of the feature function; and means for comparing the autocorrelation function of the feature function with autocorrelation functions of reference patterns, for identifying the specimen.

13. A specimen identification apparatus comprising, in combination: means for generating a plurality of elements of an $n$th-order autocorrelation function of specimen data located throughout the specimen, where each element corresponds to an $n$-tuple within the specimen, at relative times that are dependent upon the relative location of the corresponding $n$-tuples within the specimen; and an $n$-tuple sequence detector responsive to the elements for providing an indication of the identity of the specimen.

14. A specimen identification apparatus comprising, in combination: means for generating a binary time-varying function of the input specimen; a time delay circuit having an input and a plurality of outputs, where the time delay between the input and any one of the outputs is different from the time delay between the input and all other outputs; means for applying the time-varying function to the input of the time delay circuit; a plurality of coincidence means, each corresponding to a sum of an $n$th-order autocorrelation function which is to be generated, where $n$ is greater than one for a least one sum; means for applying the input time-varying function to each of the coincidence means; means for applying at least one output of the time delay circuit to each of the coincidence means and at least two outputs of the time delay circuit to at least one of the coincidence means; a plurality of accumulating means, one for each coincidence means; means for applying the output of each coincidence means to the corresponding accumulating means, whereby the sum accumulated in each accumulator means represents a sum of an $n$th-order autocorrelation function of the input time-varying function; means responsive to the specimen autocorrelation function sums developed in the accumulator means, for generating a plurality of comparison sums, each corresponding to one of a plurality of reference patterns, where each comparison sum depends upon a function of the accumulation of products of specimen autocorrelation function sums and corresponding reference pattern autocorrelation function sums; and a maximum signal indicator responsive to the comparison sums, for providing an indication of the reference pattern that corresponds to the largest comparison sum, whereby the specimen is identified.

15. A specimen identification apparatus comprising, in combination: means for generating a time-varying function of the input specimen; a time delay circuit having an input and a plurality of outputs, where the time delay between the input and any one of the outputs is different from the time delay between the input and all other outputs; means for applying the time-varying function to the input of the time delay circuit; a plurality of coincidence means, each corresponding to a sum of an $n$th-order autocorrelation function which is to be generated; means for applying the input function of time to each coincidence means; means for applying a group of outputs of the time delay circuit to each of the coincidence means; a plurality of accumulator means, one for each coincidence means; means for applying the output of each coincidence means to the corresponding accumulating means, whereby the sum accumulated in each accumulator means represents a sum of an $n$th-order autocorrelation function of the input time-varying function; means responsive to the sums accumulated in the accumulator means for generating a disorder function of the specimen; means responsive to the disorder function of the specimen for generating a plurality of comparison sums, each corresponding to one of a plurality of reference patterns, where each comparison sum depends upon a function of the product of the specimen disorder function and a corresponding reference pattern disorder function; and a maximum signal indicator responsive to the comparison sums, for providing an indication of the reference pattern that corresponds to the largest comparison sum, whereby the specimen is identified.

16. A specimen identification apparatus comprising, in combination: means for generating a time-varying function of the input specimen; a time delay circuit having an input and a plurality of outputs, where the time delay between the input and any one of the outputs is different from the time delay between the input and all other inputs; means for applying the time-varying function to the input of the time delay circuit; a plurality of coincidence means, each corresponding to a sum of an $n$th-order autocorrelation function which is to be generated; means for applying the input function of time to each coincidence means; means for applying a group of outputs of the time delay circuit to each of the coincidence means; a plurality of accumulator means, one for each coincidence means; means for applying the output of each coincidence means to the corresponding accumulating means, whereby the sum accumulated in each accumulator means represents a sum of an $n$th-order autocorrelation function of the input time-varying function; means responsive to the sums accumulated in the accumulator means for generating an entropy function of the specimen; means responsive to the entropy function of the specimen for generating a plurality of comparison sums, each corresponding to one of a plurality of reference patterns, where each comparison sum depends upon a function of the product of the specimen entropy function and a corresponding reference pattern entropy function; and a maximum signal indicator responsive to the comparison sums, for providing an indication of the reference pattern that corresponds to the largest comparison sum, whereby the specimen is identified.

17. A specimen identification apparatus comprising, in combination: means for generating a function of a disorder function of the specimen; and means responsive to the function of the disorder function, to identify the specimen.

18. A specimen identification apparatus comprising, in combination: means for generating a function of an entropy function of the specimen; and means responsive to the function of the entropy function, to identify the specimen.

19. A specimen identification apparatus comprising, in combination: means for generating a function of a plurality of disorder functions of the specimen; and means responsive to this generated function, for identifying the specimen.

20. A specimen identification apparatus comprising, in combination: means for generating a function of a plurality of entropy functions of the specimen; and means responsive to this generated function, for identifying the specimen.

21. A specimen identification apparatus comprising, in combination: means for generating a function of a plurality of orders of $n$th-order autocorrelation functions of specimen data located throughout the specimen; and means responsive to the generated function to identify the specimen.

22. A specimen identification apparatus comprising, in combination: means for generating a disorder function of a plurality of orders of $n$th-order autocorrelation functions of the specimen; and means responsive to the generated function to identify the specimen.

23. A specimen identification apparatus comprising, in combination: means for generating an entropy function of a plurality of orders of $n$th-order autocorrelation functions of the specimen; and means responsive to the generated function to identify the specimen.

24. An apparatus for identifying a specimen located in a document area, comprising in combination: means for generating a multi-valued representation of the document area, where each element of data corresponds to a unique location on the document and where the value of each element is determined by the relative intensity of the document at this location; means for analyzing the multi-valued data representation for data corresponding to combinations of predetermined data values at predetermined relative locations throughout the document area, where at least one combination is comprised of at least three elements of data to generate a registration-invariant function of the specimen; means for generating a disorder function of the generated registration-invariant function of the specimen; and means for analyzing the generated disorder function to identify the specimen.

25. An apparatus for identifying a specimen located in a document area, comprising in combination: means for generating a multi-valued representation of the document area, where each element of data corresponds to a unique location on the document and where the value of each element is determined by the relative intensity of the document at this location; means for analyzing the multi-valued data representation for data corresponding to combinations of predetermined data values at predetermined relative locations throughout the document area, where at least one combination is comprised of at least three elements of data to generate a registration-invariant function of the specimen; means for generating an entropy function of the generated registration-invariant function of the specimen; and means for analyzing the generated entropy function to identify the specimen.

26. A specimen identification apparatus, comprising in combination: means for generating a function of an $n$th-order autocorrelation function of specimen data located throughout the specimen, where $n$ is greater than one; and means responsive to the generated function, for identifying the specimen.

27. A specimen identification apparatus comprising, in combination: means for generating a disorder function of the specimen; and means responsive to the generated function, for identifying the specimen.

28. A specimen identification apparatus, comprising in combination: means for generating an entropy function of the specimen; and means responsive to the generated function, for identifying the specimen.

29. The apparatus described in claim 24, wherein the multi-valued representation of the document area is limited to two values.

30. The apparatus described in claim 25, wherein the multi-valued representation of the document area is limited to two values.

(References on following page)

References Cited by the Examiner

UNITED STATES PATENTS

| | | | |
|---|---|---|---|
| 2,663,758 | 12/53 | Shepard | 340—146.3 |
| 2,731,621 | 1/56 | Sontheimer. | |
| 2,854,191 | 9/58 | Raisbeck | 235—181 |
| 2,938,670 | 5/60 | Bolie | 235—181 |
| 2,941,187 | 6/60 | Simjian | 88—14 |
| 2,948,890 | 8/60 | Barth et al. | 340—282 X |
| 2,968,789 | 1/61 | Weiss et al. | |
| 2,978,675 | 4/61 | Highleyman. | |
| 2,985,298 | 5/61 | Schreiner. | |

OTHER REFERENCES

Publication I: Howell, Optical Analog Computers. In Journal of the Optical Society of America, 49 (10); pp. 1012–21. October 1959.

Publication II: Cutrona, L. J. et al. Data Processing by Optical Techniques. In Proceedings of the Nat'l Convention on Military Electronics, pp. 23–66. June 29–July 1, 1959.

Pattern Recognition and Reading by Machine, by Bledsoe & Browning published in 1959, Proc. E.J.C.C. pp. 225–232.

Alpha-Numeric Character Recognition Using Local Operations, by Bomba, published in 1959, Proc. E.J.C.C., pp. 218, 224.

MALCOLM A. MORRISON, *Primary Examiner.*